United States Patent
Suzuki (12)

(10) Patent No.: US 7,237,089 B2
(45) Date of Patent: Jun. 26, 2007

(54) SIMD OPERATION METHOD AND SIMD OPERATION APPARATUS THAT IMPLEMENT SIMD OPERATIONS WITHOUT A LARGE INCREASE IN THE NUMBER OF INSTRUCTIONS

(75) Inventor: Masato Suzuki, Shiga-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 392 days.

(21) Appl. No.: 10/304,341

(22) Filed: Nov. 26, 2002

(65) Prior Publication Data

US 2003/0145031 A1    Jul. 31, 2003

(30) Foreign Application Priority Data

Nov. 28, 2001  (JP)  ............................. 2001-363307

(51) Int. Cl.
G06F 15/80 (2006.01)
G06F 15/82 (2006.01)

(52) U.S. Cl. .......................... 712/22; 712/25; 712/221
(58) Field of Classification Search ................ 712/22, 712/221, 25; 717/140, 141
See application file for complete search history.

(56) References Cited

U.S. PATENT DOCUMENTS 4,710,872 A * 12/1987 Scarborough ............... 717/160
5,001,662 A    3/1991 Baum
5,847,978 A   12/1998 Ogura et al.
6,282,556 B1 *  8/2001 Chehrazi et al. ............ 708/521
6,704,762 B1 *  3/2004 Inoue ......................... 708/628

FOREIGN PATENT DOCUMENTS

JP           3-268024        11/1991

* cited by examiner

*Primary Examiner*—Daniel Pan

(57) ABSTRACT

An operation method has processing for applying a same type of operation in parallel to N M-bit operands to obtain N M-bit operation results executed on a computer. Here, N is an integer equal to or greater than 2 and M is an integer equal to or greater than 1. The operation method includes: an operation step of applying the type of operation to an N*M-bit provisional operand that is formed by concatenating the N M-bit operands, to obtain one N*M-bit provisional operation result, and generating correction information based on an effect had, by applying the operation, on each M bits of the provisional operation result from a bit that neighbors the M bits; and a correction step of correcting the provisional operation result in M-bit units with use of the correction information, to obtain the N M-bit operation results.

31 Claims, 40 Drawing Sheets

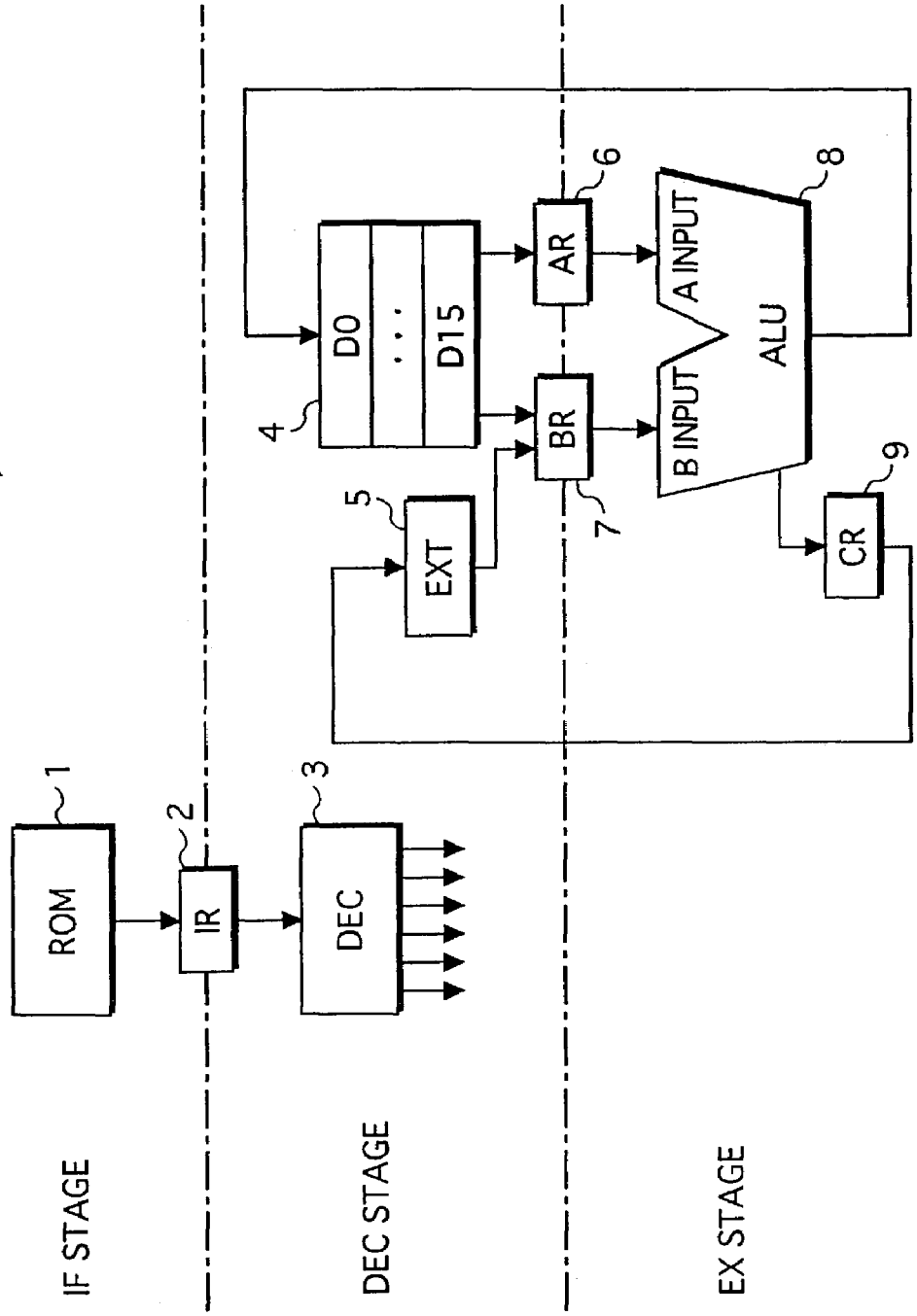

FIG.2A ADD CARRY INFORMATION

FIG.2B SUB CARRY INFORMATION

FIG. 2C INC CARRY INFORMATION

| 63 | 56 55 | 48 47 | 40 39 | 32 |
|---|---|---|---|---|
| C55 C55 C55 C55 C55 C55 C55 C55 | C47 C47 C47 C47 C47 C47 C47 C47 | C39 C39 C39 C39 C39 C39 C39 C39 | C31 C31 C31 C31 C31 C31 C31 C31 |

| 31 | 24 23 | 16 15 | 8 7 | 0 |
|---|---|---|---|---|
| C23 C23 C23 C23 C23 C23 C23 C23 | C15 C15 C15 C15 C15 C15 C15 C15 | C7 C7 C7 C7 C7 C7 C7 C7 | 0 0 0 0 0 0 0 0 |

FIG. 2D DEC CARRY INFORMATION

| 63 | 56 55 | 48 47 | 40 39 | 32 |
|---|---|---|---|---|
| 0 0 0 0 0 0 C55 | 0 0 0 0 0 0 0 C47 | 0 0 0 0 0 0 0 C39 | 0 0 0 0 0 0 0 C31 |

| 31 | 24 23 | 16 15 | 8 7 | 0 |
|---|---|---|---|---|
| 0 0 0 0 0 0 C23 | 0 0 0 0 0 0 0 C15 | 0 0 0 0 0 0 0 C7 | 0 0 0 0 0 0 0 0 |

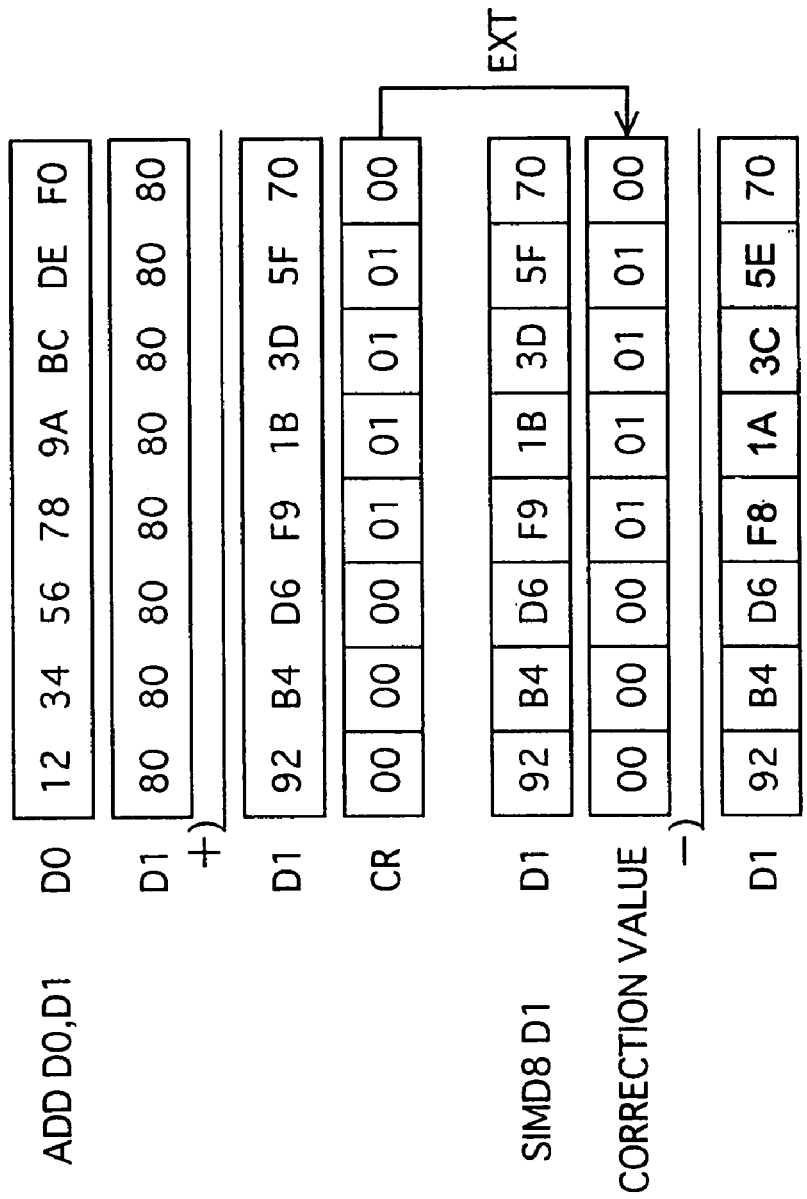

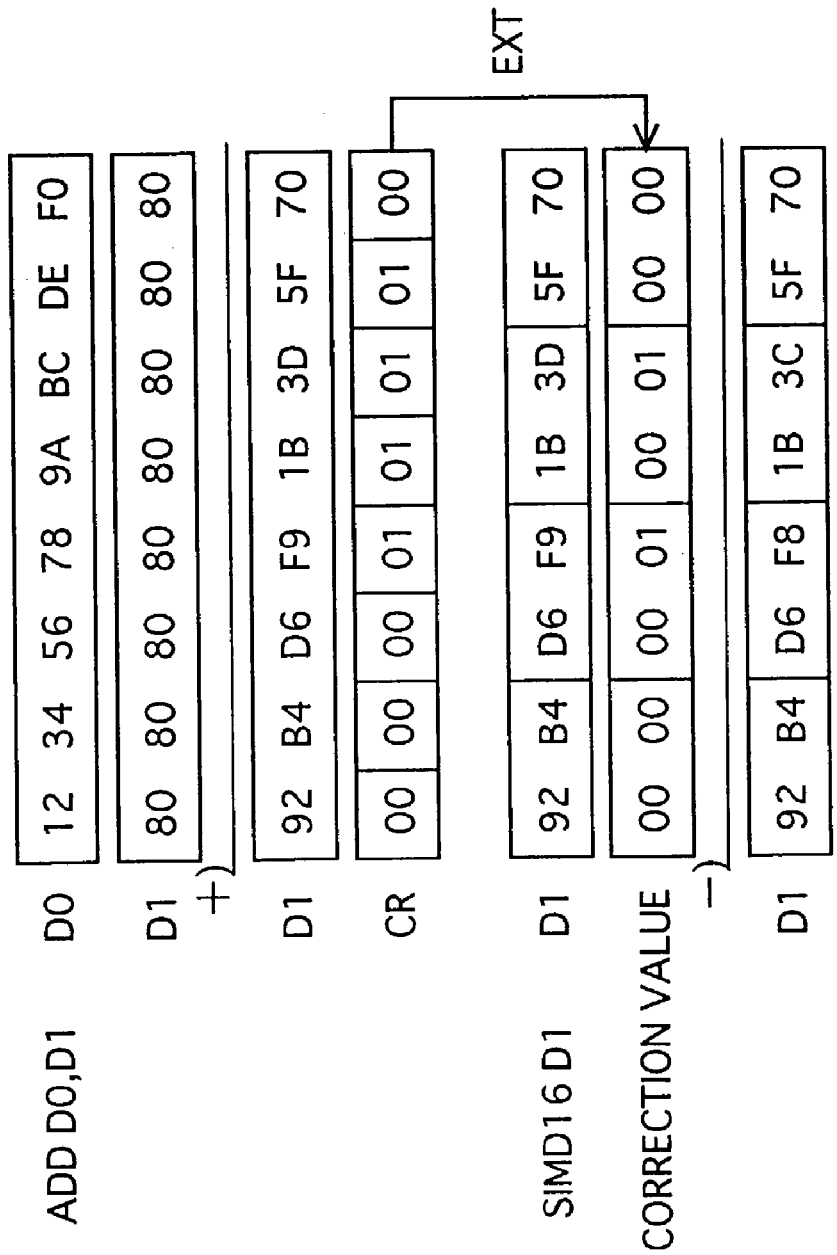

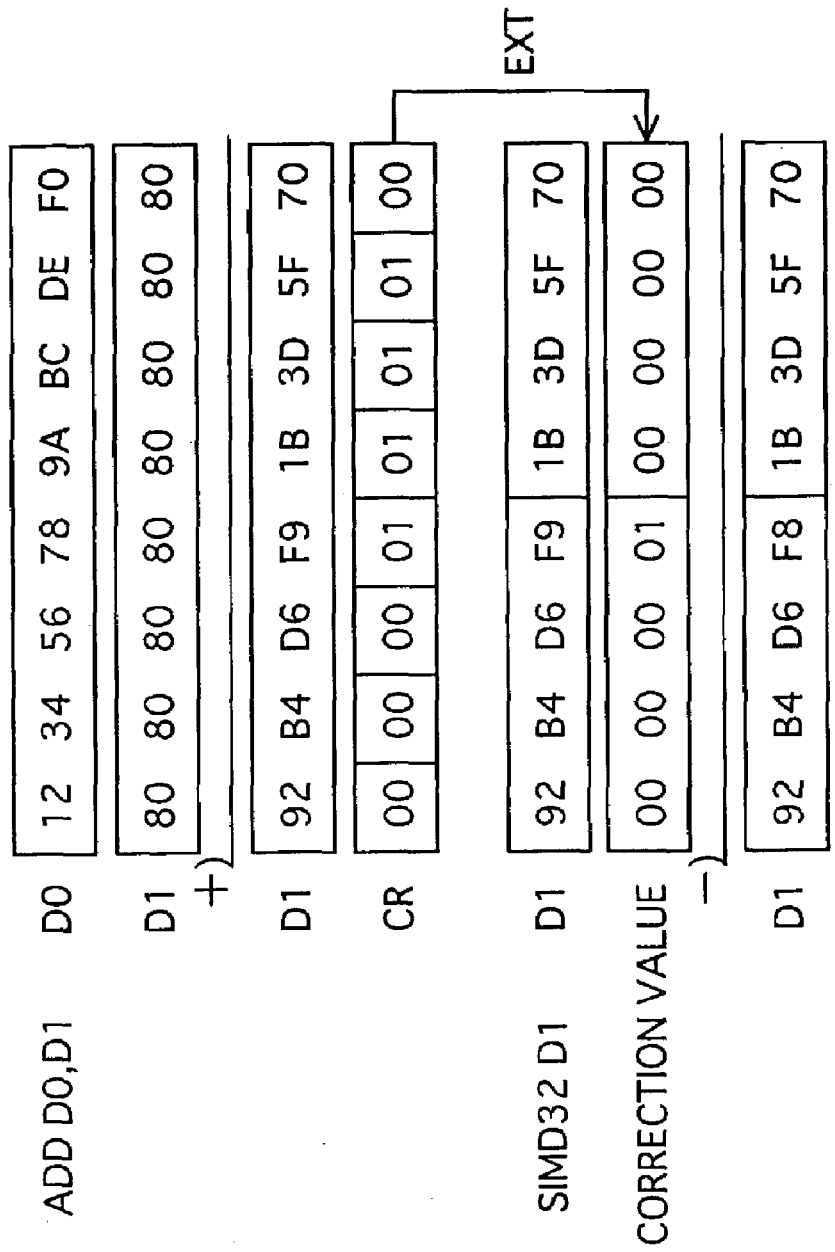

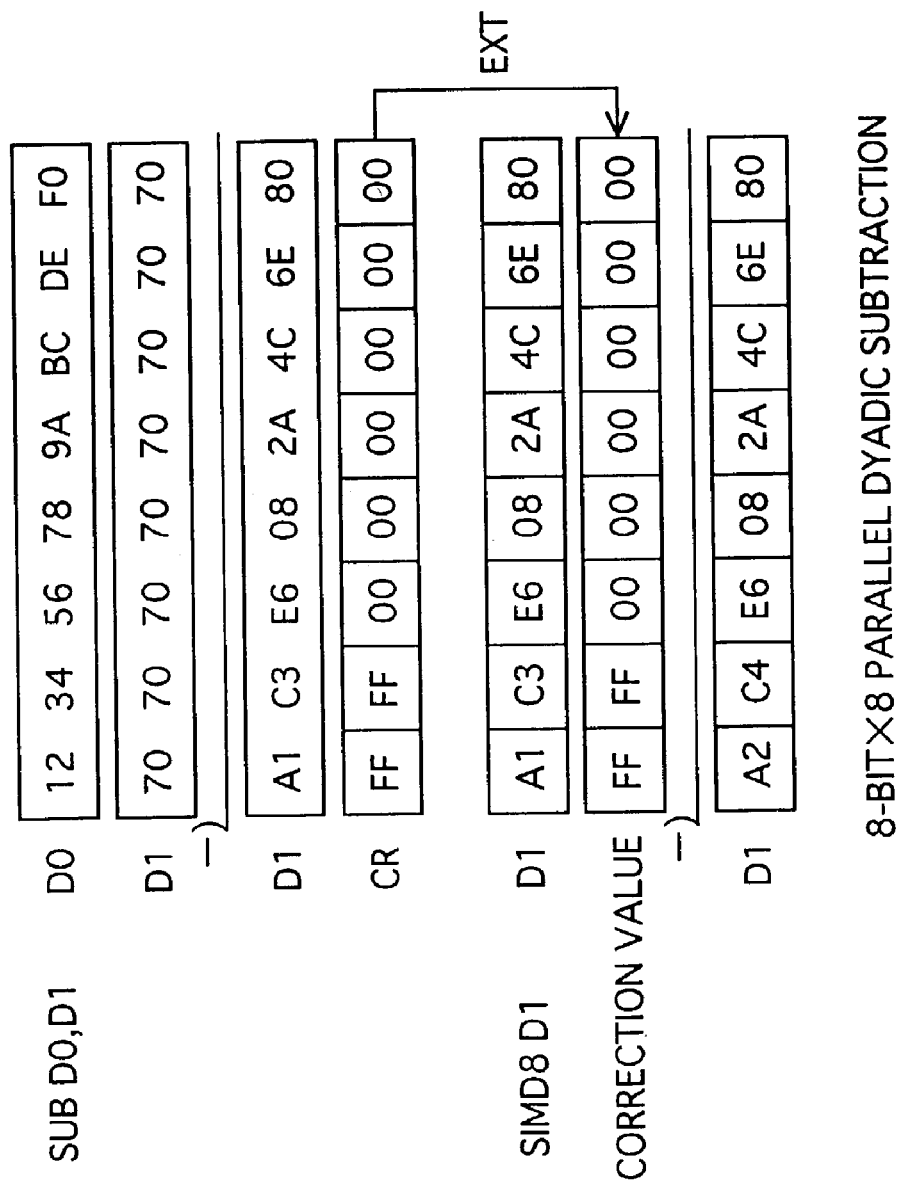

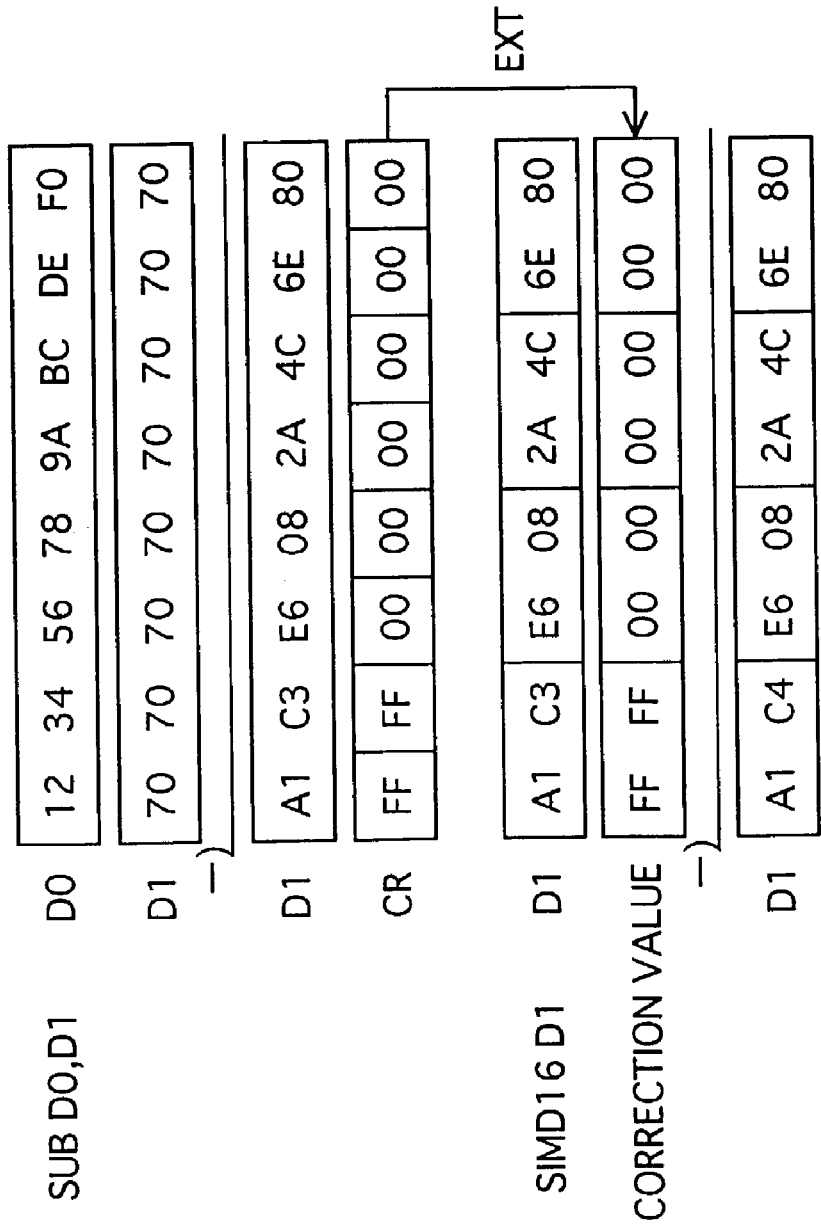

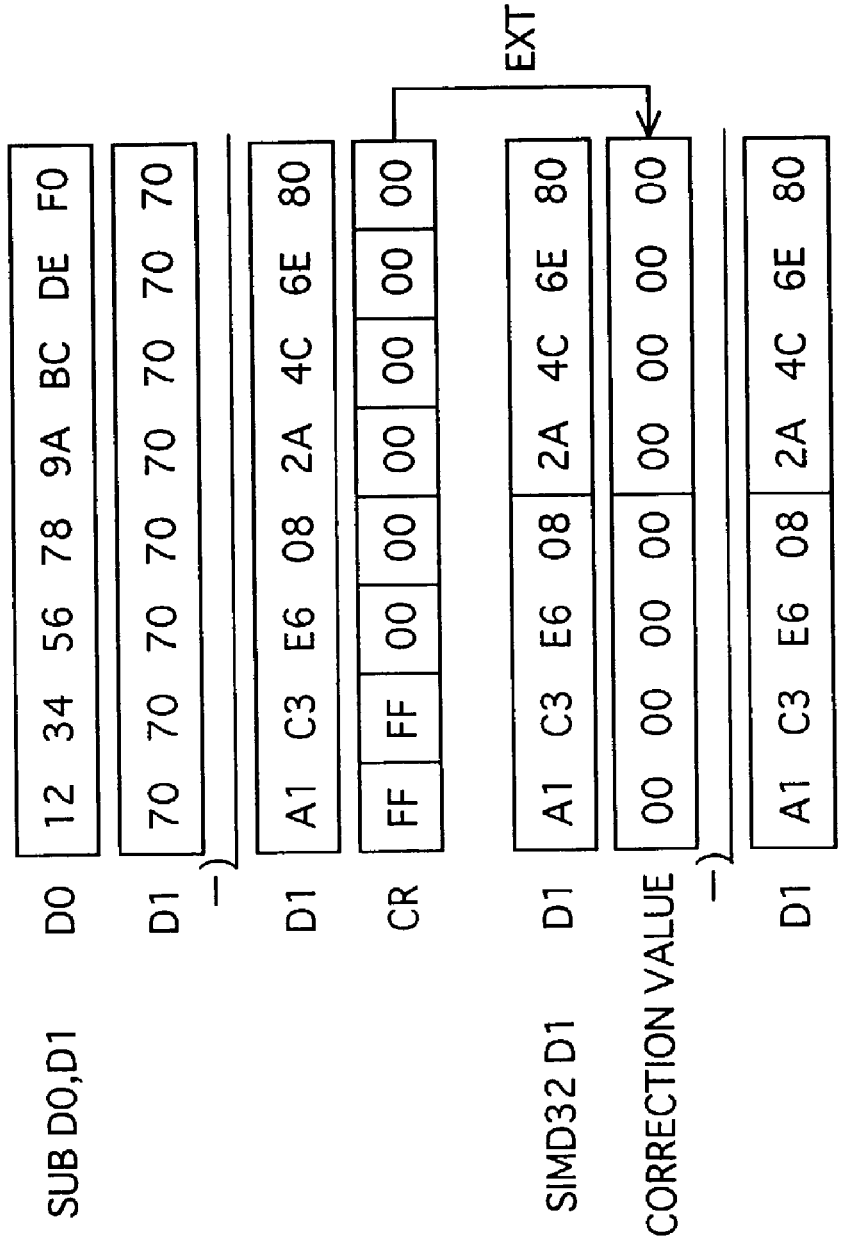

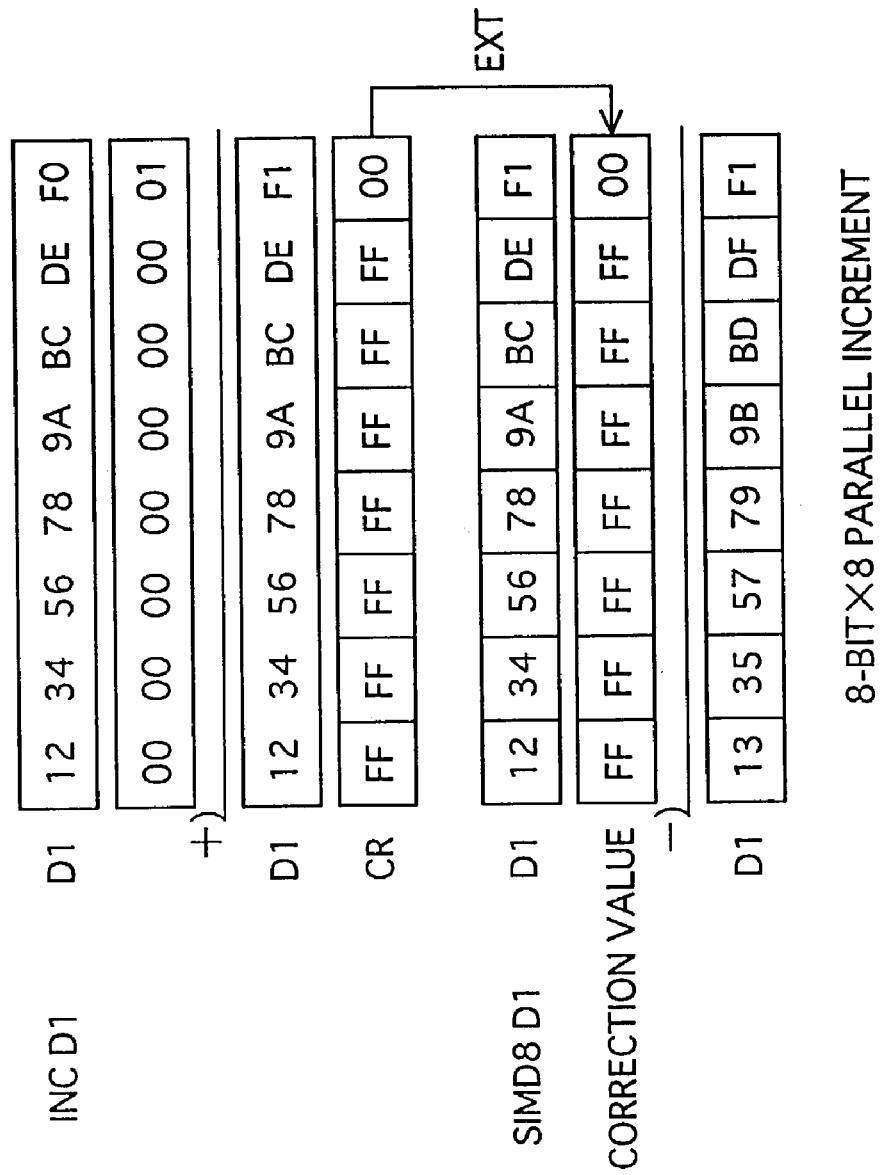

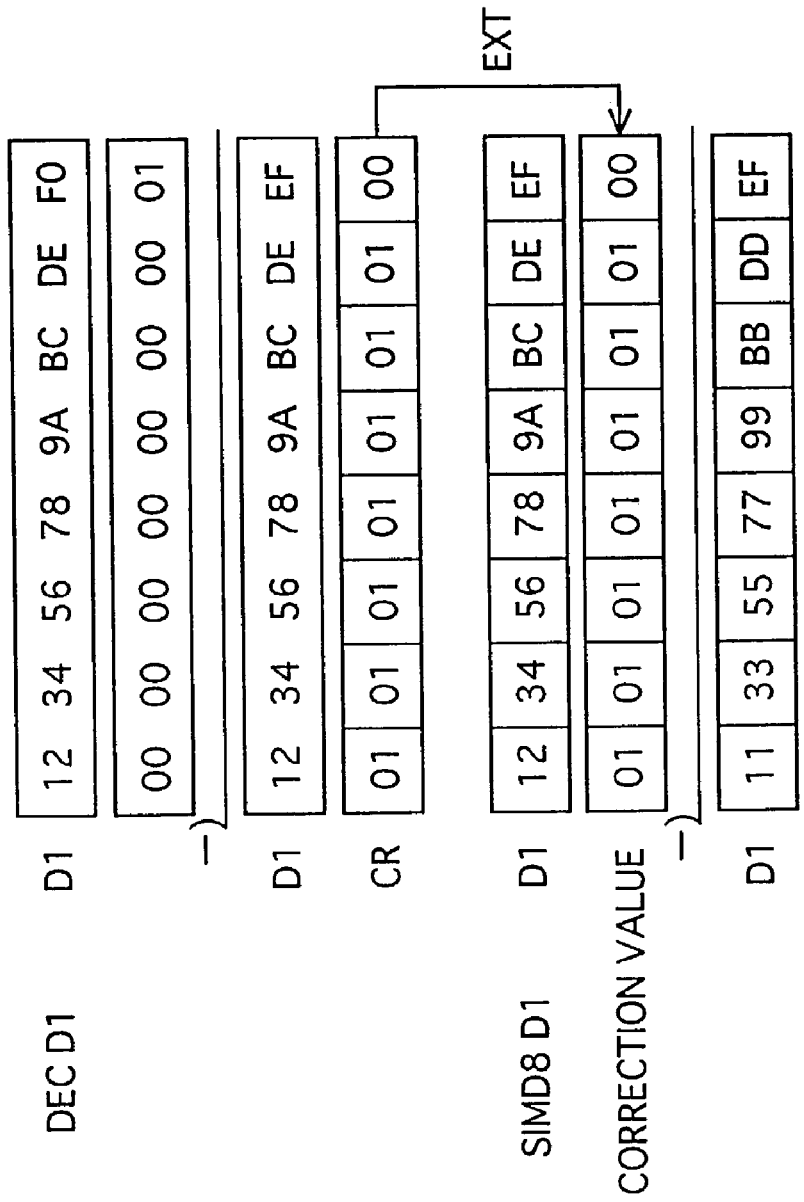

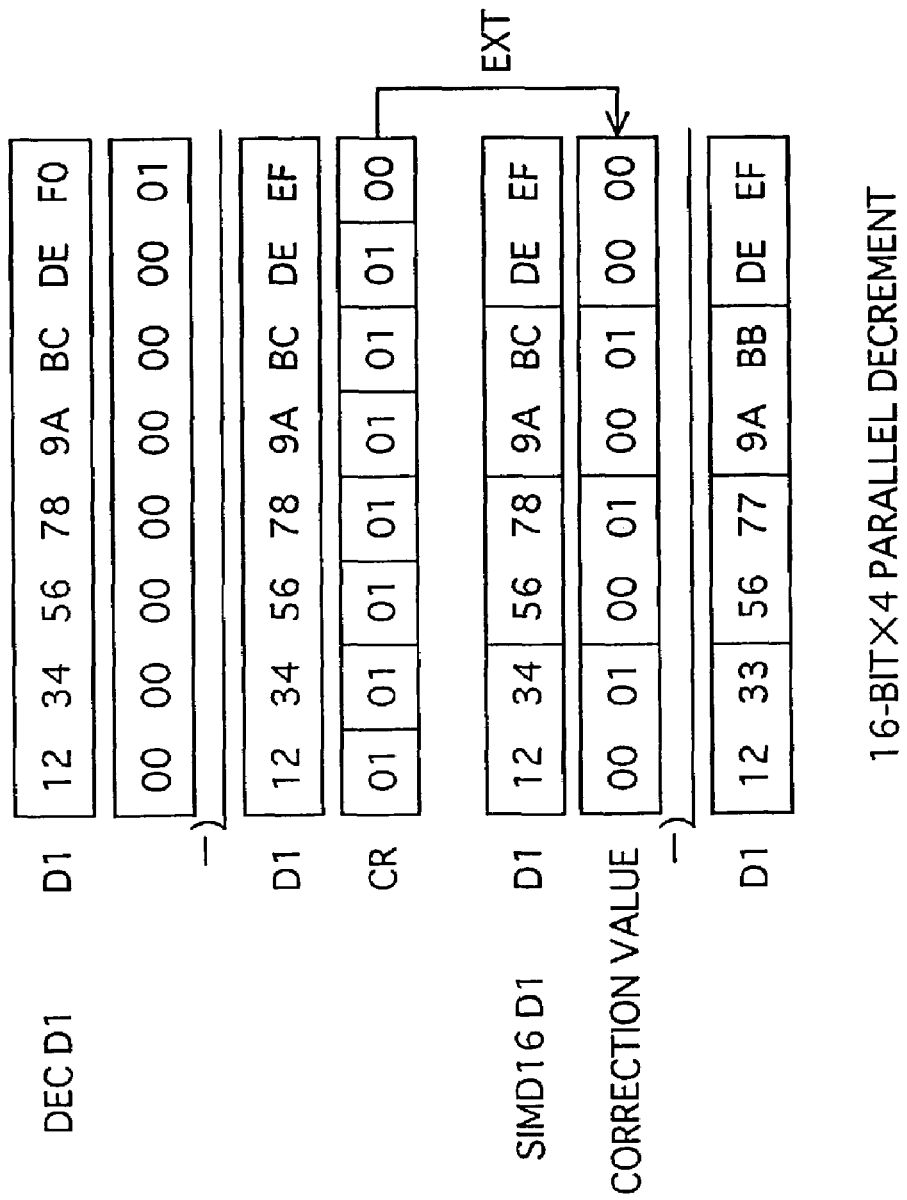

FIG.8A ADD CARRY INFORMATION

FIG.8B SUB CARRY INFORMATION

FIG.8C INC CARRY INFORMATION

FIG.8D DEC CARRY INFORMATION

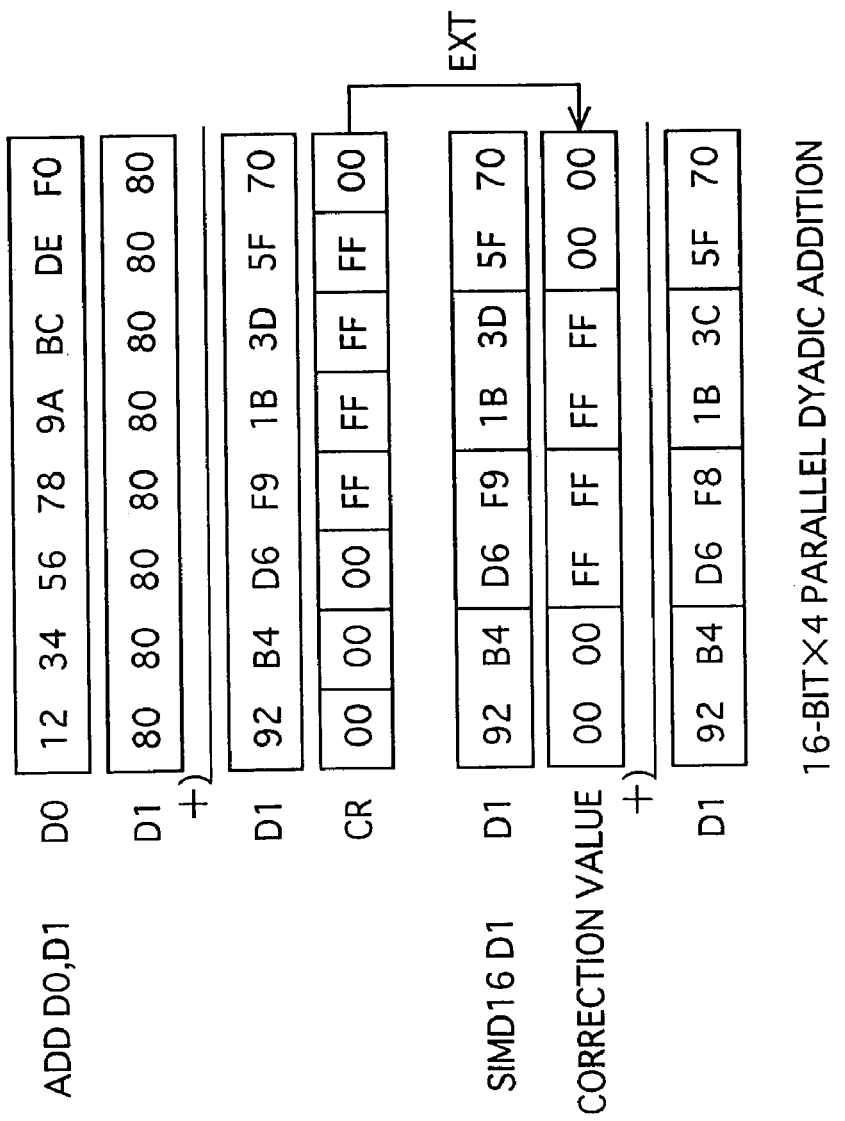

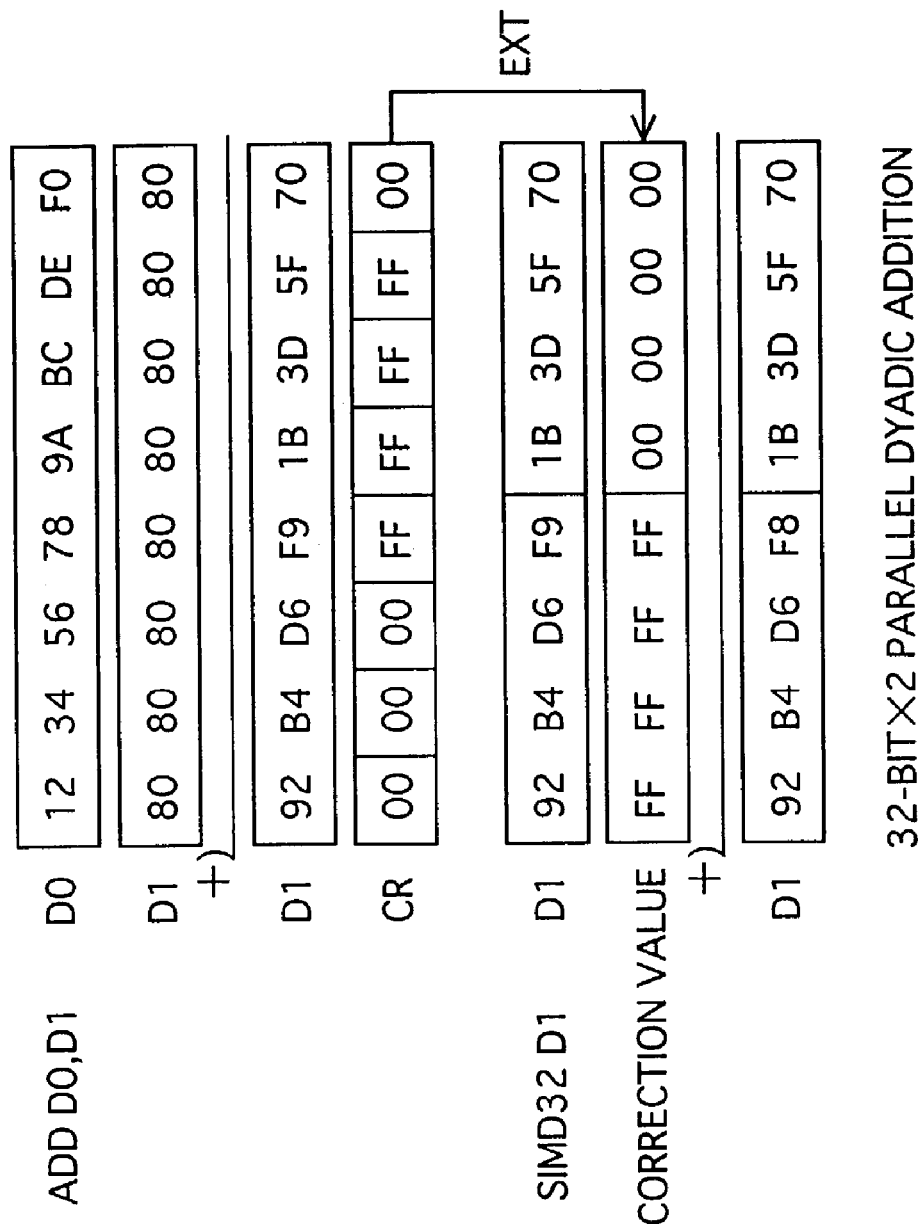

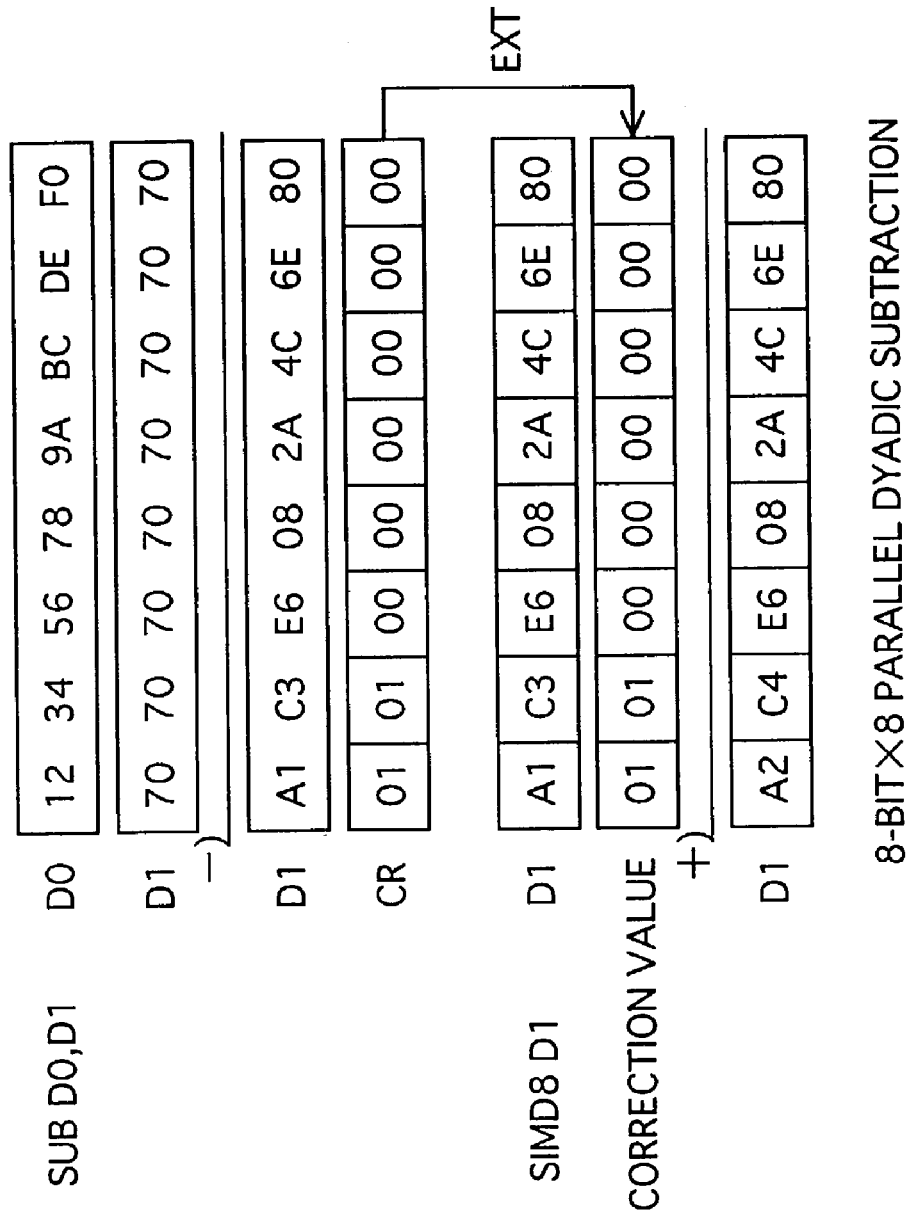

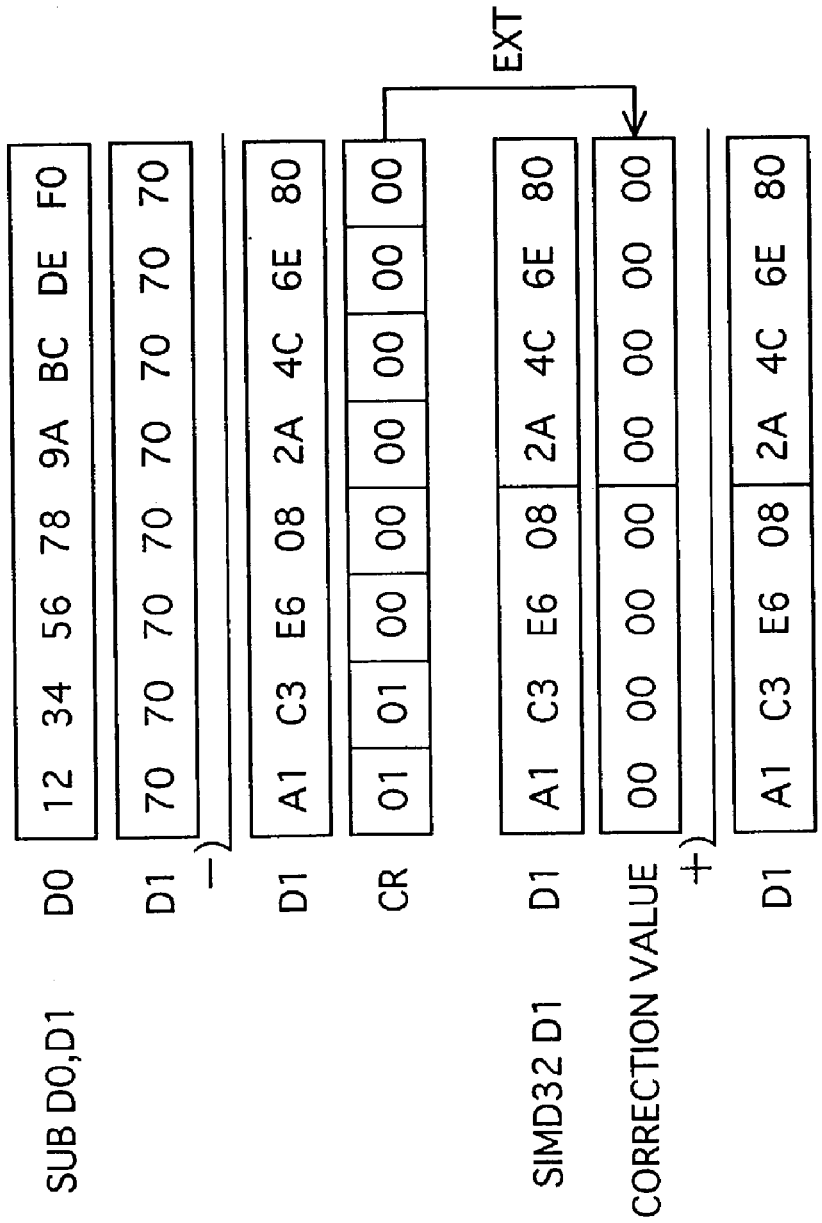

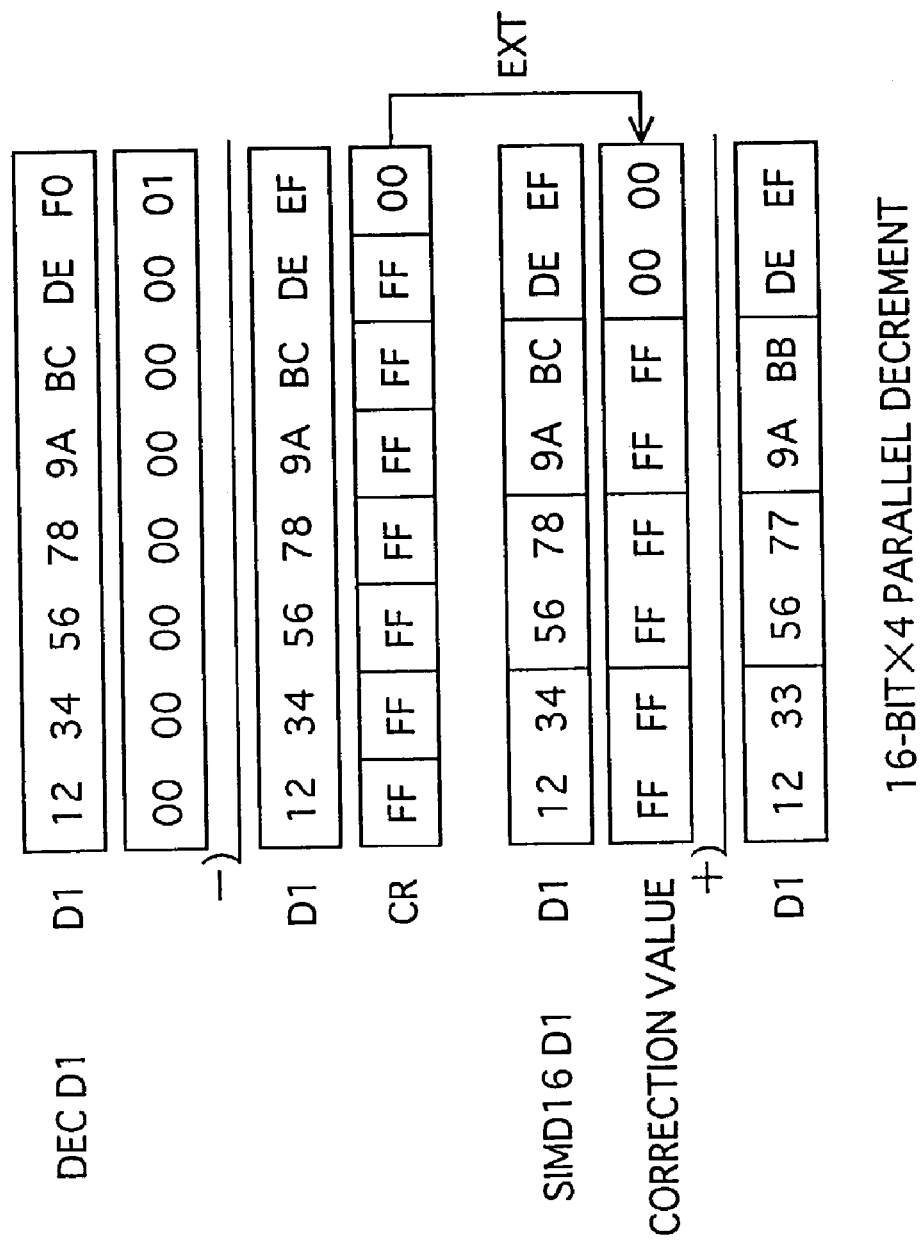

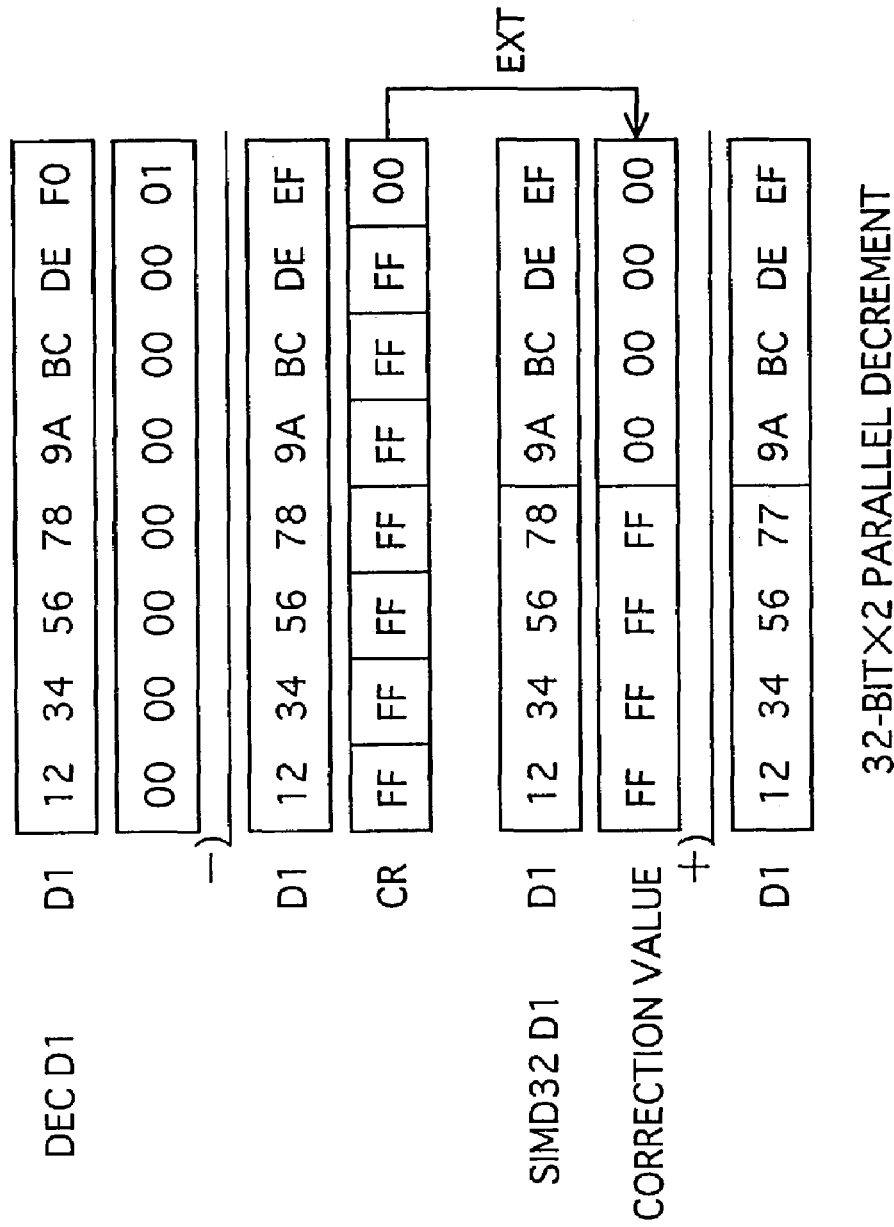

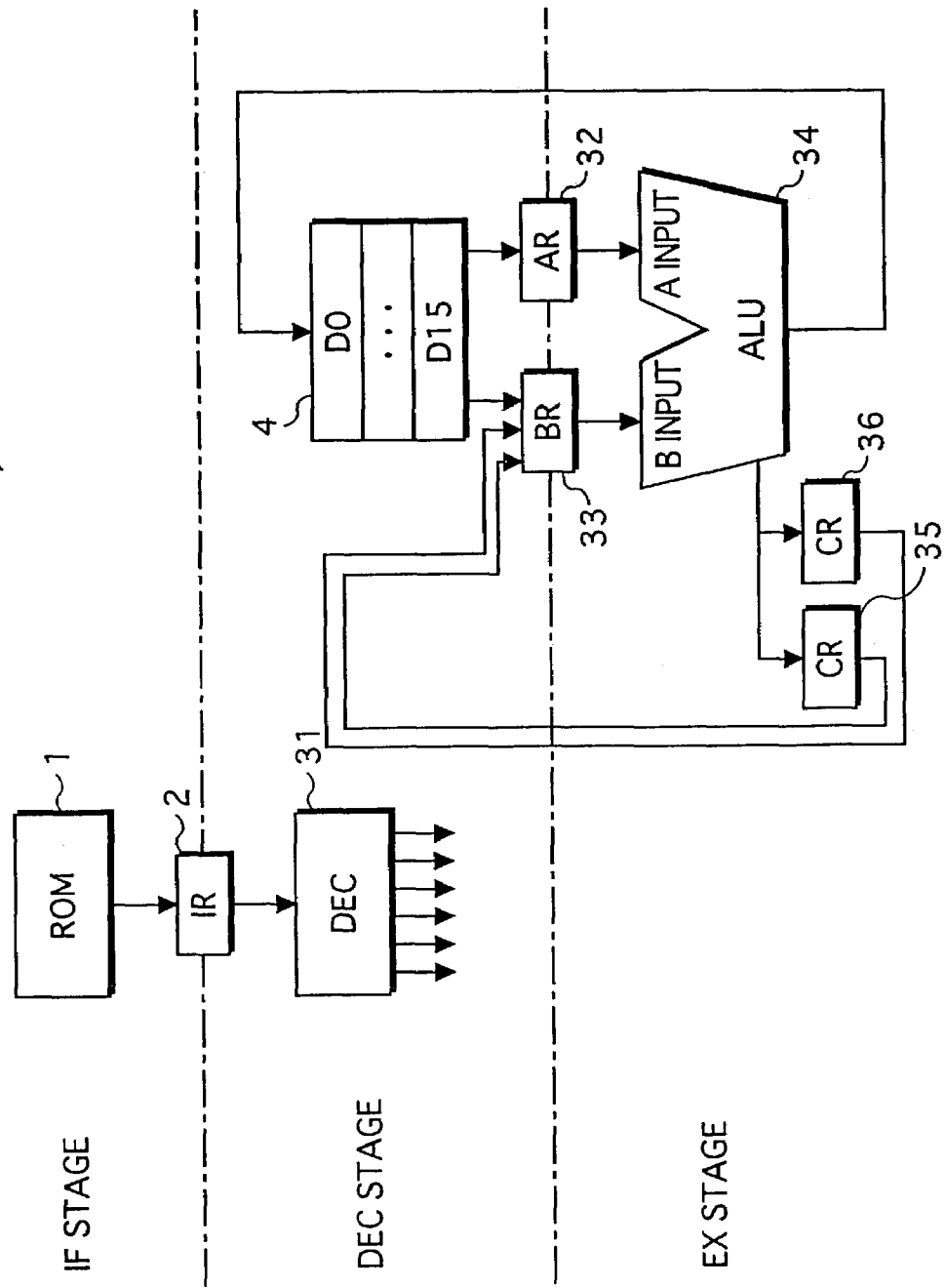

FIG.18

```
main()
{
    char a[],b[],c[];
    ...
    ...
    for (i+0 ; i<64 ; i=++)
        c[i]=a[i]+b[i];
    ...
    ...
}
```

FIG.19

| | |
|---|---|
| INTERMEDIATE CODE 1 | i←0 |
| INTERMEDIATE CODE 2 | c.char[i]←a.char[i]+b.char[i] |
| INTERMEDIATE CODE 3 | i←i+1 |
| INTERMEDIATE CODE 4 | i-64 |
| INTERMEDIATE CODE 5 | branch 2 on[LE] |

FIG.21

MODIFIED INTERMEDIATE CODE 1   i←0
MODIFIED INTERMEDIATE CODE 2   c.char[i,i+7]←a.char[i,i+7]+b.char[i,i+7]
MODIFIED INTERMEDIATE CODE 3   i←i+8
MODIFIED INTERMEDIATE CODE 4   i-64
MODIFIED INTERMEDIATE CODE 5   branch 2 on[LE]

FIG.22

| | |
|---|---|
| SIMD INTERMEDIATE CODE 1 | i←0 |
| SIMD INTERMEDIATE CODE 2 | a←mem(A).64 |
| SIMD INTERMEDIATE CODE 3 | b←mem(B).64 |
| SIMD INTERMEDIATE CODE 4 | c←simd8(a+b) |
| SIMD INTERMEDIATE CODE 5 | mem(C).64←c |
| SIMD INTERMEDIATE CODE 6 | A←A+8 |
| SIMD INTERMEDIATE CODE 7 | B←B+8 |
| SIMD INTERMEDIATE CODE 8 | C←C+8 |
| SIMD INTERMEDIATE CODE 9 | i←i+8 |
| SIMD INTERMEDIATE CODE 10 | i-64 |
| SIMD INTERMEDIATE CODE 11 | branch 2 on[LE] |

FIG23

| | |
|---|---|
| INSTRUCTION 1 | SUB D0,D0 |
| INSTRUCTION 2 | LDL @(D1),D2 |
| INSTRUCTION 3 | LDL @(D3),D4 |
| INSTRUCTION 4 | ADD D2,D4 |
| INSTRUCTION 5 | SIMD8 D4 |
| INSTRUCTION 6 | STL D4,@(D5) |
| INSTRUCTION 7 | ADD #8,D1 |
| INSTRUCTION 8 | ADD #8,D3 |
| INSTRUCTION 9 | ADD #8,D5 |
| INSTRUCTION 10 | ADD #8,D0 |
| INSTRUCTION 11 | CMP #64,D0 |
| INSTRUCTION 12 | BLE -10 |

SIMD OPERATION METHOD AND SIMD OPERATION APPARATUS THAT IMPLEMENT SIMD OPERATIONS WITHOUT A LARGE INCREASE IN THE NUMBER OF INSTRUCTIONS

BACKGROUND OF THE INVENTION

(1) Field of the Invention

The present invention relates to SIMD (Single Instruction Multiple Data), which is a technique for increasing processing speed in a microprocessor by applying a same operation to a plurality of operands with one instruction.

(2) Description of the Related Art

In multimedia data processing of images and audio it is often necessary to apply the same calculation processing to an enormous amount of data, for example when a filter is applied to an image to change the color, quality or the like of the image.

An ordinary processor that does not implement SIMD must execute one instruction for each piece of data, and consequently takes a long time to process multimedia data.

In contrast, a processor that implements SIMD is capable of simultaneously processing a plurality of pieces of data with one instruction, and therefore greatly reducing the amount of time required to process multimedia data.

The rise in recent years in multimedia devices has been accompanied by various types of processors being constructed to implement SIMD operation instructions, due to the considerable effectiveness of SIMD as a technique for multimedia data processing.

A 64-bit processor, for example, implements three types of SIMD instructions that execute parallel addition operations: an ADDS 8 instruction that executes eight parallel operations to add pieces of 8-bit data, an ADDS 16 instruction that executes four parallel operations to add pieces of 16-bit data, and an ADDS 32 instruction that executes two parallel operations to add pieces of 32-bit data.

The total number of SIMD operation instructions is the product of the number of data sizes subject to parallel operation and the number of types of operations. Therefore, the number of instructions increases dramatically when a there are a plurality of data sizes.

A large number of instructions makes bit allocation of machine language instructions difficult, and means that a relatively large instruction decoder circuit is required in the processor. This results in increases in cost and power consumption.

In addition, implementing SIMD operations in a RISC instruction set architecture causes problems in that the original advantage of the RISC instruction set architecture, i.e. only executing several tens of instructions, is lost.

SUMMARY OF THE INVENTION

The object of the present invention is to provide an operation method, an operation apparatus, a program conversion apparatus that converts a program for the operation apparatus, a compiler that generates the program for the operation apparatus, a program conversion method, a compiling method, a program conversion program, a compiling program, an operation program, and a recording medium on which an operation program is recorded, that implement SIMD operations without a large increase in the number of instructions.

An operation method of the present invention is an operation method for having processing executed on a computer, the processing applying a same type of operation in parallel to N M-bit operands to obtain N M-bit operation results, N being an integer equal to or greater than 2 and M being an integer equal to or greater than 1, the operation method including: an operation step of applying the type of operation to an N*M-bit provisional operand that is formed by concatenating the N M-bit operands, to obtain one N*M-bit provisional operation result, and generating correction information based on an effect had, by applying the operation, on each M bits of the provisional operation result from a bit that neighbors the M bits; and a correction step of correcting the provisional operation result in M-bit units with use of the correction information, to obtain the N M-bit operation results.

According to the stated structure, N M-bit operands are subject to operation at once, and N M-bit operation results are obtained by correcting the operation result with use of the correction information. This enables a considerable reduction in the amount of time taken to apply the same type of operation to a large amount of data.

Furthermore, in a processor in which the operation method is used, an operation instruction can be commonly used for existing operations and SIMD operations, and the correction instructions are not related to the type of operation. Therefore, since the number of instructions does not increase relative to the number of types of operations, the present invention can implement SIMD operations with relatively few increases in costs and power consumption that are brought about by problems with bit allocation for machine language instructions and large scale decoder circuits, compared with an operation method that implements conventional SIMD operation instructions.

Accordingly, the present invention is able to implement SIMD operations without a large increase in the number of instructions.

Here, in the correction step, M least significant bits of the provisional operation result may be excluded from being corrected.

According to the stated structure, by excluding the M least significant bits of the provisional operation result from correction, it is not necessary to correct the M least significant bits, which are not influenced by the operation, in cases in which a carry from an operation before a carry flag was used is not taken into account.

Here, the operation method may further execute on a computer, processing that applies the same type of operation in parallel to N/P M*P-bit operands to obtain N/P M*P-bit operation results, P being an integer equal to or greater than 2 and equal to or less than N/2, wherein the operation step applies the type of operation to an N*M-bit provisional operand to obtain one N*M-bit provisional operation result, the N*M-bit provisional operand being formed by concatenating one of (a) the N M-bit operands and (b) the N/P M*P-bit operands, and generates the correction information, and the correction step corrects, in M*P-bit units, the provisional operation results that correspond to only parts of an effect on each M*P bits of the correction information, to obtain the N/P M*P-bit operation results.

According to the stated structure, by subjecting N/P M*P-bit operands to an operation at once and correcting the result using only the portions in the correction information that correspond to each M*P bit, N/P M*P-bit operation results can be obtained.

Furthermore, in a processor in which the operation method is used, operation instructions can be commonly used for existing operations and SIMD operations, and the correction instruction is not related to the type of operation.

Since the number of instructions is not the product of the number of types of operations and the number of sizes, and a dramatic increase in the number of instructions is avoided, the present invention can implement SIMD operations with relatively few increases in costs and power consumption that are brought about by problems with bit allocation for machine language instructions and large scale decoder circuits, compared with an operation method that implements conventional SIMD operation instructions.

Accordingly, the present invention is able to implement SIMD operations without a large increase in the number of instructions.

Here, respective values of N, M and P may be one of (a) N=8, M=8 and P=one of (i) 2, (ii) 4, and (iii) 2 and 4, and (b) N=4, M=16 and P=2.

According to the stated structure, in a 64-bit microprocessor, by processing eight 8-bit operands, four 16-bit operands, or two 32-bit operands at once, and correcting every eight bits, sixteen bits, or thirty-two bits, respectively, eight 8-bit operation results, four 16-bit operation results, or two 32-bit operation results, respectively, are obtained.

Here, the type of operation may be any one of a plurality of types of operations, the operation step, when a least significant bit is considered to be a first bit, may generate the correction information, in M-bit units, based on the type of operation and a carry from an M*L-th bit to an M*L+1-th bit according to the operation, the M*L+1-th bit having a value of one of (a) 0 or 1 and (b) 0 or −1, L being N integers from 0 to N−1, and the correction step may perform, regardless of the type of the operation, one of (a) adding the correction information to the provisional operation result in M-bit units, and (b) subtracting the correction information from the provisional operation result in M-bit units, to obtain the N M-bit operation results.

According to the stated structure, correction information is generated based on the type of operation and whether there is a carry for each M bits. In the correction operation 0 and 1, or 0 and −1 are used to show whether there is a carry for each M bits. The correction information is either added to or subtracted from the provisional operation result in M-bit units. Accordingly, N M-bit operation results are obtained.

Here, the plurality of types of operations may include at least one of increment, decrement, dyadic add, and dyadic subtract, the operation step, (a) when the type is increment, may generate the correction information, each M*L+1-th bit without a carry according to the operation being represented by a value −1 in the correction information, and each M*L+1-th bit with a carry according to the operation being represented by a value 0 in the correction information, (b) when the type is decrement, may generate the correction information, each M*L+1-th bit without a carry according to the operation being represented by a value 0 in the correction information, and each M*L+1-th bit with a carry according to the operation being represented by a value 1 in the correction information, (c) when the type is dyadic add, may add a first provisional operand and a second provisional operand to obtain one N*M-bit provisional operation result, the first provisional operand being formed by concatenating N M-bit operands, and the second provisional operand being formed by concatenating N M-bit operands, and generate the correction information, each M*L+1-th bit without a carry according to the operation being represented by a value 0 in the correction information, and each M*L+1-th bit with a carry according to the operation being represented by a value 1 in the correction information, and (d) when the type is dyadic subtract, may subtract the second provisional operand from the first provisional operand to obtain one N*M-bit provisional operation result, and generate the correction information, each M*L+1-th bit without a carry according to the operation being represented by a value −1 in the correction information, and each M*L+1-th bit with a carry according to the operation being represented by a value 0 in the correction information, and the correction step may subtract the correction information from the provisional operation result in M-bit units, to obtain the N M-bit operation results.

According to the stated structure, when the operation type is increment or dyadic add, carry information is generated in which an M*L+1-th bit that does not have a carry is represented by −1, and an M*L+1-th bit that does have a carry is represented by 0. Furthermore, when the operation type is decrement or dyadic subtract, carry information is generated in which an M*L+1-th bit that does not have a carry is represented by 0, and an M*L+1-th bit that does have a carry is represented by 1. By subtracting the correction information from the provisional operation result in M-bit units, N M-bit operation results can be obtained.

Here, the plurality of types of operations may include at least one of increment, decrement, dyadic add, and dyadic subtract, the operation step, (a) when the type is increment, may generate the correction information, each M*L+1-th bit without a carry according to the operation being represented by a value 1 in the correction information, and each M*L+1-th bit with a carry according to the operation being represented by a value 0 in the correction information, (b) when the type is decrement, may generate the correction information, each M*L+1-th bit without a carry according to the operation being represented by a value 0 in the correction information, and each M*L+1-th bit position with a carry according to the operation being represented by a value −1 in the correction information, (c) when the type is dyadic add, may add a first provisional operand and a second provisional operand to obtain one N*M-bit provisional operation result, the first provisional operand being formed by concatenating N M-bit operands, and the second provisional operand being formed by concatenating N M-bit operands, and generate the correction information, each M*L+1-th bit without a carry according to the operation being represented by a value 0 in the correction information, and each M*L+1-th bit with a carry according to the operation being represented by a value −1 in the correction information, and (d) when the type is dyadic subtract, may subtract the second provisional operand from the first provisional operand to obtain one N*M-bit provisional operation result, and generates the correction information, each M*L+1-th bit without a carry according to the operation being represented by a value 1 in the correction information, and each M*L+1-th bit with a carry according to the operation being represented by a value 0 in the correction information, and the correction step may add the correction information and the provisional operation result in M-bit units, to obtain the N M-bit operation results.

According to the stated structure, when the operation type is increment or dyadic add, carry information is generated in which an M*L+1-th bit that does not have a carry is represented by 1, and an M*L+1-th bit that does have a carry is represented by 0. Furthermore, when the operation type is decrement or dyadic subtract, carry information is generated in which an M*L+1-th bit that does not have a carry is represented by 0, and an M*L+1-th bit that does have a carry is represented by −1. By adding the correction information and the provisional operation result in M-bit units, N M-bit operation results can be obtained.

Here, the type of operation may be any one of a plurality of types of operations, the operation step may further store type information showing the type, and the correction step may correct the provisional operation result according to the stored type information.

According to the stated structure, the type of operation is stored while the operation is performed, and the provisional operation result is corrected according to the type of operation. Therefore, correction information can be generated without having to take the type of operation into account.

Here, the operation step may generate, as the correction information, information showing whether there is a carry from lower bits to corresponding higher bits.

According to the stated structure, as well as storing the type of instruction, the information showing whether there is a carry from each less significant bit to the corresponding more significant bit is stored, then the correction information is converted according to the stored type of operation. Accordingly, the provisional operation result can be corrected correctly.

Here, the plurality of types of operations may include at least one of increment, decrement, dyadic add, and dyadic subtract, the correction step, in order to obtain the N M-bit operation results, where L is N integers from 0 to N−1, and when a least significant bit is considered to be a first bit, (a) when the stored type information shows one of increment and dyadic add, may add 1 to each M*L+1-th bit without a carry in the provisional operation result, based on the generated correction information, and (b) when the stored type information shows one of decrement and dyadic subtract, may subtract 1 from each M*L+1-th bit with a carry in the provisional calculation result, based on the generated correction information.

According to the stated structure, when the stored type of operation is increment or dyadic add, 1 is added to an M*L+1-th bit that does not have a carry, and when the when the stored type of operation is decrement or dyadic subtract, 1 is subtracted from an M*L+1-th bit that has a carry. Accordingly, the provisional operation result can be corrected correctly.

An operation method of the present invention is an operation method for having processing executed on a computer, the processing applying a same type of operation in parallel to N operands to obtain N operation results, N being an integer equal to or greater than 2, the operation method including: an operation step of applying the type of operation to a provisional operand that is formed by concatenating the N operands, to obtain one first provisional operation result that is N times a size of each of the N operation results, and generating correction information that corresponds to a difference between the first provisional operation result and a second provisional operation result, the second provisional operation result being formed by concatenating the N operation results; and a correction step of correcting the first provisional operation result with use of the correction information, and dividing a result of the correction into N pieces, to obtain the N operation results.

According to the stated structure, N operands are subject to operation at once, and N operation results are obtained by correcting the operation result with use of the correction information. This enables a considerable reduction in the amount of time taken to apply the same type of operation to a large amount of data.

Furthermore, in a processor in which the operation method is used, operation instructions can be commonly used for existing operations and SIMD operations, and the correction instruction is not related to the type of operation. Therefore, since the number of instructions does not increase relative to the number of types of operations, the present invention can implement SIMD operations with relatively few increases in costs and power consumption that are brought about by problems with bit allocation for machine language instructions and large scale decoder circuits, compared with an operation method that implements conventional SIMD operation instructions.

Accordingly, the present invention is able to implement SIMD operations without a large increase in the number of instructions.

Here, when M is an integer equal to or greater than 1, each operand is M bits in length, and each operation result is M*2 bits in length, the operation step may apply the type of operation to an N*M-bit provisional operand that is formed by concatenating the N operands, to obtain one N*M*2-bit provisional operation result, and generate correction information based on an effect had, by applying the operation, on each M*2 bits of the provisional operation result from another M*2 bits.

According to the stated structure, by subjecting N M-bit operands to an operation at once and correcting the result using the correction information, N M*2-bit operation results can be obtained.

Here, the operation method may further execute on a computer, processing that applies a same type of operation in parallel to N/P M*P-bit operands to obtain N/P M*P*2-bit operation results, P being an integer equal to or greater than 2 and equal to or less than N/2, wherein the operation step applies the type of operation to one N*M-bit provisional operand to obtain one N*M*2-bit provisional operation result, the N*M-bit provisional operand being formed by concatenating one of (a) the N M-bit operands and (b) the N/P M*P-bit operands, and, when L is N−1 integers from 1 to N−1 and a least significant bit is considered to be a first bit, generates first correction information, for each M*2 bits, based N−1 effects by the type of operation between (i) the M*2*L-th bit and lower bits and (ii) the M*2*L+1 bit and higher bits, and generates second correction information, for each M*2*P bits, based on N/P-1 effects by the type of operation between (iii) the M*2*P*L-th bit and lower bits and (iv) the M*2*L+1-th bit and higher bits, and the correction step corrects the provisional operation result with use of the first correction information, to obtain the N M*2-bit operation results, and corrects the provisional operation result with use of the second correction information, to obtain the N/P M*P*2-bit operation results.

According to the stated structure, by subjecting N M-bit operands or N/P M*P-bit operations to an operation at once and generating first correction information and second correction information, N M-bit operation results can be obtained by correcting using the first correction information, and N/P M*P-bit operation results can be obtained by correcting using the second correction information.

Here, it is preferable that N=8, M=4, P=2, and the type of operation is multiply.

According to the stated structure, in a 64-bit microprocessor, when four 8-bit operands or two 16-bit operands are subject to an operation, four 16(=8*2)-bit operation results are obtained when the provisional operation result is corrected using the first correction information, and two 32(=16*2)-bit operation results are obtained when the provisional operation result is corrected using the second correction information.

An operation apparatus of the present invention executes (a) an existing operation for applying a predetermined type of operation to a first-bit-length operand, and (b) an SIMD (Single Instruction Multiple Data) operation for applying the same predetermined type of operation in parallel to a plurality of second-bit-length operands, the second bit-length being shorter than the first bit-length, the operation apparatus implementing: an operation instruction for instructing application of the predetermined type of operation on one of (c) the first-bit-length operand, and (d) the plurality of second-bit-length operands concatenated and considered to be a first-bit-length operand; and an SIMD correction instruction for instructing correction of an operation result of the operation instruction to an operation result of the SIMD operation.

According to the stated structure, the operation apparatus implements an operation instruction and an SIMD correction instruction, the operation instruction being performed on one long operand or on a plurality of short operands that are considered to be one long operand.

Furthermore, the operation apparatus is able to use operation instructions commonly for existing operations and SIMD operations, and the correction instruction is not related to the type of operation. Since the number of instructions is not the product of the number of types of operations and the number of sizes, and a dramatic increase in the number of instructions is avoided, the present invention can implement SIMD operations with relatively few increases in costs and power consumption that are brought about by problems with bit allocation for machine language instructions and large scale decoder circuits, compared with an operation method that implements conventional SIMD operation instructions.

Accordingly, the present invention is able to implement SIMD operations without a large increase in the number of instructions.

Here, when N is an integer equal to or greater than 2, and M is an integer equal to or greater than 1, the operation apparatus may execute (a) the existing operation that applies the predetermined type of operation to one N*M-bit first-bit-length operand, to obtain one N*M-bit first-bit-length operation result, and (b) the SIMD operation used for applying N parallel operations that applies the same predetermined type of operation in parallel to N M-bit second-bit-length second operands, to obtain N M-bit second-bit-length operation results, and include: a storage unit operable to store the first-bit-length operation result, and correction information that is used in the correction; a decoding unit operable to decode the operation instruction and the SIMD correction instruction used for applying N parallel operations; and an execution unit operable, (a) when the operation instruction is decoded, to apply the predetermined type of operation to one of (i) the first-bit-length operand, and (ii) the N second-bit-length operands concatenated and considered to be a first-bit-length operand, to obtain one N*M-bit first-bit-length operation result, store the obtained N*M-bit first-bit-length operation result in the storage unit, and generate correction information based on an effect had, by applying the predetermined type of operation, on each M bits of the N*M-bit first-bit-length operation result from a bit that neighbors the M bits, and store the generated correction information in the storage unit, and (b) when the SIMD correction instruction used for applying N parallel operations is decoded, to correct the stored first-bit-length operation result in M-bit units using the stored correction information, to obtain the N second-bit-length operation results.

According to the stated structure, by subjecting N/P M*P-bit operands to an operation at once and correcting the result using only the portions in the correction information that correspond to each M*P bit, N/P M*P-bit operation results can be obtained.

Here, the execution unit, when the SIMD correction instruction used for applying N parallel operations is decoded, may exclude M least significant bits of the first-bit-length operation result from being corrected.

According to the stated structure, by excluding the M least significant bits of the first bit-length operation result from correction, it is not necessary to correct the M least significant bits, which are not influenced by the operation, in cases in which a carry from an operation before a carry flag was used is not taken into account.

Here, the operation apparatus may further execute the SIMD operation used for applying N/P parallel operations that applies the same predetermined type of operation in parallel to N/P M*P-bit third-bit-length operands, to obtain N/P M*P-bit third-bit-length operation results, P being an integer equal to or greater than 2 and equal to or less than N/2, wherein the decoding unit further decodes the SIMD correction instruction used for applying N/P parallel operations, and the execution unit, (a) when the operation instruction is decoded, applies the predetermined type of operation to the first-bit-length operand, the first bit-length operand being one of (i) the N second-bit-length operands concatenated and considered to be a first-bit-length operand, and (ii) the N/P third-bit-length operands concatenated and considered to be a first-bit-length operand, to obtain a first-bit-length operation result, stores the obtained first-bit-length operation result in the storage unit, generates the correction information based on an effect had, by applying the operation, on each M bits of the first bit-length operation result from a bit that neighbors the M bits, and stores the generated correction information in the storage unit, and (b) when the SIMD operation used for applying N/P parallel operations is decoded, corrects the stored first-bit-length operation result in M*P-bit units, using only parts of the stored correction information that correspond to an effect on each M*P-bit unit.

According to the stated structure, by subjecting N/P M*P-bit operands to an operation at once and correcting the result using only the portions in the correction information that that correspond to each M*P bit, N/P M*P-bit operation results can be obtained.

Furthermore, the operation apparatus is able to use operation instructions commonly for existing operations and SIMD operations, and the correction instruction is not related to the type of operation. Since the number of instructions is not the product of the number of types of operations and the number of sizes, and a dramatic increase in the number of instructions is avoided, the present invention can implement SIMD operations with relatively few increases in costs and power consumption that are brought about by problems with bit allocation for machine language instructions and large scale decoder circuits, compared with an operation method that implements conventional SIMD operation instructions.

Accordingly, the present invention is able to implement SIMD operations without a large increase in the number of instructions.

Here, wherein respective values of N, M and P may be one of (a) N=8, M=8 and P=one of (i) 2, (ii) 4, and (iii) 2 and 4, and (b) N=4, M=16 and P=2.

According to the stated structure, in a 64-bit microprocessor, by processing eight 8-bit operands, four 16-bit operands, or two 32-bit operands at once, and correcting every eight bits, sixteen bits, or thirty-two bits, respectively, eight 8-bit operation results, four 16-bit operation results, or two 32-bit operation results, respectively, are obtained.

Here, the type of operation may be any one of a plurality of types of operations, and the execution unit, where L is N integers from 0 to N−1, when a least significant bit is considered to be a first bit, and when the operation instruction is decoded, may generate correction information, in M-bit units, based on the type of operation and a carry from an M*L-th bit to an M*L+1-th bit according to the operation, the correction information showing for M bits the value of the M*L+1-th as one of (a) 0 or 1 and (b) 0 or −1, and when the SIMD correction instruction is decoded, may perform, regardless of the type of the operation, one of (a) adding the stored correction information to the first-bit-length operation result in M-bit units, and (b) subtracting the correction information from the first-bit-length operation result in M-bit units.

According to the stated structure, correction information is generated based on the type of operation and whether there is a carry for each M bits. In the correction operation 0 and 1, or 0 and −1 are used to show whether there is a carry for each M bits. The correction information is either added to or subtracted from the provisional operation result in M-bit units. Accordingly, N M-bit operation results are obtained.

Here, the plurality of types of operations may include at least one of increment, decrement, dyadic add, and dyadic subtract, and the execution unit (a) when the operation instruction is decoded and the predetermined type is increment, may increment the first-bit-length operand, to obtain a first-bit-length operation result, and generate the correction information, each M*L+1-th bit without a carry according to the operation being represented by a value −1 in the correction information, and each M*L+1-th bit with a carry according to the operation being represented by a value 0 in the correction information, (b) when the operation instruction is decoded and the predetermined type is decrement, may decrement the first-bit-length operand, to obtain a first-bit-length operation result, and generate the correction information, each M*L+1-th bit without a carry according to the operation being represented by a value 0 in the correction information, and each M*L+1-th bit with a carry according to the operation being represented by a value 1 in the correction information, (c) when the operation instruction is decoded and the predetermined type is dyadic add, may add a first first-bit-length operand and a second first-bit-length operand to obtain a first-bit-length operation result, the first first-bit-length operand being formed by concatenating N M-bit operands, and the second first-bit-length operand being formed by concatenating N M-bit operands, and may generate correction information, each M*L+1-th without a carry according to the operation being represented by a value 0 in the correction information, and M*L+1-th bit with a carry according to the operation being represented by a value 1 in the correction information, (d) when the operation instruction is decoded and the predetermined type is dyadic subtract, may subtract a second first-bit-length operand from a first first-bit-length operand to obtain a first-bit-length operation result, the first first-bit-length operand being formed by concatenating N M-bit operands, and the second first bit-length operand being formed by concatenating N M-bit operands, and may generate correction information, each M*L+1-th bit without a carry according to the operation being represented by a value −1 in the correction information, and each M*L+1-th bit position with a carry according to the operation being represented by a value 0 in the correction information, and (e) when the SIMD correction instruction is decoded, may subtract, in M-bit units, the stored correction information from the stored first-bit-length operation result, to obtain the N second-bit-length operation results.

According to the stated structure, when the operation type is increment or dyadic add, carry information is generated in which an M*L+1-th bit that does not have a carry is represented by −1, and an M*L+1-th bit that does have a carry is represented by 0. Furthermore, when the operation type is decrement or dyadic subtract, carry information is generated in which an M*L+1-th bit that does not have a carry is represented by 0, and an M*L+1-th bit that does have a carry is represented by 1. By subtracting the correction information from the provisional operation result in M-bit units, N M-bit operation results can be obtained.

Here, the plurality of types of operations may include at least one of increment, decrement, dyadic add, and dyadic subtract, and the execution unit (a) when the operation instruction is decoded and the predetermined type is increment, may increment the first-bit-length operand, to obtain a first-bit-length operation result, and may generate the correction information, each M*L+1-th bit without a carry according to the operation being represented by a value 1 in the correction information, and each M*L+1-th bit with a carry according to the operation being represented by a value 0 in the correction information, (b) when the operation instruction is decoded and the predetermined type is decrement, may decrement the first-bit-length operand, to obtain a first-bit-length operation result, and may generate the correction information, each M*L+1-th bit without a carry according to the operation being represented by a value 0 in the correction information, and each M*L+1-th bit with a carry according to the operation being represented by a value −1 in the correction information, (c) when the operation instruction is decoded and the predetermined type is dyadic add, may add a first first-bit-length operand and a second first-bit-length operand to obtain a first-bit-length operation result, the first first-bit-length operand being formed by concatenating N M-bit operands, and the second first-bit-length operand being formed by concatenating N M-bit operands, and may generate correction information, each M*L+1-th bit without a carry according to the operation being represented by a value 0 in the correction information, and M*L+1-th bit with a carry according to the operation being represented by a value −1 in the correction information, (d) when the operation instruction is decoded and the predetermined type is dyadic subtract, may subtract a second first-bit-length operand from a first first-bit-length operand to obtain a first-bit-length operation result, the first first-bit-length operand being formed by concatenating N M-bit operands, and the second first bit-length operand being formed by concatenating N M-bit operands, and may generate correction information, each M*L+1-th bit without a carry according to the operation being represented by a value 1, and each M*L+1-th bit position with a carry according to the operation being represented by a value 0 in the correction information, and (e) when the SIMD correction instruction for N parallel operations is decoded, may subtract, in M-bit units, the stored correction information from the stored first-bit-length operation result, to obtain the N second-bit-length operation results.

According to the stated structure, when the operation type is increment or dyadic add, carry information is generated in which an M*L+1-th bit that does not have a carry is represented by 1, and an M*L+1-th bit that does have a carry is represented by 0. Furthermore, when the operation type is decrement or dyadic subtract, carry information is generated in which an M*L+1-th bit that does not have a carry is represented by 0, and an M*L+1-th bit that does have a carry is represented by −1. By adding the correction information and the provisional operation result in M-bit units, N M-bit operation results can be obtained.

Here, the type of operation may be any one of a plurality of types of operations, the execution unit may further store type information showing the predetermined type, and, when the SIMD correction instruction used for applying N parallel operations is decoded, may correct the stored first-bit-length operation result according to the stored type.

According to the stated structure, the type of operation is stored while the operation is performed, and the first bit-length provisional operation result is corrected according to the type of operation. Therefore, correction information can be generated without having to take the type of operation into account.

Here, when the operation instruction is decoded, the execution unit may generate, as the correction information, information showing whether there is a carry from lower bits to corresponding higher bits.

According to the stated structure, as well as storing the type of instruction, the information showing whether there is a carry from each less significant bit to the corresponding more significant bit is stored, then the correction information is converted according to the stored type of operation. Accordingly, the provisional operation result can be corrected correctly.

Here, the plurality of types of operations may include at least one of increment, decrement, dyadic add, and dyadic subtract, the execution unit, in order to obtain the N M-bit operation results, where L is N integers from 0 to N−1, and when a least significant bit is considered to be a first bit, (a) when the stored type information shows one of increment and dyadic add, may add 1 to each M*L+1-th bit without a carry in the provisional operation result, based on the generated correction information, and (b) when the stored type information shows one of decrement and dyadic subtract, may subtract 1 from each M*L+1-th bit with a carry in the provisional calculation result, based on the generated correction information.

According to the stated structure, when the stored type of operation is increment or dyadic add, 1 is added to an M*L+1-th bit that does not have a carry, and when the when the stored type of operation is decrement or dyadic subtract, 1 is subtracted from an M*L+1-th bit that has a carry. Accordingly, the second bit-length provisional operation result can be corrected correctly.

Here, the operation apparatus may execute (a) the existing operation that applies the predetermined type of operation to a first-bit-length operand, to obtain one first-bit-length operation result, and (b) the SIMD operation used for applying N parallel operations that applies a same predetermined type of operation in parallel to N second-bit-length operands, to obtain N second-bit-length operation results, N being an integer equal to or greater than 2, and the operation apparatus may include: a storage unit operable to store the first-bit-length operation result, and correction information that is used in the correction; a decoding unit operable to decode the operation instruction and the SIMD correction instruction used for applying N parallel operations; and an execution unit operable, (a) when the operation instruction is decoded, to apply the predetermined type of operation to one of (i) the first-bit-length operand, and (ii) the N second-bit-length operands concatenated and considered to be a first-bit-length operand, to obtain a first first-bit-length operation result, store the obtained first first-bit-length operation result in the storage unit, and generate correction information that corresponds to a difference between the first first-bit-length operation result and a second first-bit-length operation result that is the N second-bit-length operation results concatenated, and store the generated correction information in the storage unit, and (b) when the SIMD correction instruction for applying N parallel operations is decoded, to correct the stored first first-bit-length operation result using the stored correction information, to obtain N SIMD operation second-bit-length operation results.

According to the stated structure, N operands are subject to operation at once, and N operation results are obtained by correcting the operation result with use of the correction information. This enables a considerable reduction in the amount of time taken to apply the same type of operation to a large amount of data.

Here, when M is an integer equal to or greater than 1, the first-bit-length operand is N*M bits in length, each second-bit-length operand is M bits, the first first-bit-length operation result is N*M*2 bits in length, and each second-bit-length operation result is M*2 bits in length, and the execution unit may apply the predetermined type of operation to one of (a) the first-bit-length operand and (b) the N second-bit-length operands concatenated and considered to be a first-bit-length operand, to obtain an N*M*2-bit first-bit-length operation result, may store the obtained first-bit-length operation result in the storage unit, generates correction information based on an effect had, by applying the predetermined type of operation, on each M*2 bits of the first-bit-length operation result, from other M*2 bits, and may store the correction information in the storage unit.

According to the stated structure, by subjecting N M-bit operands to an operation at once and correcting the result using the correction information, N M*2-bit operation results can be obtained.

Here, the operation apparatus may further execute the SIMD operation used for applying N/P parallel operations that applies the same predetermined type of operation in parallel to N/P M*P-bit third-bit-length operands, to obtain N/P M*P*2-bit third-bit-length operation results, P being an integer equal to or greater than 2 and equal to or less than N/2, wherein the decoding unit further decodes the SIMD correction instruction used for applying N/P parallel operations, the execution unit, (a) when the operation instruction is decoded, applies the predetermined type of operation to the first-bit-length operand, the first-bit-length operand being one of (i) the N second-bit-length operands concatenated and considered to be a first-bit-length operand, and (ii) the N/P third-bit-length operands concatenated and considered to be a first-bit-length operand, to obtain one N*M*2-bit first-bit-length operation result, stores the obtained first-bit-length operation result in the storage unit, where L is N−1 integers from 0 to N−1, and when a least significant bit is considered to be a first bit, generates first correction information, for each M*2 bits, based N−1 effects by the predetermined type of operation between (iii) the M*2*L-th bit and lower bits and (iv) the M*2*L+1-th bit position and higher bits, and generates second correction information, for each M*2*P bits, based on N/P−1 effects by the predetermined type of operation between (v) the M*2*P*L-th bit and lower bits and (vi) the M*2*L+1-th bit and higher bits, and stores the first correction information and second correction information in the storage unit, (b) when the SIMD correction instruction used for applying N parallel operations is decoded, corrects the stored first-bit-length operation result with use of the stored first correction information, and (c) when the SIMD correction instruction used for applying N/P parallel operations is decoded, corrects the stored first-bit-length operation result with use of the stored second correction information.

According to the stated structure, by subjecting N M-bit operands or N/P M*P-bit operations to an operation at once and generating first correction information and second correction information, N M-bit operation results can be obtained by correcting using the first correction information, and N/P M*P-bit operation results can be obtained by correcting using the second correction information.

Here, it is preferable that N=8, M=4, P=2, and the type of operation is multiply.

According to the stated structure, in a 64-bit microprocessor, when four 8-bit operands or two 16-bit operands are subject to an operation, four 16(=8*2)-bit operation results are obtained when the provisional operation result is corrected using the first correction information, and two 32(=16*2)-bit operation results are obtained when the provisional operation result is corrected using the second correction information.

Here, the operation apparatus may further include: a saving unit operable, when an interrupt is received or when switching to another context, to save contents stored in the storage unit to a storage apparatus that is external to the operation apparatus; and a restoration unit operable, when returning from the interrupt or switching back to an original context, to restore the saved contents to the storage unit.

According to the stated structure, the contents of the storage unit can be stored externally when an interrupt is received or when switching to another context, and then restored when returning from the interrupt or switching back to the original context. Therefore, inconsistencies do not occur when an interrupt or a context switch is received between an operation instruction and an SIMD correction instruction.

Accordingly, multimedia processing can be performed optimally without time lags, and the present invention can be applied to multitask processing.

An operation apparatus of the present invention executes N parallel SIMD (Single Instruction Multiple Data) operations for applying a same type of operation in parallel to N M-bit operands, to obtain N M-bit operation results, N being an integer equal to or greater than 2 and M being an integer equal to or greater than 1, the operation apparatus implementing: an N parallel SIMD increment instruction for adding 1 to each M-bit operand, and including: a decoding unit operable to decode the N parallel SIMD increment instruction; and an execution unit operable, when the N parallel SIMD increment instruction is decoded, and when a least significant bit position is considered to be a first bit position, to add first data and second data without propagating a carry from each M*L-th bit to corresponding M*L+1-th bits, the first data being the N M-bit operands concatenated, the second data being N concatenated pieces of M-bit data which each express 1, L being N−1 integers from 1 to N−1.

According to the stated structure, the operation apparatus decodes and executes an N parallel SIMD increment instruction.

Therefore, it is possible to increase a plurality of addresses at once and control the brightness, color or the like of a plurality of pieces of image data at high speed.

An operation apparatus of the present invention executes N parallel SIMD (Single Instruction Multiple Data) operations for applying a same type of operation in parallel to N M-bit operands, to obtain N M-bit operation results, N being an integer equal to or greater than 2 and M being an integer equal to or greater than 1, the operation apparatus implementing: an N parallel SIMD decrement instruction for subtracting 1 from each M-bit operand, and including: a decoding unit operable to decode the N parallel SIMD decrement instruction; and an execution unit operable, when the N parallel SIMD decrement instruction is decoded, and when a least significant bit position being considered to be a first bit position, to subtract second data from first data without propagating a carry from each M*L-th bit to corresponding M*L+1-th bits, the first data being the N M-bit operands concatenated, the second data being N concatenated pieces of M-bit data which each express 1, L being N−1 integers from 1 to N−1.

According to the stated structure, the operation apparatus decodes and executes an N parallel SIMD increment instruction.

Therefore, it is possible to decrease a plurality of addresses at once and control the brightness, color or the like of a plurality of pieces of image data at high speed.

A program conversion apparatus of the present invention converts a program that includes an SIMD (Single Instruction Multiple Data) operation instruction for applying a same type of operation in parallel to a plurality of predetermined-bit-length operands and other operation instructions, including: an analysis unit operable to analyze the operation instructions in the program; and a conversion unit operable, when the analyzed instruction is the SIMD operation instruction, to convert the SIMD operation instruction to (a) an operation instruction that instructs applying the type of operation to the plurality of concatenated predetermined length operands considered to be one operand, and (b) an SIMD correction instruction that instructs correcting an operation result of the operation instruction to an operation result of the SIMD operation instruction.

A program conversion method of the present invention converts a program that includes an SIMD (Single Instruction Multiple Data) operation instruction for applying a same type of operation in parallel to a plurality of predetermined-bit-length operands and other operation instructions, including: an analysis step of analyzing the operation instructions in the program; and a conversion step, when the analyzed instruction is the SIMD operation instruction, of converting the SIMD operation instruction to (a) an operation instruction that instructs applying the type of operation to the plurality of concatenated predetermined length operands considered to be one operand, and (b) an SIMD correction instruction that instructs correcting an operation result of the operation instruction to an operation result of the SIMD operation instruction.

A program conversion program of the present invention converts a program that includes an SIMD (Single Instruction Multiple Data) operation instruction for applying a same type of operation in parallel to a plurality of predetermined-bit-length operands and other operation instructions, including: an analysis step of analyzing the operation instructions in the program; and a conversion step, when the analyzed instruction is the SIMD operation instruction, of converting the SIMD operation instruction to (a) an operation instruction that instructs applying the type of operation to the plurality of concatenated predetermined length operands considered to be one operand, and (b) an SIMD correction instruction that instructs correcting an operation result of the operation instruction to an operation result of the SIMD operation instruction.

According to the stated structures, an SIMD operation instruction can be converted to another operation instruction and an SIMD correction instruction.

Accordingly, the present invention is able to have a processor execute an SIMD operation for a plurality of types of operations with only an SIMD correction instruction, which is not related to the type of operation, in addition to conventional instructions. Avoiding a dramatic increase in the number of instructions means that the machine language is relatively short, therefore reducing the program code size.

A compiler of the present invention compiles a machine language program from a high-order language program, the high-order language program including a syntax that has an SIMD (Single Instruction Multiple Data) operation for applying a same type of operation in parallel to a plurality of predetermined-bit-length operands executed in an operation apparatus, the machine language program being composed of a plurality of machine language instruction that are executable by the operation apparatus, the compiler including: an analysis unit operable to analyze the syntax of the high-order language program; and a compiling unit operable to generate the machine language program by converting the analyzed syntax to a machine language instruction string, wherein the compiling unit, when the syntax for having an SIMD operation executed is analyzed, converts the syntax to a machine language instruction series that includes (a) an operation machine language instruction that instructs applying the type of operation to the plurality of predetermined length operands concatenated and considered to be one operand, and (b) an SIMD correction machine language instruction that instructs correcting an operation result of the operation instruction to an operation result of the SIMD operation instruction.

A compiling method of the present invention compiles a machine language program from a high-order language program, the high-order language program including a syntax that has an SIMD (Single Instruction Multiple Data) operation for applying a same type of operation in parallel to a plurality of predetermined-bit-length operands executed in an operation apparatus, the machine language program being composed of a plurality of machine language instructions that are executable by the operation apparatus, the compiling method including: an analysis step of analyzing the syntax of the high-order language program; and a compiling step of generating the machine language program by converting the analyzed syntax to a machine language instruction string, wherein the compiling step, when the syntax for having an SIMD operation executed is analyzed, converts the syntax to a machine language instruction series that includes (a) an operation machine language instruction that instructs applying the type of operation to the plurality of predetermined length operands concatenated and considered to be one operand, and (b) an SIMD correction machine language instruction that instructs correcting an operation result of the operation instruction to an operation result of the SIMD operation instruction.

A compiling program of the present invention compiles a machine language program from a high-order language program, the high-order language program including a syntax that has an SIMD (Single Instruction Multiple Data) operation for applying a same type of operation in parallel to a plurality of predetermined-bit-length operands executed in an operation apparatus, the machine language program being composed of a plurality of machine language instruction that are executable by the operation apparatus, the compiling program having a computer execute: an analysis step of analyzing the syntax of the high-order language program; and a compiling step of generating the machine language program by converting the analyzed syntax to a machine language instruction string, wherein the compiling step, when the syntax for having an SIMD operation executed is analyzed, converts the syntax to a machine language instruction series that includes (a) an operation machine language instruction that instructs applying the type of operation to the plurality of predetermined length operands concatenated and considered to be one operand, and (b) an SIMD correction machine language instruction that instructs correcting an operation result of the operation instruction to an operation result of the SIMD operation instruction.

According to the stated structures, the present invention is able to convert an SIMD operation syntax to an operation machine language instruction and an SIMD correction machine language instruction.

Accordingly, the present invention is able to have a processor execute an SIMD operation for a plurality of types of operations with only an SIMD correction machine language instruction, which is not related to the type of operation, in addition to conventional machine language instructions. Avoiding a dramatic increase in the number of instructions means that the machine language is relatively short, therefore reducing the program code size.

In the compiler, the compiling unit may include: a primary conversion sub-unit operable, when the syntax for having the SIMD operation executed is analyzed, to convert the syntax to an intermediate language code string that includes intermediate language code that shows the SIMD operation; and a secondary conversion sub-unit operable to convert the intermediate language code into the operation machine language instruction and the SIMD correction machine language instruction.

In the compiling method, the compiling step may include: a primary conversion sub-step, when the syntax for having an SIMD operation executed is analyzed, of converting the syntax to an intermediate language code string that includes intermediate language code that shows the SIMD operation; and a secondary conversion sub-step of converting the intermediate language code into the operation machine language instruction and the SIMD correction machine language instruction.

In the compiling program the compiling step may include: a primary conversion sub-step, when the syntax for having an SIMD operation executed is analyzed, of converting the syntax to an intermediate language code string that includes intermediate language code that shows the SIMD operation; and a secondary conversion sub-step of converting the intermediate language code into the operation machine language instruction and the SIMD correction machine language instruction.

According to the stated construction, the SIMD operation syntax is converted to an intermediate language code string that includes an intermediate language code that shows the SIMD operation. Then, the intermediate language code that shows the SIMD operation is converted to an operation machine language instruction and an SIMD correction machine language instruction.

An operation program of the present invention is an operation program for having a computer execute processing, the processing applying a same type of operation in parallel to N M-bit operands to obtain N M-bit operation results, N being an integer equal to or greater than 2 and M being an integer equal to greater than 1, the operation program having the computer execute: an operation step of applying the type of operation to an N*M-bit provisional operand that is formed by concatenating the N M-bit operands, to obtain one N*M-bit provisional operation result, and generating correction information based on an effect had, by applying the operation, on each M bits of the provisional operation result from a bit that neighbors the M bits; and a correction step of correcting the provisional operation result in M-bit units with use of the correction information, to obtain the N M-bit operation results.

A computer-readable recording medium of the present invention on which the operation program is recorded is a computer-readable recording medium having an operation program recorded thereon, the operation program having a computer execute processing, the processing applying a same type of operation in parallel to N M-bit operands to obtain N M-bit operation results, N being an integer equal to or greater than 2 and M being an integer equal to greater than 1, the operation program having the computer execute: an operation step of applying the type of operation to an N*M-bit provisional operand that is formed by concatenating the N M-bit operands, to obtain one N*M-bit provisional operation result, and generating correction information based on an effect had, by applying the operation, on each M bits of the provisional operation result from a bit that neighbors the M bits; and a correction step of correcting the provisional operation result in M-bit units with use of the correction information, to obtain the N M-bit operation results.

According to the stated structure, N M-bit operands are subject to operation at once, and N M-bit operation results are obtained by correcting the operation result with use of the correction information. This enables a considerable reduction in the amount of time taken to apply the same type of operation to a large amount of data.

Furthermore, in a processor in which the operation method is used, operation instructions can be commonly used for existing operations and SIMD operations, and the correction instruction is not related to the type of operation. Therefore, since the number of instructions does not increase relative to the number of types of operations, the present invention can implement SIMD operations with relatively few increases in costs and power consumption that are brought about by problems with bit allocation for machine language instructions and large scale decoder circuits, compared with an operation method that implements conventional SIMD operation instructions.

Accordingly, the present invention is able to implement SIMD operations without a large increase in the number of instructions.

In the operation program the correction step, M least significant bits of the provisional operation result may be excluded from being corrected.

In the computer-readable recording medium of the present invention on which the operation program is recorded, in the correction step, M least significant bits of the provisional operation result may be excluded from being corrected.

According to the stated structure, by excluding the M least significant bits of the provisional operation result from correction, it is not necessary to correct the M least significant bits, which are not influenced by the operation, in cases in which a carry from an operation before a carry flag was used is not taken into account.

An operation program of the present invention is an operation program for having a computer execute processing, the processing applying a same type of operation in parallel to N operands to obtain N operation results, N being an integer equal to or greater than 2, the operation program having the computer execute: an operation step of applying the type of operation to a provisional operand that is formed by concatenating the N operands, to obtain one first provisional operation result that is N times a size of each of the N operation results, and generating correction information that corresponds to a difference between the first provisional operation result and a second provisional operation result, the second provisional operation result being formed by concatenating the N operation results; and a correction step of correcting the first provisional operation result with use of the correction information, and dividing a result of the correction into N pieces, to obtain the N operation results.

A computer-readable recording medium of the present invention on which the operation program is recorded a computer-readable recording medium having an operation program recorded thereon, the operation program having a computer execute processing, the processing applying a same type of operation in parallel to N operands to obtain N operation results, N being an integer equal to or greater than 2, the operation program having the computer execute: an operation step of applying the type of operation to a provisional operand that is formed by concatenating the N operands, to obtain one first provisional operation result that is N times a size of each of the N operation results, and generating correction information that corresponds to a difference between the first provisional operation result and a second provisional operation result, the second provisional operation result being formed by concatenating the N operation results; and a correction step of correcting the first provisional operation result with use of the correction information, and dividing a result of the correction into N pieces, to obtain the N operation results.

According to the stated structure, N operands are subject to operation at once, and N operation results are obtained by correcting the operation result with use of the correction information. This enables a considerable reduction in the amount of time taken to apply the same type of operation to a large amount of data.

Furthermore, in a processor in which the operation method is used, operation instructions can be commonly used for existing operations and SIMD operations, and the correction instruction is not related to the type of operation. Therefore, since the number of instructions does not increase relative to the number of types of operations, the present invention can implement SIMD operations with relatively few increases in costs and power consumption that are brought about by problems with bit allocation for machine language instructions and large scale decoder circuits, compared with an operation method that implements conventional SIMD operation instructions.

Accordingly, the present invention is able to implement SIMD operations without a large increase in the number of instructions.

An operation program of the present invention has a computer execute (a) an existing operation for applying a predetermined type of operation to a first-bit-length operand, and (b) an SIMD (Single Instruction Multiple Data) operation for applying the same predetermined type of operation in parallel to a plurality of second-bit-length operands, the second bit-length being shorter than the first bit-length, the operation program including: an operation instruction for instructing application of the predetermined type of operation on one of (c) the first-bit-length operand, and (d) the plurality of second-bit-length operands concatenated and considered to be a first-bit-length operand; and an SIMD correction instruction for instructing correction of an operation result of the operation instruction to an operation result of the SIMD operation.

A computer-readable recording medium of the present invention on which the operation program is recorded A computer-readable recording medium having an operation program recorded thereon, the operation program having a computer execute (a) an existing operation for applying a predetermined type of operation to a first-bit-length operand, and (b) an SIMD (Single Instruction Multiple Data) operation for applying the same predetermined type of operation in parallel to a plurality of second-bit-length operands, the second bit-length being shorter than the first bit-length, the operation program including: an operation instruction for instructing application of the predetermined type of operation on one of (c) the first-bit-length operand, and (d) the plurality of second-bit-length operands concatenated and considered to be a first-bit-length operand; and an SIMD correction instruction for instructing correction of an operation result of the operation instruction to an operation result of the SIMD operation.

According to the stated structure, the operation apparatus implements an operation instruction and an SIMD correction instruction, the operation instruction being performed on one long operand or on a plurality of short operands that are considered to be one long operand.

Furthermore, the operation apparatus is able to use operation instructions commonly for existing operations and SIMD operations, and the correction instruction is not related to the type of operation. Since the number of instructions is not the product of the number of types of operations and the number of sizes, and a dramatic increase in the number of instructions is avoided, the present invention can implement SIMD operations with relatively few increases in costs and power consumption that are brought about by problems with bit allocation for machine language instructions and large scale decoder circuits, compared with an operation method that implements conventional SIMD operation instructions.

Accordingly, the present invention is able to implement SIMD operations without a large increase in the number of instructions.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 shows the structure of an SIMD operation apparatus of the first embodiment;

FIGS. 2A to 2D show examples of the bit structure of carry information stored in a CR 9;

FIGS. 3A to 3C show the contents of the registers during an SIMD dyadic add operation;

FIGS. 4A to 4C show the contents of the registers during an SIMD dyadic subtract operation;

FIGS. 5A to 5C show the contents of the registers during an SIMD increment operation;

FIGS. 6A to 6C show the contents of the registers during an SIMD decrement operation;

FIGS. 8A to 8D show examples of the bit structure of carry information stored in the CR 9;

FIGS. 9A to 9C show the contents of the registers during an SIMD dyadic add operation;

FIGS. 10A to 10C show the contents of the registers during an SIMD dyadic subtract operation;

FIGS. 12A to 12C show the contents of the registers during an SIMD decrement operation;

FIG. 13 shows the structure of an SIMD operation apparatus of the third embodiment;

FIG. 18 shows an example of a C language program that is written to a read buffer 102;

FIG. 19 shows an example of an intermediate code program generated from the C language program shown in FIG. 18;

FIG. 21 shows an example of a modified intermediate code program generated from the intermediate code program shown in FIG. 19;

FIG. 22 shows an example of an SIMD intermediate code program generated from the modified intermediate code program shown in FIG. 21;

FIG. 23 shows an example of a machine language instruction program generated from the SIMD intermediate code program shown in FIG. 22.

DESCRIPTION OF THE PREFERRED EMBODIMENTS

First Embodiment

<Outline>

Figure 5B:
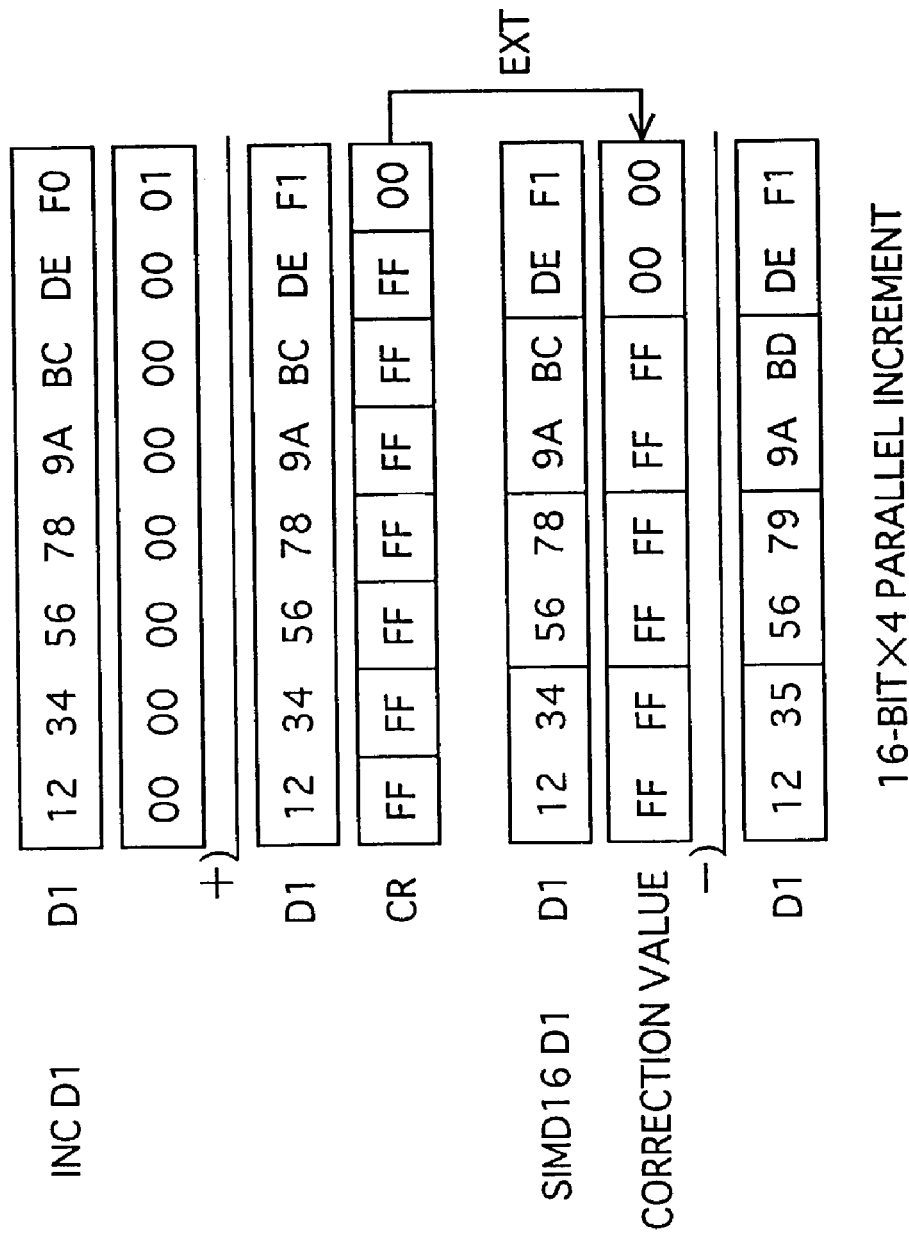

The first embodiment of the present invention realizes an SIMD operation instruction by executing an operation instruction for a non-parallel operation and a correction instruction for correcting an operation result of the non-parallel operation instruction to an operation result of an SIMD operation instruction.

A processor in the first embodiment of the present invention, when executing the non-parallel operation instruction, stores an operation result and a carry result for each smallest unit of data size that is subjected to the parallel operation. Then, when executing the correction instruction, the processor obtains an SIMD operation instruction result by correcting only necessary bit positions in the operation result, based on the stored carry result.

Here, the non-parallel operation instruction is executed independent of the SIMD operation instruction, therefore there is no increase in the number of operation instructions.

Furthermore, it is sufficient to have only as many correction instructions as sizes of data that are subject to parallel operations. This means that the number of instructions is not the product of the number of types of operations, and therefore there is not a dramatic increase in the number of instructions.

<Structure>

FIG. 1 shows the structure of an SIMD operation apparatus of the first embodiment.

An SIMD operation apparatus 10 shown in FIG. 10 has a three-stage pipeline structure, the three stages being an instruction fetch stage (hereinafter referred to as an "IF stage"), a decode stage (hereinafter referred to as a "DEC stage") in which an instruction is decoded and data is read from the register, and an execute stage (hereinafter EX stage). The SIMD apparatus 10 is composed of a ROM 1, an IR 2, a DEC 3, a register file 4, an EXT 5, an AR 6, an ALU 8 and a CR 9.

The ROM 1 is a recording medium that stores a machine language program.

The IR 2 is an instruction register that stores a machine language instruction fetched from the ROM 1.

The DEC 3 is an instruction decoder that decodes the machine language instruction stored in the IR 2 and controls the various compositional elements of the SIMD operation apparatus 10 accordingly.

Here, the instructions that the DEC 3 decodes are: a dyadic add instruction "ADD D0,D1", a dyadic subtract instruction "SUB D0,D1", an increment instruction "INC D1", a decrement instruction "DEC D1", an 8-bit SIMD correction instruction "SIMD8 D1", a 16-bit SIMD correction instruction "SIMD16 D1", and a 32-bit SIMD correction instruction "SIMD32 D1".

The register file 4 is a collection of registers, each of which has sixteen 64-bit internal registers: D0 register through to D15 register.

The EXT 5 is an extender that, as a result of a 16-bit SIMD correction instruction being decoded by the IR2, 16-bit sign extends four of eight pieces of 8-bit data that have been stored in the CR 9 to 16-bit data. Furthermore, as a result of a 32-bit SIMD correction instruction being decoded by the IR2, the EXT 5 32-bit sign extends two of eight pieces of 8-bit data that have been stored in the CR 9 to 32-bit data. When an 8-bit SIMD correction instruction "SIMD8 D1" is decoded by the IR 2, the EXT 5 does not perform sign expansion on the eight pieces of 8-bit data stored in the CR 9, but instead stores the eight pieces of data in the BR 7.

The following shows examples of sign extending. The result of 16-bit sign extending "0x??00??01??02??03" is "0x0000000100020003". The result of 16-bit sign extending "0x??FF??FE??FD??FC" is "0xFFFFFFFEFFFDFFFC". The result of 32-bit sign extending "0x??????01??????02" is "0x0000000100000002". The result of 32-bit sign extending "0x??????FF??????FE" is "0xFFFFFFFFFFFFFFFE".

Note that "0x" means that the value is displayed in hexadecimal, and "?" means that the same result is obtained no matter what value is in the position shown by "?".

The AR 6 is a 64-bit register that stores output from the register file 4.

The AR 6 stores the output from the D1 register when the output is the dyadic add instruction "ADD D0,D1", the dyadic subtract instruction "SUB D0,D1", the increment instruction "INC D1", the decrement instruction "DEC D1", the 8-bit SIMD correction instruction "SIMD8 D1", the 16-bit SIMD correction instruction "SIMD16 D1", and the 32-bit SIMD correction instruction "SIMD32 D1".

The BR 7 is a 64-bit register that selects and stores the output from the register file 4, "0x0000000000000001", or the output from the EXT 5, according to a machine language instruction.

Here, the BR 7 selects the output from the D0 register when the dyadic add instruction "ADD D0,D1" or the dyadic subtract instruction "SUB D0,D1" is executed, selects "0x0000000000000001" when the increment instruction "INC D1" or the decrement instruction "DEC D1" is executed, and selects output from the EXT 5 when the 8-bit SIMD correction instruction "SIMD8 D1", the 16-bit SIMD correction instruction "SIMD16 D1", or the 32-bit SIMD correction instruction "SIMD32 D1" is executed.

The ALU 8 is a 64-bit adder/subtractor that, when an operation instruction is being executed, performs either an addition A+B or a subtraction A−B, and stores the operation result in the registers. Here, the A input and the B input are the respective contents of the AR 6 and the BR 7. In addition, the ALU 8 generates carry information that shows the result of a carry for each eight bits of data (the smallest unit of data) that is being subjected to parallel operations, and stores the carry information in the CR 9. Furthermore, when an SIMD correction instruction is being executed, the ALU 8 corrects the operation result to SIMD operation results by performing a subtraction A−B so that other SIMD operation results are not affected.

Here, when the dyadic add instruction "ADD D0,D1" or the increment instruction "INC D1" is executed, the ALU 8 performs an addition A+B, and stores the obtained operation result in the D1 register. Here, when the instruction is the dyadic add instruction, the ALU 8 also generates carry information in which "0" shows that there is no carry for eight bits and "1" shows that there is a carry for eight bits. When the instruction is the increment instruction, the ALU 8 also generates carry information in which "−1" shows that there is no carry for eight bits and "0" shows that there is a carry for eight bits. Furthermore, when the dyadic subtract instruction "SUB D0, D1" or the decrement instruction "DEC 01" is executed, the ALU 8 performs a subtraction A−B, and stores the obtained operation result in the D1 register. Here, when the instruction is the dyadic subtract instruction, the ALU 8 also generates carry information in which "−1" shows that there is no carry for eight bits and "0" shows that there is a carry for eight bits. When the instruction is the decrement instruction, the ALU 8 generates carry information in which "0" shows that there is no carry for eight bits and "1" shows that there is a carry for eight bits. In addition, when the 8-bit SIMD correction instruction "SIMD8 D1", the 16-bit SIMD correction instruction "SIMD16 D1", or a 32-bit SIMD correction instruction "SIMD32 D1" is executed, the ALU 8 performs a subtraction A−B of each corresponding number of bits so that there is no affect on others, corrects the operation result that was stored in the D1 register to the SIMD operation results, and stores the SIMD operation result in the D1 register.

The CR 9 is a 64-bit register for storing carry information.

Here, processing for fetching a machine language instruction from the ROM 1 and writing the instruction to the instruction register 2 is performed in the IF stage. Decoding of the machine language instruction by the DEC 3, sign extension by the EXT 5 and outputting from the register file 4 and the EXT 5 are performed in the DEC stage. Operation and storing of the carry information to the CR 9 by the ALU 8 are performed in the EX stage.

<Operations>

Figures 2A, 2B:
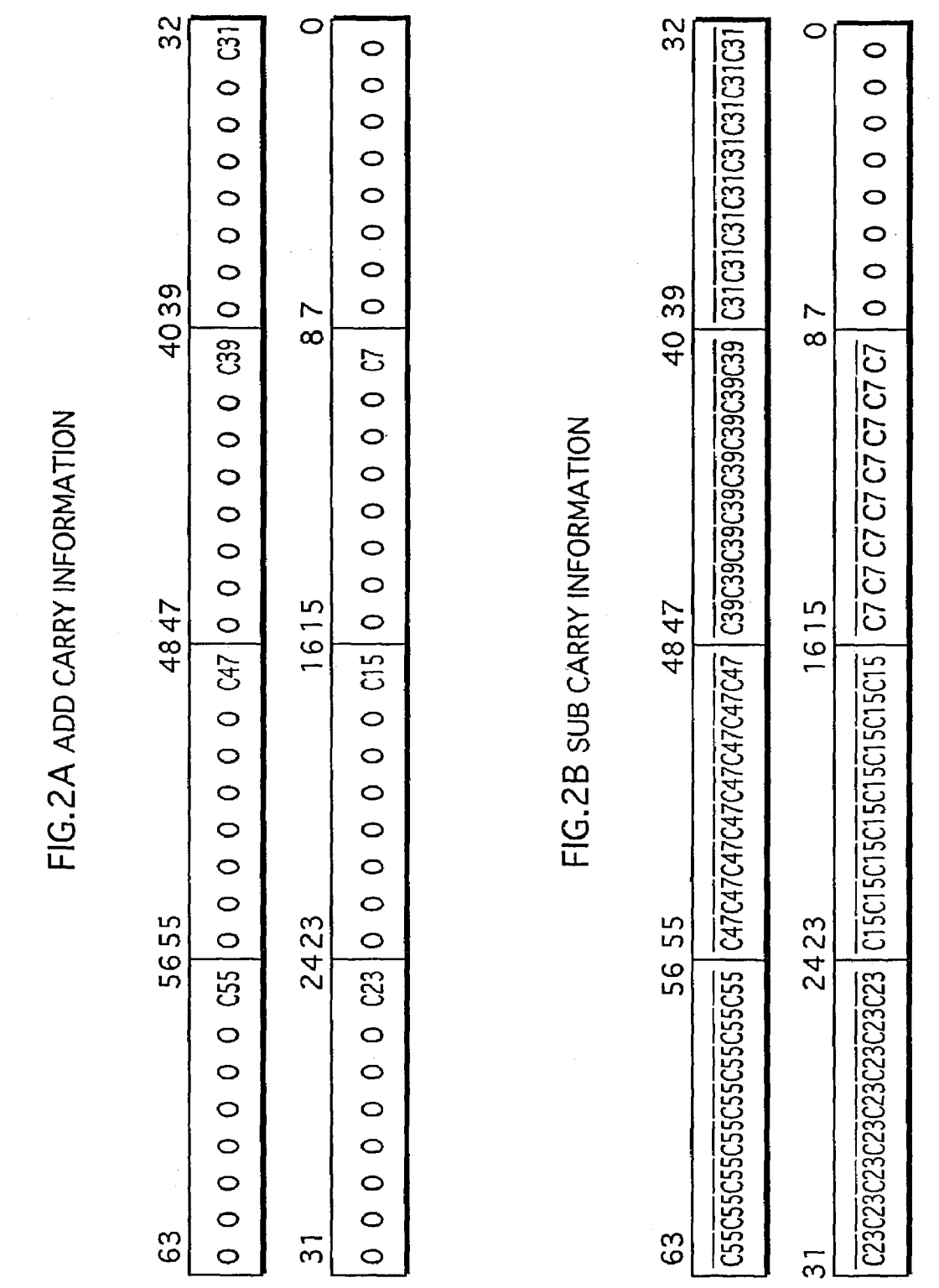

FIGS. 2A to 2D show examples of the bit structure of carry information stored in the CR 9.

In FIGS. 2A to 2D numbers 63, 56, 55, 48, 47, 40, 39, 32, 31, 24, 23, 16, 15, 8, 7, and 0 in a horizontal direction show bit positions. The bit position 0 is the LSB (least significant bit), while the bit position 63 is the MSB (most significant bit).

FIG. 2A shows carry information when a dyadic add instruction (ADD instruction) has been executed. A carry from bit position 7 in the operation result is recorded in bit position 8 in the carry information (C7 in the diagram). A carry from bit position 15 in the operation result is recorded in bit position 16 in the carry information (C15 in the diagram). A carry from bit position 23 in the operation result is recorded in bit position 24 in the carry information (C23 in the diagram). A carry from bit position 31 in the operation result is recorded in bit position 32 in the carry information (C31 in the diagram). A carry from bit position 39 in the operation result is recorded in bit position 40 in the carry information (C39 in the diagram). A carry from bit position 47 in the operation result is recorded in bit position 48 in the carry information (C47 in the diagram). A carry from bit position 55 in the operation result is recorded in bit position 56 in the carry information (C55 in the diagram). Each of the other bit positions in the carry information has a value "0".

FIG. 2B shows carry information when a dyadic subtract instruction (SUB instruction) has been executed. When there is no carry from bit position 7 in the operation result, the value FF, which is the inverse of a value "0", is recorded in each bit position 8 to 15, and when there is a carry from bit position 7, the value "0" is recorded in each bit position 8 to 15 (shown in the diagram as C7 with a line thereabove). When there is no carry from bit position 15 in the operation result, the value FF is recorded in each bit position 16 to 23, and when there is a carry from bit position 15, the value "0" is recorded in each bit position 16 to 23 (shown in the diagram as C15 with a line thereabove). When there is no carry from bit position 23 in the operation result, the value FF is recorded in each bit position 24 to 31, and when there is a carry from bit position 23, the value "0" is recorded in each bit position 24 to 31 (shown in the diagram as C23 with a line thereabove). When there is no carry from bit position 31 in the operation result, the value FF is recorded in each bit position 32 to 39, and when there is a carry from bit position 31, the value "0" is recorded in each bit position 32 to 39 (shown in the diagram as C31 with a line thereabove). When there is no carry from bit position 39 in the operation result, the value FF is recorded in each bit position 40 to 47, and when there is a carry from bit position 39, the value "0" is recorded in each bit position 40 to 47 (shown in the diagram as C39 with a line thereabove). When there is no carry from bit position 47 in the operation result, a value FF is recorded in each bit position 48 to 55, and when there is a carry from bit position 47, the value "0" is recorded in each bit position 48 to 55 (shown in the diagram as C47 with a line thereabove). When there is no carry from bit position 55 in the operation result, a value FF is recorded in each bit position 56 to 63, and when there is a carry from bit position 55, the value "0" is recorded in each bit position 56 to 63 (shown in the diagram as C55 with a line thereabove). The value "0" is recorded in each bit position 0 to 7.

FIG. 2C shows carry information when an increment operation instruction (INC instruction) has been executed, and is the same as FIG. 2B.

FIG. 2D shows carry information when a decrement operation instruction (DEC instruction) has been executed, and is the same as FIG. 2A.

Note that in executing a SUB instruction or a DEC instruction "carry" means a carry when the ALU 8 realizes a decrement A−B by calculating A+ (bit inverse of B)+1, and does not mean a borrow in decrementing. Furthermore, here the inverse of the value 0 is the value 1, and the inverse of the value 1 is the value 0.

The following describes an example of operations of the SIMD operation apparatus in three stages in terms of operational timing (machine cycles).

EXAMPLE 1

The following describes an example of an 8*8 SIMD dyadic add operation for dyadic adding in parallel eight pieces of 8-bit data respectively to another eight pieces of 8-bit data.

If the first eight pieces of 8-bit data to be added are stored concatenated in the D0 register as 64-bit data, and similarly, the second eight pieces of 8-bit data to be added are stored concatenated in the D1 register as 64-bit data, the 8*8 SIMD dyadic add operation is realized by the following two instructions.

ADD D0, D1
SIMD8 D1

Here, supposing that the first eight pieces of 8-bit data are "0x12", "0x34", "0x56", "0x78", "0x9A", "0xBC", "0xDE" and "0xF0", and that the second eight pieces of 8-bit data are all "0x80", "0x123456789ABCDEF0" is pre-stored in the D0 register, and "0x8080808080808080" is pre-stored in the D1 register.

FIG. 3A shows the contents of the registers in the 8*8 SIMD dyadic add operation.

(1) Operation Timing 1
EX stage: not relevant.
DEC stage: not relevant.
IF stage: ADD instruction.
The dyadic add instruction "ADD D0, D1" is fetched from the ROM 1, and stored in the IR 2.

(2) Operation Timing 2
EX stage: not relevant.
DEC stage: ADD instruction.
The dyadic add instruction "ADD D0, D1" stored in the IR 2 is decoded by the DEC 3. The result of decoding shows that a 64-bit dyadic add operation is to be executed. Based on the decoding, the contents "0x123456789ABCDEF0" of the D0 register are read and stored in the BR 7, and the contents "0x8080808080808080" of the D1 register are read and stored in the AR 6.
IF stage: SIMD instruction.
The SIMD correction instruction "SIMD8 D1" is fetched from the ROM 1, and stored in the IR 2.

(3) Operation Timing 3
EX stage: ADD instruction.
Based on the result of the decoding by the DEC 3 in the operation timing 2, the ALU 8 performs a 64-bit carry-propagate add operation of A input and B input using the contents of BR 7 as the A input and the contents of AR 6 as the B input, and stores an operation result "0x92B4D6F91B3D5F70" in the D1 register of the register file 4. Furthermore, since the carry for each eight bits of data is C7=1, C15=1, C23=1, C31=1, C39=0, C47=0 and C55=0, the ALU 8 stores carry information "0x0000000101010100" in the CR 9, as shown in FIG. 3A.

(BR) 0x123456789ABCDEF0
(AR)+)0x8080808080808080

$\overline{\phantom{\text{---}}}$
(D1) 0x92B4D6F91B3D5F70
DEC stage: SIMD instruction.
The SIMD correction instruction "SIMD8 D1" stored in the IR 2 is decoded by the DEC 3. The result of the decoding shows that eight parallel 8-bit data SIMD correction operations are to be executed. Based on the result, the contents "0x92B4D6F91B3D5F70" of the D1 register written in the EX stage are read and stored in the AR 6. Furthermore, the EXT 5 reads the contents "0x0000000101010100" of the CR9 written in the EX stage, which it stores in the BR 7 without sign extending.

IF stage: not relevant.
(4) Operation Timing 4
EX stage: SIMD instruction.
Based on the result of the decoding by the DEC 3 in the operation timing 3, the ALU 8 performs a carry-propagate subtract operation for 8-bit units only, using the contents of the BR 7 as the A input and the contents of the AR 6 as the B input, and stores the operation result "0x92B4D6F81A3C5E70" in the D1 register.

(BR) 0x92 0xB4 0xD6 0xF9 0x1B 0x3D 0x5F 0x70
(AR)−)0x00−)0x00−)0x00−)0x01−)0x01−)0x01−)0x01−)0x00
_ _ _ _ _ _ _ _ _ _ _ _ _ _ _ _ _ _ _ _ _ _ _
(D1) 0x92 0xB4 0xD6 0xF8 0x1A 0x3C 0x5E 0x70

This operation result is the SIMD operation result obtained if the respective contents pre-stored in the D0 register and the D1 register are considered to be eight pieces of 8-bit data, and corresponding pieces of 8-bit data are dyadic added.

The following shows this SIMD operation result:
(D0) 0x12 0x34 0x56 0x78 0x9A 0xBC 0xDE 0xF0
(D1)+)0x80+)0x80+)0x80+)0x80+)0x80+)0x80+)0x80+)0x80
_ _ _ _ _ _ _ _ _ _ _ _ _ _ _ _ _ _ _ _ _ _ _
(D1) 0x92 0xB4 0xD6 0xF8 0x1A 0x3C 0x5E 0x70

DEC stage: not relevant.
IF stage: not relevant.

EXAMPLE 2

The following describes an example of a 16*4 SIMD dyadic add operation for dyadic adding in parallel four pieces of 16-bit data respectively to another four pieces of 16-bit data.

If the first four pieces of 16-bit data to be added are stored concatenated in the D0 register as 64-bit data, and similarly, the second four pieces of 16-bit data to be added are stored concatenated in the D1 register as 64-bit data, the 16*4 SIMD dyadic add operation is realized by the following two instructions.

ADD D0, D1
SIMD16 D1

Here, supposing that the first four pieces of 16-bit data are "0x1234", "0x5678", "0x9ABC" and "0xDEF0", and that each of the second four pieces of 16-bit data are all "0x8080", "0x123456789ABCDEF0" is pre-stored in the D0 register, and "0x8080808080808080" is pre-stored in the D1 register.

FIG. 3B shows the contents of the registers in the 16*4 SIMD dyadic add operation.

(1) Operation Timing 1
EX stage: not relevant.
DEC stage: not relevant.
IF stage: ADD instruction.
The dyadic add instruction "ADD D0, D1" is fetched from the ROM 1, and stored in the IR 2.

(2) Operation Timing 2
EX stage: not relevant.
DEC stage: ADD instruction.
The dyadic add instruction "ADD D0, D1" stored in the IR 2 is decoded by the DEC 3. The result of decoding shows that a 64-bit dyadic add operation is to be executed. Based on the decoding, the contents "0x123456789ABCDEF0" of the D0 register are read and stored in the BR 7, and the contents "0x8080808080808080" of the D1 register are read and stored in the AR 6.

IF stage: SIMD instruction.
The SIMD correction instruction "SIMD16 D1" is fetched from the ROM 1, and stored in the IR 2.

(3) Operation Timing 3
EX stage: ADD instruction.
Based on the result of the decoding by the DEC 3 in the operation timing 2, the ALU 8 performs a 64-bit carry-propagate add operation of A input and B input using the contents of BR 7 as the A input and the contents of AR 6 as the B input, and stores an operation result "0x92B4D6F91B3D5F70" in the D1 register of the register file 4. Furthermore, since the carry for each eight bits of data is C7=1, C15=1, C23=1, C31=1, C39=0, C47=0 and C55=0, the ALU 8 stores carry information "0x0000000101010100" in the CR 9, as shown in FIG. 3B.

(BR) 0x123456789ABCDEF0
(AR)+)0x8080808080808080
_ _ _
(D1) 0x92B4D6F91B3D5F70

DEC stage: SIMD instruction.
The SIMD correction instruction "SIMD16 D1" stored in the IR 2 is decoded by the DEC 3. The result of the decoding shows that four parallel 16-bit data SIMD correction operations are to be executed. Based on the result, the contents "0x92B4D6F91B3D5F70" of the D1 register written in the EX stage are read and stored in the AR 6. Furthermore, the contents "0x0000000101010100" of the CR 9 written in the EX stage are read and 16-bit sign extended by the EXT 5, and the result "0x0000000101010100" is stored in the BR 7.

IF stage: not relevant.
(4) Operation Timing 4
EX stage: SIMD instruction.
Based on the result of the decoding by the DEC 3 in the operation timing 3, the ALU 8 performs a carry-propagate subtract operation for 16-bit units only, using the contents of the BR 7 as the A input and the contents of the AR 6 as the B input, and stores the operation result "0x92B4D6F81B3C5F70" in the D1 register.

(BR) 0x92B4 0xD6F9 0x1B3D 0x5F70
(AR)−)0x0000−)0x0001−)0x0001−)0x0000
_ _ _ _ _ _ _ _ _ _ _ _ _
(D1) 0x92B4 0xD6F8 0x1B3C 0x5F70

The operation result is the SIMD operation result obtained if the respective contents pre-stored in the D0 register and the D1 register are considered to be four pieces of 16-bit data, and corresponding pieces of 16-bit data are dyadic added.

The following shows this SIMD operation result:
(D0) 0x1234 0x5678 0x9ABC 0xDEF0
(D1)+)0x8080+)0x8080+)0x8080+)0x8080
_ _ _ _ _ _ _ _ _ _ _ _
(D1) 0x92B4 0xD6F8 0x1B3C 0x5F70

DEC stage: not relevant.
IF stage: not relevant.

EXAMPLE 3

The following describes an example of an 32*2 SIMD dyadic add operation for dyadic adding in parallel two pieces of 32-bit data respectively to another two pieces of 32-bit data.

If the first two pieces of 32-bit data to be added are stored concatenated in the D0 register as 64-bit data, and similarly, the second two pieces of 32-bit data to be added are stored concatenated in the D1 register as 64-bit data, the 32*2 SIMD dyadic add operation is realized by the following two instructions.

ADD D0, D1
SIMD32 D1

Here, supposing that the first two pieces of 32-bit data are "0x12345678", "0x9ABCDEF0", and that the second two pieces of 32-bit data are both "0x8080808080808080", "0x123456789ABCDEF0" is pre-stored in the D0 register, and "0x8080808080808080" is pre-stored in the D1 register.

FIG. 3C shows the contents of the registers in the 32*2 SIMD dyadic add operation.

(1) Operation Timing 1
EX stage: not relevant.
DEC stage: not relevant.
IF stage: ADD instruction.

The dyadic add instruction "ADD D0, D1" is fetched from the ROM 1, and stored in the IR 2.

(2) Operation Timing 2
EX stage: not relevant.
DEC stage: ADD instruction.

The dyadic add instruction "ADD D0, D1" stored in the IR 2 is decoded by the DEC 3. The result of decoding shows that a 64-bit dyadic add operation is to be executed. Based on the decoding, the contents "0x123456789ABCDEF0" of the D0 register are read and stored in the BR 7, and the contents "0x8080808080808080" of the D1 register are read and stored in the AR 6.

IF stage: SIMD instruction.

The SIMD correction instruction "SIMD32 D1" is fetched from the ROM 1, and stored in the IR 2.

(3) Operation Timing 3
EX stage: ADD instruction.

Based on the result of the decoding by the DEC 3 in the operation timing 2, the ALU 8 performs a 64-bit carry-propagate add operation of A input and B input using the contents of BR 7 as the A input and the contents of AR 6 as the B input, and stores an operation result "0x92B4D6F91B3D5F70" in the D1 register of the register file 4. Furthermore, since the carry for each eight bits of data is C7=1, C15=1, C23=1, C31=1, C39=0, C47=0 and C55=0, the ALU 8 stores carry information "0x0000000101010100" in the CR 9, as shown in FIG. 3C.

(BR)  0x123456789ABCDEF0
(AR)+) 0x8080808080808080
———
(D1)  0x92B4D6F91B3D5F70

DEC stage: SIMD instruction.

The SIMD correction instruction "SIMD32 D1" stored in the IR 2 is decoded by the DEC 3. The result of the decoding shows that two parallel 32-bit SIMD correction operations are is to be executed. Based on the result, the contents "0x92B4D6F91B3D5F70" of the D1 register written in the EX stage are read and stored in the AR 6. Furthermore, the contents "0x0000000101010100" of the CR9 written in the EX stage are read and 32-bit sign extended by the EXT 5, and the result "0x0000000100000000" is stored in the BR 7.

IF stage: not relevant.

(4) Operation Timing 4
EX stage: SIMD instruction.

Based on the result of the decoding by the DEC 3 in the operation timing 3, the ALU 8 performs a carry-propagate subtract operation for 32-bit units only, using the contents of the BR 7 as the A input and the contents of the AR 6 as the B input, and stores the operation result "0x92B4D6F81B3D5F70" in the D1 register.

(BR)  0x92B4D6F9 0x1B3D5F70
(AR)−) 0x00000001−)0x00000000
———
(D1)  0x92B4D6F8 0x1B3D5F70

The operation result is the SIMD operation result obtained if the respective contents pre-stored in the D0 register and the D1 register are considered to be two pieces of 32-bit data, and corresponding pieces of 32-bit data are dyadic added.

The following shows this SIMD operation result:
(D0)  0x12345678 0x9ABCDEF0
(D1)+)0x80808080+)0x80808080
———
(D1)  0x92B4D6F8 0x1B3D5F70

DEC stage: not relevant.
IF stage: not relevant.

EXAMPLE 4

The following describes an example of an 8*8 SIMD dyadic subtract operation for dyadic subtracting eight pieces of eight 8-bit data respectively from another eight pieces of 8-bit data.

If the eight pieces of 8-bit data to be subtracted from are stored concatenated in the D0 register as 64-bit data, and similarly, the eight pieces of 8-bit data to be subtracted are stored concatenated in the D1 register as 64-bit data, the 8*8 SIMD dyadic subtract operation is realized by the following two instructions.

SUB D0, D1
SIMD8 D1

Here, supposing that the pieces of 8-bit data to be subtracted from are "0x12", "0x34", "0x56", "0x78", "0x9A", "0xBC", "0xDE" and "0xF0", and that the pieces of 8-bit data to be subtracted are all "0x70", "0x123456789ABCDEF0" is pre-stored in the D0 register, and "0x7070707070707070" is pre-stored in the D1 register.

FIG. 4A shows the contents of the registers in the 8*8 SIMD dyadic subtract operation.

(1) Operation Timing 1
EX stage: not relevant.
DEC stage: not relevant.
IF stage: SUB instruction.

The dyadic subtract instruction "SUB D0, D1" is fetched from the ROM 1, and stored in the IR 2.

(2) Operation Timing 2
EX stage: not relevant.
DEC stage: SUB instruction.

The dyadic subtract instruction "SUB D0, D1" stored in the IR 2 is decoded by the DEC 3. The result of decoding shows that a 64-bit dyadic subtract operation is to be executed. Based on the decoding, the contents "0x123456789ABCDEF0" of the D0 register are read and stored in the BR 7, and the contents "0x7070707070707070" of the D1 register are read and stored in the AR 6.

IF stage: SIMD instruction.

The SIMD correction instruction "SIMD8 D1" is fetched from the ROM 1, and stored in the IR 2.

(3) Operation Timing 3
EX stage: SUB instruction.

Based on the result of the decoding by the DEC 3 in the operation timing 2, the ALU 8 performs a 64-bit carry-propagate subtract operation of B input from A input using the contents of BR 7 as the A input and the contents of AR 6 as the B input, and stores an operation result "0xA1C3E6082A4C6E80" in the D1 register of the register file 4. Furthermore, since the carry for each eight bits of data is C7=1, C15=1, C23=1, C31=1, C39=1, C47=0 and C55=0, the ALU 8 stores carry information "0xFFFF000000000000" in the CR 9, as shown in FIG. 4A.

Here, since the subtraction A−B is realized by A+ (inverse bit of B)+1, "0x8F8F8F8F8F8F8F90" (2's complement), which is the inverse bit +1 of B input "0x7070707070707070", is added to A input.

(BR) 0x123456789ABCDEF0
2's complement of (AR)+)0x8F8F8F8F8F8F8F90
- - -
(D1) 0xA1C3E6082A4C6E80

DEC stage: SIMD instruction.

The SIMD correction instruction "SIMD8 D1" stored in the IR 2 is decoded by the DEC 3. The result of the decoding shows that eight parallel 8-bit data SIMD correction operations are to be executed. Based on the result, the contents "0xA1C3E6082A4C6E80" of the D1 register written in the EX stage are read and stored in the AR 6. Furthermore, the EXT 5 reads the contents "0xFFFF000000000000" of the CR9 written in the EX stage, which it stores in the BR 7 without sign extending.

IF stage: not relevant.

(4) Operation Timing 4

EX stage: SIMD instruction.

Based on the result of the decoding by the DEC 3 in the operation timing 3, the ALU 8 performs a carry-propagate subtract operation for 8-bit units only, using the contents of the BR 7 as the A input and the contents of the AR 6 as the B input, and stores the operation result "0xA2C4E6082A4C6E80" the D1 register.

(BR) 0xA1 0xC3 0xE6 0x08 0x2A 0x4C 0x6E 0x80
(AR)−)0xFF−)0xFF−)0x00−)0x00−)0x00−)0x00−)0x00−)0x00
- - - - - - - - - - - - - - - - - - - - - - - -
(D1) 0xA2 0xC4 0xE6 0x08 0x2A 0x4C 0x6E 0x80

The operation result is the SIMD operation result obtained if the respective contents pre-stored in the D0 register and the D1 register are considered to be eight pieces of 8-bit data, and corresponding pieces of 8-bit data are dyadic subtracted.

The following shows this SIMD operation result:

(D0) 0x12 0x34 0x56 0x78 0x9A 0xBC 0xDE 0xF0
(D1)−)0x70−)0x70−)0x70−)0x70−)0x70−)0x70−)0x70−)0x70
- - - - - - - - - - - - - - - - - - - - - - - -
(D1) 0xA2 0xC4 0xE6 0x08 0x2A 0x4C 0x6E 0x80

DEC stage: not relevant.
IF stage: not relevant.

EXAMPLE 5

The following describes an example of a 16*4 SIMD dyadic subtract operation for dyadic subtracting in parallel four pieces of 16-bit data respectively from another four pieces of 16-bit data.

If the four pieces of 16-bit data to be subtracted from are stored concatenated in the D0 register as 64-bit data, and similarly, the four pieces of 16-bit data to be subtracted are stored concatenated in the D1 register as 64-bit data, the 16*4 SIMD dyadic subtract operation is realized by the following two instructions.

SUB D0, D1
SIMD16 D1

Here, supposing that the pieces of 16-bit data to be subtracted from are "0x1234", "0x5678", "0x9ABC" and "0xDEF0", and that the pieces of 16-bit data to be subtracted are all "0x7070", "0x123456789ABCDEF0" is pre-stored in the D0 register, and "0x7070707070707070" is pre-stored in the D1 register.

FIG. 4B shows the contents of the registers in the 14*4 SIMD dyadic subtract operation.

(1) Operation Timing 1
EX stage: not relevant.
DEC stage: not relevant.
IF stage: SUB instruction.

The dyadic subtract instruction "SUB D0, D1" is fetched from the ROM 1, and stored in the IR 2.

(2) Operation Timing 2
EX stage: not relevant.
DEC stage: SUB instruction.

The dyadic subtract instruction "SUB D0, D1" stored in the IR 2 is decoded by the DEC 3. The result of decoding shows that a 64-bit dyadic subtract operation is to be executed. Based on the decoding, the contents "0x123456789ABCDEF0" of the D0 register are read and stored in the BR 7, and the contents "0x7070707070707070" of the D1 register are read and stored in the AR 6.

IF stage: SIMD instruction.
The SIMD correction instruction "SIMD16 D1" is fetched from the ROM 1, and stored in the IR 2.

(3) Operation Timing 3
EX stage: SUB instruction.

Based on the result of the decoding by the DEC 3 in the operation timing 2, the ALU 8 performs a 64-bit carry-propagate subtract operation of B input from A input using the contents of BR 7 as the A input and the contents of AR 6 as the B input. An operation result "0xA1C3E6082A4C6E80" is stored in the D1 register of the register file 4. Furthermore, since the carry for each eight bits of data is C7=1, C15=1, C23=1, C31=1, C39=1, C47=0 and C55=0, the ALU 8 stores carry information "0xFFFF000000000000" in the CR 9, as shown in FIG. 4B.

Here, since the subtraction A−B is realized by A+ (inverse bit of B)+1, "0x8F8F8F8F8F8F8F90" (2's complement), which is the inverse bit +1 of B input "0x7070707070707070", is added to the A input.

(BR) 0x123456789ABCDEF0
2's complement of (AR)+)0x8F8F8F8F8F8F8F90
- - -
(D1) 0xA1C3E6082A4C6E80

DEC stage: SIMD instruction.

The SIMD correction instruction "SIMD16 D1" stored in the IR 2 is decoded by the DEC 3. The result of the decoding shows that four parallel 16-bit SIMD correction operations are to be executed. Based on the result, the contents "0xA1C3E6082A4C6E80" of the D1 register written in the EX stage are read and stored in the AR 6. Furthermore, the contents "0xFFFF000000000000" of the CR9 written in the EX stage are read and 16-bit sign extended by the EXT 5, and the result "0xFFFF000000000000" is stored in the BR 7.

IF stage: not relevant.
(4) Operation Timing 4
EX stage: SIMD instruction.

Based on the result of the decoding by the DEC 3 in the operation timing 3, the ALU 8 performs a carry-propagate subtract operation for 16-bit units only, using the contents of the BR 7 is as the A input and the contents of the AR 6 as the B input, and stores the operation result "0xA1C4E6082A4C6E80" is stored in the D1 register.

(BR) 0xA1C3 0xE608 0x2A4C 0x6E80
(AR)−)0xFFFF−)0x0000−)0x0000−)0x0000
- - - - - - - - - - - -
(D1) 0xA1C4 0xE608 0x2A4C 0x6E80

The operation result is the SIMD operation result obtained if the respective contents pre-stored in the D0 register and the D1 register are considered to be four pieces of 16-bit data, and corresponding pieces of 16-bit data are dyadic subtracted.

The following shows this SIMD operation result:
(D0) 0x1234 0x5678 0x9ABC 0xDEF0
(D1)−)0x7070−)0x7070−)0x7070−)0x7070
_ _ _ _ _ _ _ _ _ _ _ _
(D1) 0xA1C4 0xE608 0x2A4C 0x6E80
DEC stage: not relevant.
IF stage: not relevant.

EXAMPLE 6

The following describes an example of a 32*2 SIMD dyadic subtract for dyadic subtracting in parallel two pieces of 32-bit data respectively from another two pieces of 32-bit data.

If the two pieces of 32-bit data to be subtracted from are stored concatenated in the D0 register as 64-bit data, and similarly, the two pieces of 32-bit data to be subtracted are stored concatenated in the D1 register as 64-bit data, the 32*2 SIMD dyadic subtract operation is realized by the following two instructions.
SUB D0, D1
SIMD32 D1

Here, supposing that the pieces of 32-bit data to be subtracted from are "0x12345678", "0x9ABCDEF0", and that the pieces of 32-bit data to subtract are both "0x70707070", "0x123456789ABCDEF0" is pre-stored in the D0 register, and "0x7070707070707070" is pre-stored in the D1 register.

FIG. 4C shows the contents of the registers in the 32*2 SIMD dyadic subtract operation.
(1) Operation Timing 1
EX stage: not relevant.
DEC stage: not relevant.
IF stage: SUB instruction.
The dyadic subtract instruction "SUB D0, D1" is fetched from the ROM 1, and stored in the IR 2.
(2) Operation Timing 2
EX stage: not relevant.
DEC stage: SUB instruction.
The dyadic subtract instruction "SUB D0, D1" stored in the IR 2 is decoded by the DEC 3. The result of decoding shows that a 64-bit dyadic subtract operation is to be executed. Based on the decoding, the contents "0x123456789ABCDEF0" of the D0 register are read and stored in the BR 7, and the contents "0x7070707070707070" of the D1 register are read and stored in the AR 6.
IF stage: SIMD instruction.
The SIMD correction instruction "SIMD32 D1" is fetched from the ROM 1, and stored in the IR 2.
(3) Operation Timing 3
EX stage: SUB instruction.
Based on the result of the decoding by the DEC 3 in the operation timing 2, the ALU 8 performs a 64-bit carry-propagate subtract operation of B input from A input using the contents of BR 7 as the A input and the contents of AR 6 as the B input, and stores the operation result "0xA1C3E6082A4C6E80" in the D1 register of the register file 4. Furthermore, since the carry for each eight bits of data is C7=1, C15=1, C23=1, C31=1, C39=1, C47=0 and C55=0, the ALU 8 stores carry information "0xFFFF000000000000" in the CR 9, as shown in FIG. 4C.

Here, since the subtraction A−B is realized by A+ (inverse bit of B)+1, "0x8F8F8F8F8F8F8F90" (2's complement), which is the inverse bit +1 of B input "0x7070707070707070", is added to A input.
(BR) 0x123456789ABCDEF0
2's complement of (AR)+)0x8F8F8F8F8F8F8F90
_ _ _
(D1) 0xA1C3E6082A4C6E80
DEC stage: SIMD instruction.
The SIMD correction instruction "SIMD32 D1" stored in the IR 2 is decoded by the DEC 3. The result of the decoding shows that two parallel 32-bit data SIMD correction operations are to be executed. Based on the result, the contents "0xA1C3E6082A4C6E80" of the D1 register written in the EX stage are read and stored in the AR 6. Furthermore, the contents "0xFFFF000000000000" of the CR9 written in the EX stage are read and 32-bit sign extended by the EXT 5, and the result "0xFFFF000000000000" is stored in the BR 7.
IF stage: not relevant.
(4) Operation Timing 4
EX stage: SIMD instruction.
Based on the result of the decoding by the DEC 3 in the operation timing 3, the ALU 8 performs a carry-propagate subtract operation for 32-bit units only, using the contents of the BR 7 as the A input and the contents of the AR 6 as the B input, and stores the operation result "0xA1C3E6082A4C6E80" in the D1 register.
(BR) 0xA1C3E608 0x2A4C6E80
(AR)−)0x00000000−)0x00000000
_ _ _ _ _ _
(D1) 0xA1C3E608 0x2A4C6E80
The operation result is the SIMD operation result obtained if the respective contents pre-stored in the D0 register and the D1 register are considered to be two pieces of 32-bit data, and corresponding pieces of 32-bit data are dyadic subtracted.

The following shows this SIMD operation result:
(D0) 0x12345678 0x9ABCDEF0
(D1)−)0x70707070−)0x70707070
_ _ _ _ _ _
(D1) 0xA1C3E608 0x2A4C6E80
DEC stage: not relevant.
IF stage: not relevant.

EXAMPLE 7

The following describes an example of an 8*8 SIMD increment operation for incrementing eight pieces of 8-bit data in parallel.

If the eight pieces of 8-bit data to be incremented are stored concatenated in the D1 register as 64-bit data, the 8*8 SIMD increment operation is realized by the following two instructions.
INC D1
SIMD8 D1

Here, supposing that the pieces of 8-bit data are "0x12", "0x34", "0x56", "0x78", "0x9A", "0xBC", "0xDE" and "0xF0", "0x123456789ABCDEF0" is pre-stored in the D1 register.

FIG. 5A shows the contents of the registers in the 8*8 SIMD increment operation.
(1) Operation Timing 1
EX stage: not relevant.
DEC stage: not relevant.
IF stage: INC instruction.

The increment instruction "INC D1" is fetched from the ROM 1, and stored in the IR 2.

(2) Operation Timing 2

EX stage: not relevant.

DEC stage: INC instruction.

The increment instruction "INC D1" stored in the IR 2 is decoded by the DEC 3. The result of decoding shows that a 64-bit increment operation is to be executed. Based on the decoding, the contents "0x123456789ABCDEF0" of the D1 register are read and stored in the BR 7, and "0x0000000000000001" is stored in the AR 6.

IF stage: SIMD instruction.

The SIMD correction instruction "SIMD8 D1" is fetched from the ROM 1, and stored in the IR 2.

(3) Operation Timing 3

EX stage: INC instruction.

Based on the result of the decoding by the DEC 3 in the operation timing 2, the ALU 8 performs a 64-bit carry-propagate add operation of A input and B input using the contents of BR 7 as the A input and the contents of AR 6 as the B input, and stores the operation result "0x123456789ABCDEF1" in the D1 register of the register file 4. Furthermore, since the carry for each eight bits of data is C7=0, C15=0, C23=0, C31=0, C39=0, C47=0 and C55=0, the ALU 8 stores carry information "0xFFFFFFFFFFFFFF00" in the CR 9, as shown in FIG. 5A.

(BR) 0x123456789ABCDEF0
(AR)+)0x0000000000000001
---
(D1) 0x123456789ABCDEF1

DEC stage: SIMD instruction.

The SIMD correction instruction "SIMD8 D1" stored in the IR 2 is decoded by the DEC 3. The result of the decoding shows that eight parallel 8-bit data SIMD correction operations are to be executed. Based on the result, the contents "0x123456789ABCDEF1" of the D1 register written in the EX stage are read and stored in the AR 6. Furthermore, the contents "0xFFFFFFFFFFFFFF00" of the CR9 written in the EX stage are read and stored in the BR 7 without being sign extending by the EXT 5.

IF stage: not relevant.

(4) Operation Timing 4

EX stage: SIMD instruction.

Based on the result of the decoding by the DEC 3 in the operation timing 3, the ALU 8 performs a carry-propagate subtract operation for 8-bit units only, using the contents of the BR 7 as the A input and the contents of the AR 6 as the B input, and stores the operation result "0x133557799BBDDFF1" in the D1 register.

(BR) 0x12 0x34 0x56 0x78 0x9A 0xBC 0xDE 0xF1
(AR)−)0xFF−)0xFF−)0xFF−)0xFF−)0xFF−)0xFF−)0xFF−)0x00
--------------------------
(D1) 0x13 0x35 0x57 0x79 0x9B 0xBD 0xDF 0xF1

The operation result is the SIMD operation result obtained if the contents pre-stored in the D0 register are considered to be eight pieces of 8-bit data, and are incremented.

The following shows this SIMD operation result:
(D0) 0x12 0x34 0x56 0x78 0x9A 0xBC 0xDE 0xF0
(D1)+)0x01+)0x01+)0x01+)0x01+)0x01+)0x01+)0x01+)0x01
--------------------------
(D1) 0x13 0x35 0x57 0x79 0x9B 0xBD 0xDF 0xF1

DEC stage: not relevant.

IF stage: not relevant.

Note that when the pieces of 8-bit data to be incremented are stored concatenated as 64-bit data in the D1 register, the 8*8 increment operation can also be achieved by the following two instructions.

MOV 0xFFFFFFFFFFFFFFFF,CR
SIMD8 D1

Here, "MOV 0xFFFFFFFFFFFFFFFF,CR" is an instruction for storing "0xFFFFFFFFFFFFFFFF" in the CR 9.

EXAMPLE 8

The following describes an example of a 16*4 SIMD increment operation for incrementing four pieces of 16-bit data in parallel.

If the four pieces of 16-bit data to be incremented are stored concatenated in the D1 register as 64-bit data, the 16*4 SIMD increment operation is realized by the following two instructions

INC D1
SIMD16 D1

Here, supposing that the pieces of 16-bit data are "0x1234", "0x5678", "0x9ABC" and "0xDEF0", "0x123456789ABCDEF0" is pre-stored in the D1 register.

FIG. 5B shows the contents of the registers in the 16*4 SIMD decrement operation.

(1) Operation Timing 1

EX stage: not relevant.

DEC stage: not relevant.

IF stage: INC instruction.

The increment instruction "INC D1" is fetched from the ROM 1, and stored in the IR 2.

(2) Operation Timing 2

EX stage: not relevant.

DEC stage: INC instruction.

The increment instruction "INC D1" stored in the IR 2 is decoded by the DEC 3. The result of decoding shows that a 64-bit increment operation is to be executed. Based on the decoding, the contents "0x123456789ABCDEF0" of the D1 register are read and stored in the BR 7, and "0x0000000000000001" is stored in the AR 6.

IF stage: SIMD instruction.

The SIMD correction instruction "SIMD16 D1" is fetched from the ROM 1, and stored in the IR 2.

(3) Operation Timing 3

EX stage: INC instruction.

Based on the result of the decoding by the DEC 3 in the operation timing 2, the ALU 8 performs a 64-bit carry-propagate add operation of A input and B input using the contents of BR 7 as the A input and the contents of AR 6 as the B input, and stores the operation result "0x123456789ABCDEF1" in the D1 register of the register file 4. Furthermore, since the carry for each eight bits of data is C7=0, C15=0, C23=0, C31=0, C39=0, C47=0 and C55=0, the ALU 8 stores carry information "0xFFFFFFFFFFFFFF00" in the CR 9, as shown in FIG. 5B.

(BR) 0x123456789ABCDEF0
(AR)+)0x0000000000000001
---
(D1) 0x123456789ABCDEF1

DEC stage: SIMD instruction.

The SIMD correction instruction "SIMD16 D1" stored in the IR 2 is decoded by the DEC 3. The result of the decoding shows that four parallel 16-bit SIMD correction operations are to be executed. Based on the result, the contents "0x123456789ABCDEF1" of the D1 register written in the EX stage are read and stored in the AR 6. Furthermore, the contents "0xFFFFFFFFFFFFFF00" of the CR9 written in the EX stage are read and 16-bit sign extended by the EXT 5, and the result "0xFFFFFFFFFFFF0000" is stored in the BR 7.

IF stage: not relevant.

(4) Operation Timing 4

EX stage: SIMD instruction.

Based on the result of the decoding by the DEC 3 in the operation timing 3, the ALU 8 performs a carry-propagate subtract operation for 16-bit units only, using the contents of the BR 7 as the A input and the contents of the AR 6 as the B input, and stores the operation result "0x123556799ABDDEF1" in the D1 register.

(BR) 0x1234 0x5678 0x9ABC 0xDEF1
(AR)−)0xFFFF−)0xFFFF−)0xFFFF−)0x0000
_ _ _ _ _ _ _ _ _ _ _ _
(D1) 0x1235 0x5679 0x9ABD 0xDEF1

The operation result is the SIMD operation result obtained if the contents pre-stored in the D0 register are considered to be four pieces of 16-bit data, and are incremented.

The following shows this SIMD operation result:
(D0) 0x1234 0x5678 0x9ABC 0xDEF0
(D1)+)0x0001+)0x0001+)0x0001+)0x0001
_ _ _ _ _ _ _ _ _ _ _ _
(D1) 0x1235 0x5679 0x9ABD 0xDEF1

DEC stage: not relevant.

IF stage: not relevant.

Note that when the pieces of 16-bit data to be incremented are stored concatenated as 64-bit data in the D1 register, the 16*4 increment operation can also be achieved by the following two instructions.

MOV 0xFFFFFFFFFFFFFFFF,CR
SIMD16 D1

Here, "MOV 0xFFFFFFFFFFFFFFFF,CR" is an instruction for storing "0xFFFFFFFFFFFFFFFF" in the CR 9.

EXAMPLE 9

The following describes an example of a 32*2 SIMD increment operation for incrementing two pieces of 32-bit data in parallel.

If the two pieces of 32-bit data to be incremented are stored concatenated in the D1 register as 64-bit data, the 32*2 SIMD increment operation is realized by the following two instructions.

INC D1
SIMD32 D1

Here, supposing that the pieces of 32-bit data are "0x12345678", "0x9ABCDEF0", "0x123456789ABCDEF0" is pre-stored in the D1 register.

Figure 5C:
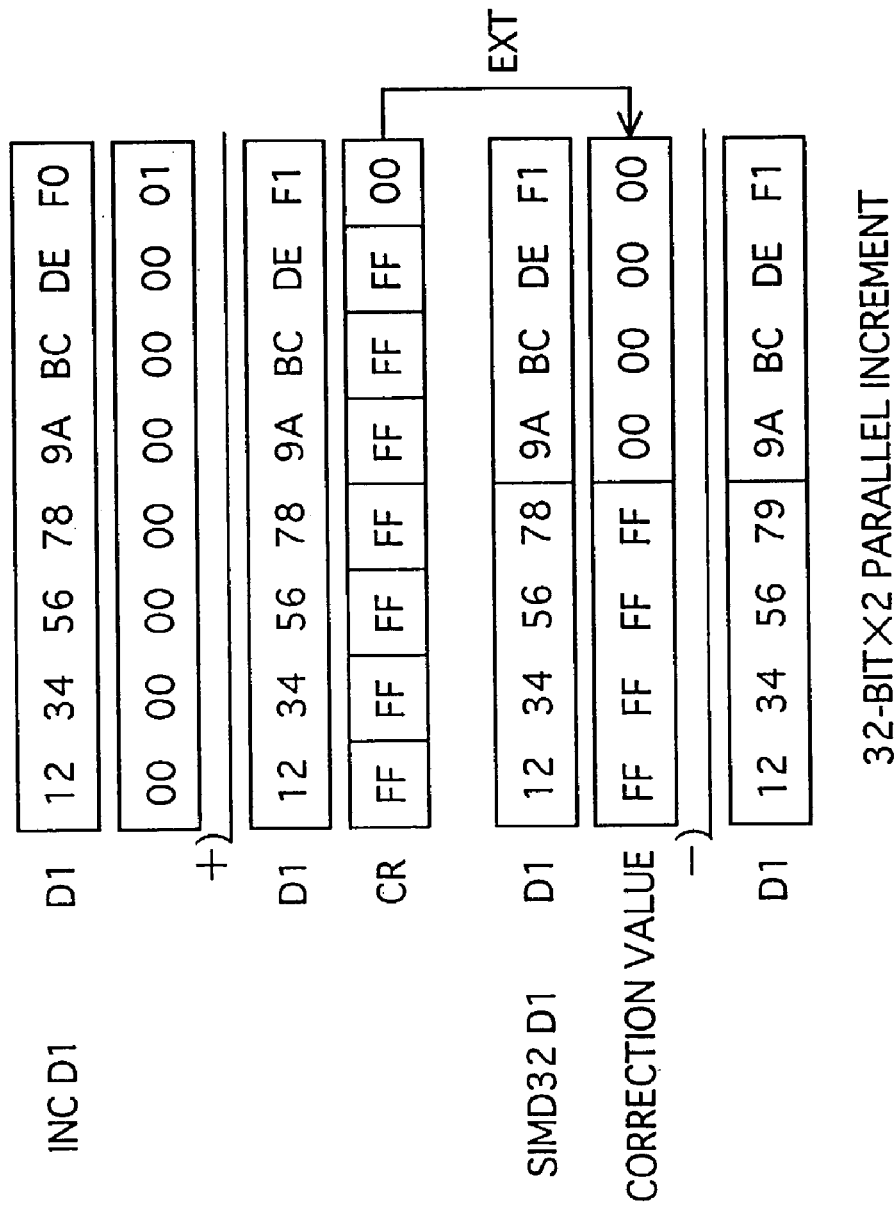

FIG. 5C shows the contents of the registers in the 32*2 SIMD decrement operation.

(1) Operation Timing 1

EX stage: not relevant.

DEC stage: not relevant.

IF stage: INC instruction.

The increment instruction "INC D1" is fetched from the ROM 1, and stored in the IR 2.

(2) Operation Timing 2

EX stage: not relevant.

DEC stage: INC instruction.

The increment instruction "INC D1" stored in the IR 2 is decoded by the DEC 3. The result of decoding shows that a 64-bit increment operation is to be executed. Based on the decoding, the contents "0x123456789ABCDEF0" of the D1 register are read and stored in the BR 7, and "0x0000000000000001" is stored in the AR 6.

IF stage: SIMD instruction.

The SIMD correction instruction "SIMD32 D1" is fetched from the ROM 1, and stored in the IR 2.

(3) Operation Timing 3

EX stage: INC instruction.

Based on the result of the decoding by the DEC 3 in the operation timing 2, the ALU 8 performs a 64-bit carry-propagate add operation of A input and B input using the contents of BR 7 as the A input and the contents of AR 6 as the B input, and stores an operation result "0x123456789ABCDEF1" in the D1 register of the register file 4. Furthermore, since the carry for each 8 bits is C7=0, C15=0, C23=0, C31=0, C39=0, C47=0 and C55=0, the ALU 8 stores carry information "0xFFFFFFFFFFFFFF00" in the CR 9, as shown in FIG. 5C.

(BR) 0x123456789ABCDEF0
(AR)+)0x0000000000000001
_ _ _
(D1) 0x123456789ABCDEF1

DEC stage: SIMD instruction.

The SIMD correction instruction "SIMD32 D1" stored in the IR 2 is decoded by the DEC 3. The result of the decoding shows that two parallel 32-bit data SIMD correction operations is to be executed. Based on the result, the contents "0x123456789ABCDEF1" of the D1 register written in the EX stage are read and stored in the AR 6. Furthermore, the contents "0xFFFFFFFFFFFFFF00" of the CR9 written in the EX stage are read and 32-bit sign extended by the EXT 5, and the result "0xFFFFFFFFFFFF0000" is stored in the BR 7.

IF stage: not relevant.

(4) Operation Timing 4

EX stage: SIMD instruction.

Based on the result of the decoding by the DEC 3 in the operation timing 3, the ALU 8 performs a carry-propagate subtract operation for 32-bit units only, using the contents of the BR 7 as the A input and the contents of the AR 6 as the B input, and stores the operation result "0x123456799ABCDEF1" in the D1 register.

(BR) 0x12345678 0x9ABCDEF1
(AR)−)0xFFFFFFFF−)0x00000000
_ _ _ _ _ _
(D1) 0x12345679 0x9ABCDEF1

The operation result is the SIMD operation result obtained if the contents pre-stored in the D0 register are considered to be two pieces of 32-bit data, and incremented.

The following shows this SIMD operation result:
(D0) 0x12345678 0x9ABCDEF0
(D1)+)0x00000001+)0x00000001
_ _ _ _ _ _
(D1) 0x12345679 0x9ABCDEF1

DEC stage: not relevant.

IF stage: not relevant.

Note that when the pieces of 32-bit data to be incremented are stored concatenated as 64-bit data in the D1 register, the 32*2 increment operation can also be achieved by the following two instructions.

MOV 0xFFFFFFFFFFFFFFFF,CR
SIMD32 D1

Here, "MOV 0xFFFFFFFFFFFFFFFF,CR" is an instruction for storing "0xFFFFFFFFFFFFFFFF" in the CR 9.

EXAMPLE 10

The following describes an example of an 8*8 SIMD decrement operation for decrementing eight pieces of 8-bit data in parallel.

If the eight pieces of 8-bit data to be decremented are stored concatenated in the D1 register as 64-bit data, the 8*8 SIMD decrement operation is realized by the following two instructions

DEC D1
SIMD8 D1

Here, supposing that the pieces of 8-bit data are "0x12", "0x34", "0x56", "0x78", "0x9A", "0xBC", "0xDE" and "0xF0", "0x123456789ABCDEF0" is pre-stored in the D1 register.

FIG. 6A shows the contents of the registers in the 8*8 SIMD increment operation.

(1) Operation Timing 1
EX stage: not relevant.
DEC stage: not relevant.
IF stage: DEC instruction.

The decrement instruction "DEC D1" is fetched from the ROM 1, and stored in the IR 2.

(2) Operation Timing 2
EX stage: not relevant.
DEC stage: DEC instruction.

The decrement instruction "DEC D1" stored in the IR 2 is decoded by the DEC 3. The result of decoding shows that a 64-bit decrement operation is to be executed. Based on the decoding, the contents "0x123456789ABCDEF0" of the D1 register are read and stored in the BR 7, and "0x0000000000000001" is stored in the AR 6.

IF stage: SIMD instruction.

The SIMD correction instruction "SIMD8 D1" is fetched from the ROM 1, and stored in the IR 2.

(3) Operation Timing 3
EX stage: DEC instruction.

Based on the result of the decoding by the DEC 3 in the operation timing 2, the ALU 8 performs a 64-bit carry-propagate subtract operation of B input from A input using the contents of BR 7 as the A input and the contents of AR 6 as the B input, and stores an operation result "0x123456789ABCDEEF" in the D1 register of the register file 4. Furthermore, since the carry for each eight bits of data is C7=1, C15=1, C23=1 C31=1, C39=1, C47=1 and C55=1, the ALU 8 stores carry information "0x0101010101010100" in the CR 9, as shown in FIG. 6A.

Here, since the Subtraction A−B is realized by A+ (inverse bit of B)+1, "0x0000000000000001" (2's complement), which is the inverse bit +1 of B input "0xFFFFFFFFFFFFFFFF", is added to A input.

(BR) 0x123456789ABCDEF0
2's complement of (AR)+)0xFFFFFFFFFFFFFFFF
___

(D1) 0x123456789ABCDEEF
DEC stage: SIMD instruction.

The SIMD correction instruction "SIMD8 D1" stored in the IR 2 is decoded by the DEC 3. The result of the decoding shows that eight parallel 8-bit data SIMD correction operations are to be executed. Based on the result, the contents "0x123456789ABCDEEF" of the D1 register written in the EX stage are read and stored in the AR 6. Furthermore, the EXT 5 reads the contents "0x0101010101010100" of the CR9 written in the EX stage, which it stores in the BR 7 without sign extending.

IF stage: not relevant.

(4) Operation Timing 4
EX stage: SIMD instruction.

Based on the result of the decoding by the DEC 3 in the operation timing 3, the ALU 8 performs a carry-propagate subtract operation for 8-bit units only, using the contents of the BR 7 as the A input and the contents of the AR 6 as the B input, and stores the operation result "0x1133557799BBDDEF" in the D1 register.

(BR) 0x12 0x34 0x56 0x78 0x9A 0xBC 0xDE 0xEF
(AR)−)0x01−)0x01−)0x01−)0x01−)0x01−)0x01−)
0x01−)0x00
___

(D1) 0x11 0x33 0x55 0x77 0x99 0xBB 0xDD 0xEF

The operation result is the SIMD operation result obtained if the contents pre-stored in the D0 register are considered to be eight pieces of 8-bit data, and are decremented.

The following shows this SIMD operation result:
(D0) 0x12 0x34 0x56 0x78 0x9A 0xBC 0xDE 0xF0
(D1)−)0x01−)0x01−)0x01−)0x01−)0x01−)0x01−)0x01−)
0x01
___

(D1) 0x11 0x33 0x55 0x77 0x99 0xBB 0xDD 0xEF
DEC stage: not relevant.
IF stage: not relevant.

Note that when the pieces of 8-bit data to be decremented are stored concatenated as 64-bit data in the D1 register, the 8*8 increment operation can also be achieved by the following two instructions.

MOV 0x0101010101010101,CR
SIMD8 D1

Here, "MOV 0x0101010101010101,CR" is an instruction for storing "0x0101010101010101" in the CR 9.

EXAMPLE 11

The following describes an example of a 16*4 SIMD decrement operation for decrementing four pieces of 16-bit data in parallel.

If the four pieces of 16-bit data to be decremented are stored concatenated in the D1 register as 64-bit data, the 16*4 SIMD decrement operation is realized by the following two instructions.

DEC D1
SIMD16 D1

Here, supposing that the pieces of 16-bit data are "0x1234", "0x5678", "0x9ABC" and "0xDEF0", "0x123456789ABCDEF0" is pre-stored in the D1 register.

FIG. 6B shows the contents of the registers in the 16*4 SIMD decrement operation.

(1) Operation Timing 1
EX stage: not relevant.
DEC stage: not relevant.
IF stage: DEC instruction.

The decrement instruction "DEC D1" is fetched from the ROM 1, and stored in the IR 2.

(2) Operation Timing 2
EX stage: not relevant.
DEC stage: DEC instruction.

The decrement instruction "DEC D1" stored in the IR 2 is decoded by the DEC 3. The result of decoding shows that a 64-bit decrement operation is to be executed. Based on the decoding, the contents "0x123456789ABCDEF0" of the D1 register are read and stored in the BR 7, and "0x0000000000000001" is stored in the AR 6.

IF stage: SIMD instruction.

The SIMD correction instruction "SIMD16 D1" is fetched from the ROM 1, and stored in the IR 2.

(3) Operation Timing 3
EX stage: DEC instruction.

Based on the result of the decoding by the DEC 3 in the operation timing 2, the ALU 8 performs a 64-bit carry-propagate subtract operation of B input from A input using the contents of BR 7 as the A input and the contents of AR

6 as the B input, and stores an operation result "0x123456789ABCDEEF" in the D1 register of the register file 4. Furthermore, since the carry for each eight bits of data is C7=1, C15=1, C23=1, C31=1, C39=1, C47=1 and C55=1, the ALU 8 stores carry information "0x0101010101010100" in the CR 9, as shown in FIG. 6B.

Here, since the subtraction A−B is realized by A+ (inverse bit of B)+1, "0x0000000000000001" (2's complement), which is the inverse bit +1 of B input "0xFFFFFFFFFFFFFFFF", is added to A input.

(BR) 0x123456789ABCDEF0
 2's complement of (AR)+)0xFFFFFFFFFFFFF
 $\overline{\phantom{---}}$
 (D1) 0x123456789ABCDEEF
 DEC stage: SIMD instruction.

The SIMD correction instruction "SIMD16 D1" stored in the IR 2 is decoded by the DEC 3. The result of the decoding shows that four parallel 16-bit data SIMD correction operations are to be executed. Based on the result, the contents "1x123456789ABCDEEF" of the D1 register written in the EX stage are read and stored in the AR 6. Furthermore, the contents "0x0101010101010100" of the CR9 written in the EX stage are read and 16-bit sign extended, and the result "0x0001000100010000" is stored in the BR 7.

IF stage: not relevant.
 (4) Operation Timing 4
 EX stage: SIMD instruction.

Based on the result of the decoding by the DEC 3 in the operation timing 3, the ALU 8 performs a carry-propagate subtract operation for 16-bit units only, using the contents of the BR 7 as the A input and the contents of the AR 6 as the B input, and stores the operation result "0x123356779ABBDEEF" in the D1 register.

(BR) 0x1234 0x5678 0x9ABC 0xDEEF
 (AR)−)0x0001 −)0x0001 −)0x0001 −)0x0000
 $\overline{\phantom{------------}}$
 (D1) 0x1233 0x5677 0x9ABB 0xDEEF The operation result is the SIMD operation result obtained if the contents pre-stored in the D0 register are considered to be four pieces of 16-bit data, and the pieces of 16-bit data are decremented.

The following shows this SIMD operation result:
 (D0) 0x1234 0x5678 0x9ABC 0xDEF0
 (D1)−)0x0001 −)0x0001 −)0x0001 −)0x0000
 $\overline{\phantom{------------}}$
 (D1) 0x1233 0x5677 0x9ABB 0xDEEF
 DEC stage: not relevant.
 IF stage: not relevant.

Note that when the pieces of 16-bit data to be decremented are stored concatenated as 64-bit data in the D1 register, the 16*4 increment operation can also be achieved by the following two instructions.
 MOV 0x0101010101010101,CR
 SIMD16 D1

Here, "MOV 0x0101010101010101,CR" is an instruction for storing "0x0101010101010101" in the CR 9.

EXAMPLE 12

The following describes an example of a 32*2 SIMD decrement operation for decrementing two pieces of 32-bit data in parallel.

If the two pieces of 32-bit data to be decremented are stored concatenated in the D1 register as 64-bit data, the 32*2 SIMD decrement operation is realized by the following two instructions.
 DEC D1
 SIMD32 D1

Here, supposing that the respective pieces of 32-bit data are "0x12345678" and "0x9ABCDEF0", "0x123456789ABCDEF0" is pre-stored in the D1 register.

Figure 6C:
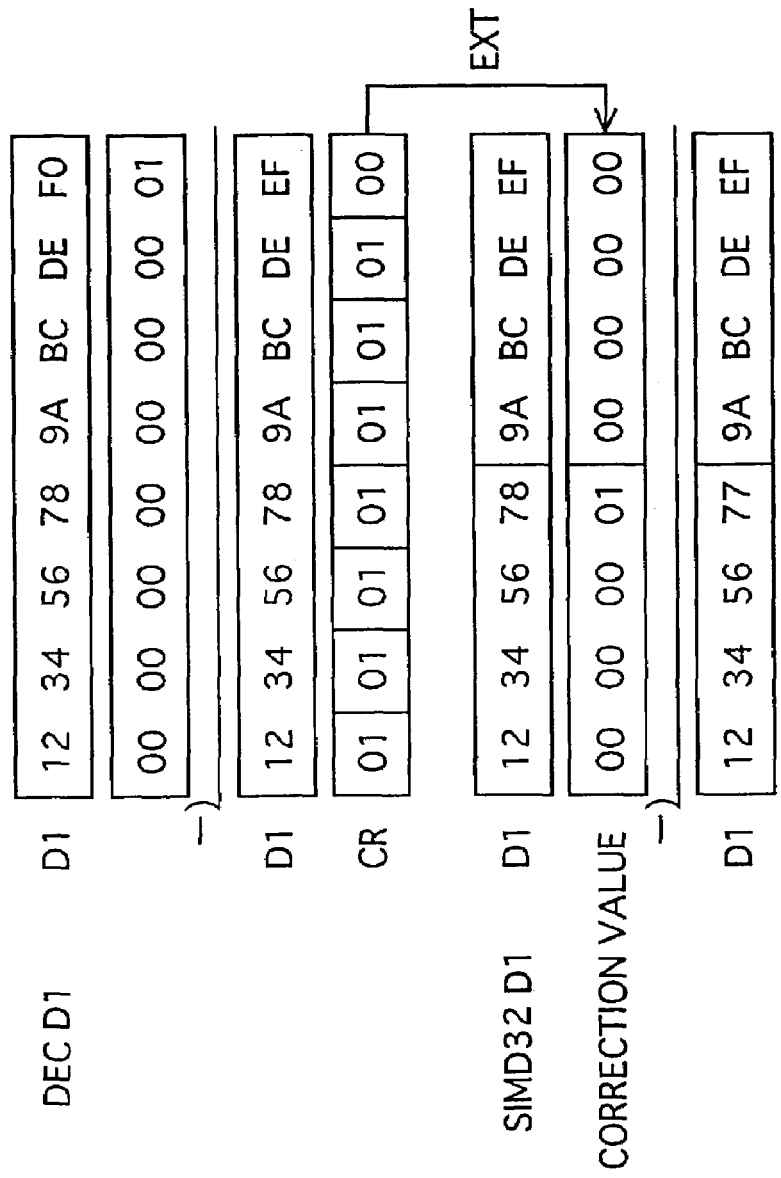

FIG. 6C shows the contents of the registers in the 32*2 SIMD decrement operation.
 (1) Operation Timing 1
 EX stage: not relevant.
 DEC stage: not relevant.
 IF stage: DEC instruction.

The decrement instruction "DEC D1" is fetched from the ROM 1, and stored in the IR 2.
 (2) Operation Timing 2
 EX stage: not relevant.
 DEC stage: DEC instruction.

The decrement instruction "DEC D1" stored in the IR 2 is decoded by the DEC 3. The result of decoding shows that a 64-bit data decrement operation is to be executed. Based on the decoding, the contents "0x123456789ABCDEF0" of the D1 register are read and stored in the BR 7, and "0x0000000000000001" is stored in the AR 6.

IF stage: SIMD instruction.

The SIMD correction instruction "SIMD32 D1" is fetched from the ROM 1, and stored in the IR 2.
 (3) Operation Timing 3
 EX stage: DEC instruction.

Based on the result of the decoding by the DEC 3 in the operation timing 2, the ALU 8 performs a 64-bit carry-propagation subtraction of B input from A input, using the contents of BR 7 as the A input and the contents of AR 6 as the B input, and stores an operation result "0x123456789ABCDEEF" in the D1 register of the register file 4. Furthermore, since the carry for each eight bits of data is C7=1, C15=1, C23=1, C31=1, C39=1, C47=1 and C55=1, the ALU 8 stores carry information "0x0101010101010100" in the CR 9, as shown in FIG. 6C.

Here, since the subtraction A−B is realized by A+ (inverse bit of B)+1, "0x0000000000000001" (2's complement), which is the inverse bit +1 of B input "0xFFFFFFFFFFFFFFFF", is added to A input.

(BR) 0x123456789ABCDEF0
 2's complement of (AR)+)0xFFFFFFFFFFFFHTFFFF
 $\overline{\phantom{---}}$
 (D1) 0x123456789ABCDEEF
 DEC stage: SIMD instruction.

The SIMD correction instruction "SIMD32 D1" stored in the IR 2 is decoded by the DEC 3. The result of the decoding shows that two parallel 32-bit SIMD correction operations are to be executed. Based on the result, the contents "0x123456789ABCDEEF" of the D1 register written in the EX stage are read and stored in the AR 6. Furthermore, the contents "0x0101010101010038 of the CR9 written in the EX stage are read and 32-bit sign extended by the EXT 5, and the result "0x0000000000000001" is stored in the BR 7.

IF stage: not relevant.
 (4) Operation Timing 4
 EX stage: SIMD instruction.

Based on the result of the decoding by the DEC 3 in the operation timing 2, the ALU 8 performs a carry-propagate subtract operation for 32-bit units only, using the contents of the BR 7 as the A input and the contents of the AR 6 as the B input, and stores the operation result "0x123456779ABCDEEF" in the D1 register.

(BR) 0x12345678 0x9ABCDEEF
 (AR)−)0x00000001 −)0x00000000
 $\overline{\phantom{------}}$
 (D1) 0x12345677 0x9ABCDEEF The operation result is the SIMD operation result obtained if the contents pre-stored in the D0 register are considered to be two pieces of 32-bit data, and the pieces of 32-bit data are decremented.

The following shows this SIMD operation result:
(D0) 0x12345678 0x9ABCDEF0
(D1)−)0x00000001−)0x00000001
------
(D1) 0x12345677 0x9ABCDEEF
DEC stage: not relevant.
IF stage: not relevant.

Note that when the pieces of 32-bit data to be decremented are stored concatenated as 64-bit data in the D1 register, the 32*2 increment operation can also be achieved by the following two instructions
MOV 0x0101010101010101,CR
SIMD32 D1

Here, "MOV 0x0101010101010101,CR" is an instruction for storing "0x0101010101010101" in the CR 9.

As described, the processor of the first embodiment of the present invention is able to execute SIMD operations for a plurality of types of operations by simply implementing instructions SIMD8, SIMD16 and SIMD32 in addition to conventional instructions. These additional instructions are not related to the types of operations, but instead to sizes of operations. As a result of this construction, a dramatic increase in the number of instructions is avoided.

Second Embodiment

The second embodiment of the present invention differs from then first embodiment in that, instead of performing correction by subtraction when an SIMD correction instruction is executed, the second embodiment performs correction by addition.

The following describes correction by addition when executing an SIMD correction instruction.

<Structure>

Figure 7:
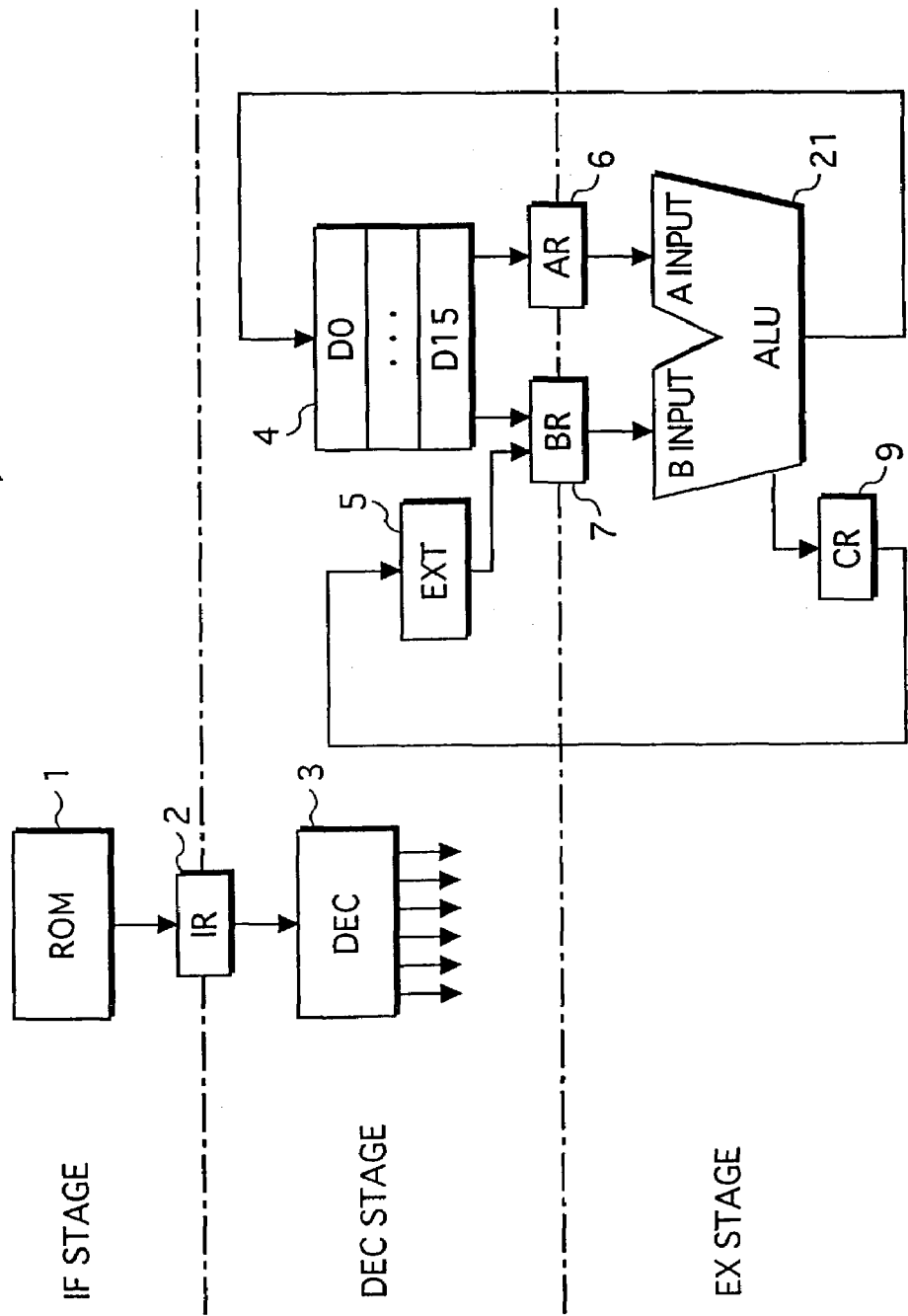
FIG. 7 shows the structure of an SIMD operation apparatus of the second embodiment.

The SIMD operation apparatus of the second embodiment is shown in FIG. 7.

An SIMD operation apparatus 20 shown in FIG. 7 has an ALU 21 instead of the ALT 8 in the SIMD operation apparatus 10 described in the first embodiment. Note that compositional elements of the SIMD operation apparatus 20 that are the same as those of the SIMD operation apparatus 10 have there same numbering thereas, and thus a description of these compositional elements is omitted.

The ALU 21 is a 64-bit adder/subtractor that, when an operation instruction is being executed, performs either an addition A+B or a subtraction A−B, and stores the result of the operation in the registers. Here, the A input and the B input are the respective contents of the AR 6 and the BR 7. In addition, the ALU 21 generates carry information that shows the result of a carry for each eight bits of data that is being subjected to parallel operations, and stores the carry information in the CR9. Furthermore, when an SIMD correction instruction is being executed, the ALU 21 corrects the operation result to SIMD operation results by performing a subtraction A−B so that other SIMD operation results are not affected.

Here, when the dyadic add instruction "ADD D0,D1" or the increment instruction "INC D1" is executed, the ALU 21 performs an addition A+B, and stores the obtained operation result in the D1 register. Here, when the instruction is the dyadic add instruction, the ALU 21 also generates carry information in which "0" shows that there is no carry for eight bits and "−1" shows that there is a carry for eight bits. When the instruction is the increment instruction, the ALU 21 generates also carry information in which "1" shows that there is no carry for eight bits and "0" shows that there is a carry for eight bits. Furthermore, when the dyadic subtract instruction "SUB D0, D1" or the decrement instruction "DEC 01" is executed, the ALU 21 performs a subtraction A−B, and stores the obtained operation result in the D1 register. Here, when the instruction is the dyadic subtract instruction, the ALU 21 also generates carry information in which "1" shows that there is no carry for eight bits and "0" shows that there is a carry for eight bits. When the instruction is the decrement instruction, the ALU 21 generates carry information in which "0" shows that there is no carry for eight bits and "−1" shows that there is a carry for eight bits. In addition, when an 8-bit SIMD correction instruction "SIMD8 D1", a 16-bit SIMD correction instruction "SIMD16 D1", or a 32-bit SIMD correction instruction "SIMD32 D1" is executed, the ALU 8 performs an addition A+B of corresponding numbers of bits so that there is no effect on others, and corrects the operation result that was stored in the D1 register to the SIMD operation results, and stores the SIMD operation result in the D1 register.

Here, processing for fetching a machine language instruction from the ROM 1 and writing the instruction to the instruction register 2 is performed in the IF stage. Decoding of the machine language instruction by the DEC 3, sign extension by the EXT 5 and outputting from the register file 4 and the EXT 5 are performed in the DEC stage. Operation and storing of the carry information to the CR 9 by the ALU 8 are performed in the EX stage.

<Operations>

FIGS. 8A to 8D show examples of the bit structure of carry information stored in the CR 9.

In FIGS. 8A to 8D, numbers 63, 56, 55, 48, 47, 40, 39, 32, 31, 24, 23, 16, 15, 8, 7, and 0 in a horizontal direction express bit positions. The bit position 0 is the LSB (least significant bit), while the not position 63 is the MSB (most significant bit).

Figures 8A, 8B:
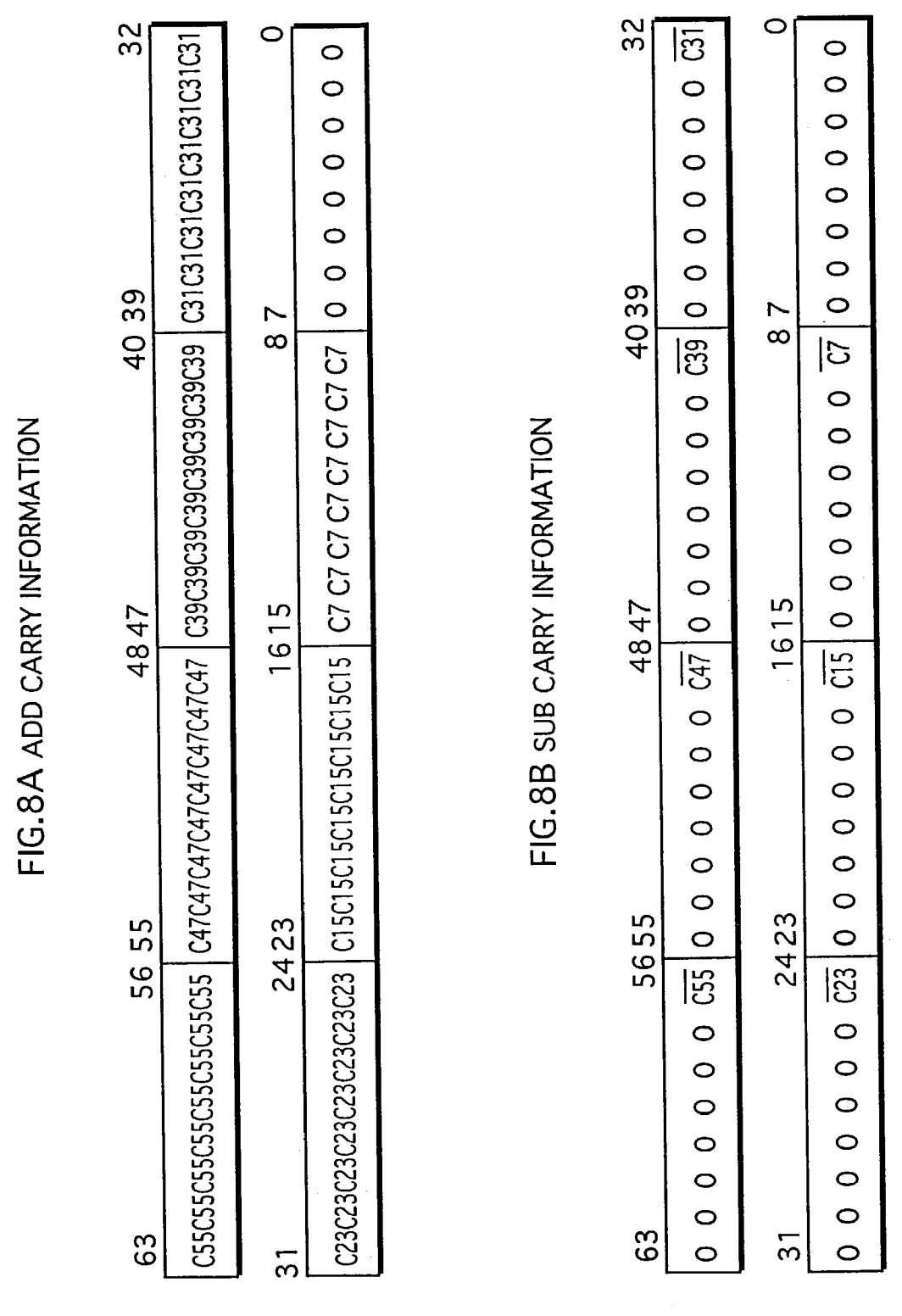

FIG. 8A shows carry information when a dyadic add instruction (ADD instruction) has been executed. When there is no carry from bit position 7 in the operation result a value 0 is recorded in bit position 8, and when there is a carry, an inverse value FF, which is the inverse of the value 0, is recorded in bit position 8 (C7 in FIG. 8A). When there is no carry from bit position 15 in the operation result the value 0 is recorded in bit position 16, and when there is a carry, the inverse value FF is recorded in bit position 16 (C15 in FIG. 8A). When there is no carry from bit position 23 in the operation result the value 0 is recorded in bit position 24, and when there is a carry, the inverse value FF is recorded in bit position 23 (C23 in FIG. 8A). When there is no carry from bit position 31 in the operation result the value 0 is recorded in bit position 32, and when there is a carry, the inverse value FF is recorded in bit position 32 (C31 in FIG. 8A). When there is no carry from bit position 39 in the operation result the value 0 is recorded in bit position 40, and when there is a carry, an inverse value FF is recorded in bit position 40 (C39 in FIG. 8A). When there is no carry from bit position 47 in the operation result the value 0 is recorded in bit position 48, and when there is a carry, the inverse value FF is recorded in bit position 48 (C47 in FIG. 8A). When there is no carry from bit position 55 in the operation result the value 0 is recorded in bit position 56, and when there is a carry, the inverse value FF is recorded in bit position 56 (C55 in FIG. 8A).

FIG. 8B shows carry information when a dyadic subtract instruction (SUB instruction) has been executed. When there is no carry from bit position 7 in the operation result, a value 1 is recorded in bit position 8, and when there is a carry, a value 0 is recorded in bit position 8 (C7 with a line thereabove in FIG. 8B). When there is no carry from bit position 15 in the operation result, the value 1 is recorded in bit position 16, and when there is a carry, the value 0 is recorded in bit position 16 (C15 with a line thereabove in FIG. 8B). When there is no carry from bit position 23 in the operation result, the value 1 is recorded in bit position 24, and when there is a carry, the value 0 is recorded in bit position 24 (C23 with a line thereabove FIG. 8B). When there is no carry from bit position 31 in the operation result, the value 1 is recorded in bit position 32, and when there is a carry, the value 0 is recorded in bit position 32 (C31 with a line thereabove in FIG. 8B). When there is no carry from bit position 39 in the operation result, the value 1 is recorded in bit position 40, and when there is a carry, the value 0 is recorded in bit position 40 (C39 with a line thereabove in FIG. 8B). When there is no carry from bit position 47 in the operation result, the value 1 is recorded in bit position 48, and when there is a carry, the value 0 is recorded in bit position 48 (C47 with a line thereabove in FIG. 8B). When there is no carry from bit position 55 in the operation result, the value 1 is recorded in bit position 56, and when there is a carry, the value 0 is recorded in bit position 56 (C55 with a line thereabove in FIG. 8B).

Figures 8C, 8D:
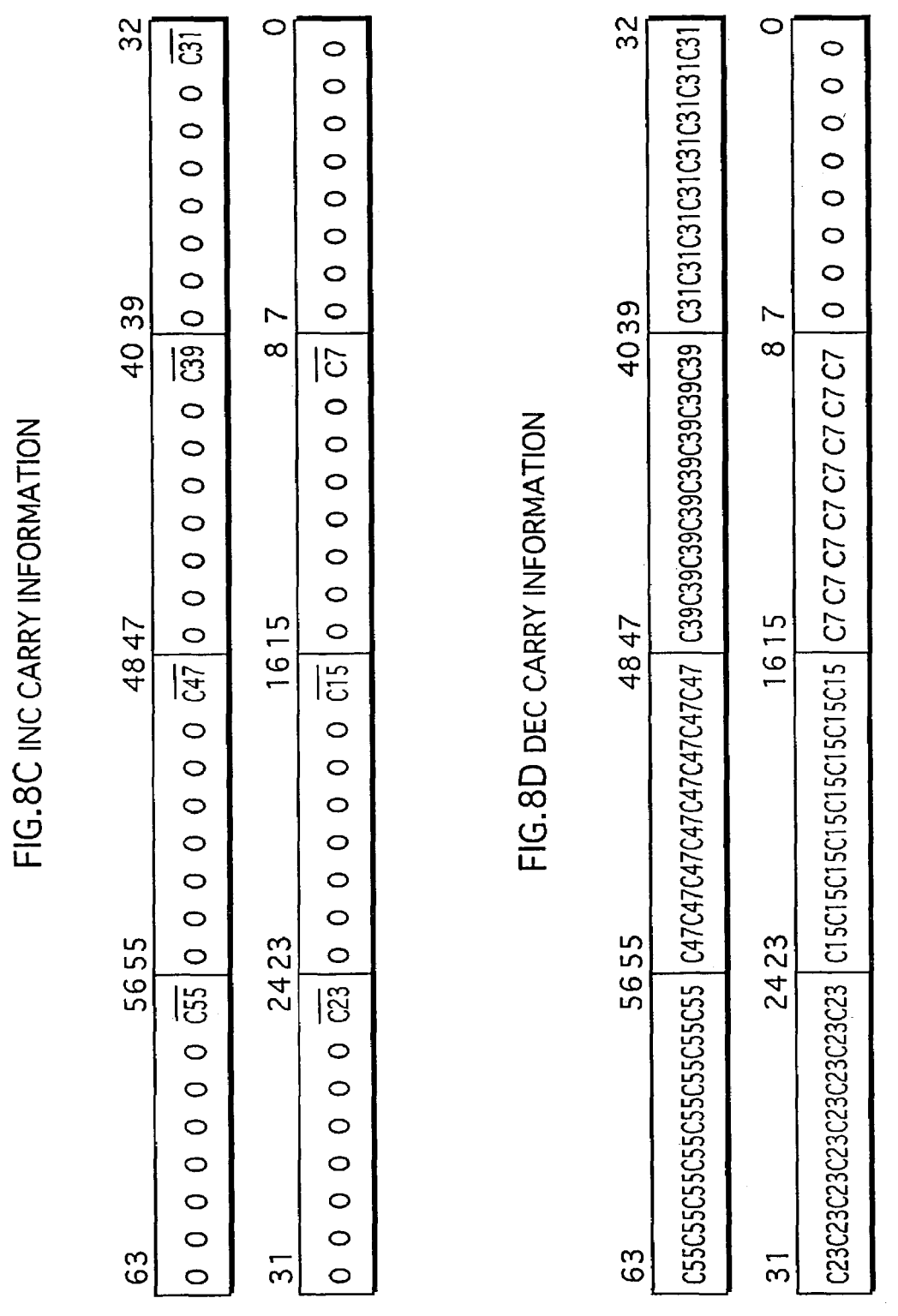

FIG. 8C shows carry information when an increment operation instruction (INC instruction) has been executed, and is the same as FIG. 8B.

FIG. 8D shows carry information when a decrement operation instruction (DEC instruction) has been executed, and is the same as FIG. 8A.

EXAMPLE 1

The following describes an example of an 8*8 SIMD dyadic add operation for dyadic adding in parallel eight pieces of 8-bit data respectively to another eight pieces of 8-bit data.

If the first eight pieces of 8-bit data to be added are stored concatenated in the D0 register as 64-bit data, and similarly, the second eight pieces of 8-bit data to be added are stored concatenated in the D1 register as 64-bit data, the 8*8 SIMD dyadic add operation is realized by the following two instructions.

ADD D0, D1
SIMD8 D1

Here, supposing that the first eight pieces of 8-bit data are "0x2", "0x34", "0x56", "0x78", "0x9A", "0xBC", "0xDE" and "0xF0", and that the second eight pieces of 8-bit data are all "0x80", "0x123456789ABCDEF0" is pre-stored in the D0 register, and "0x8080808080808080" is pre-stored in the D1 register.

Figure 9A:
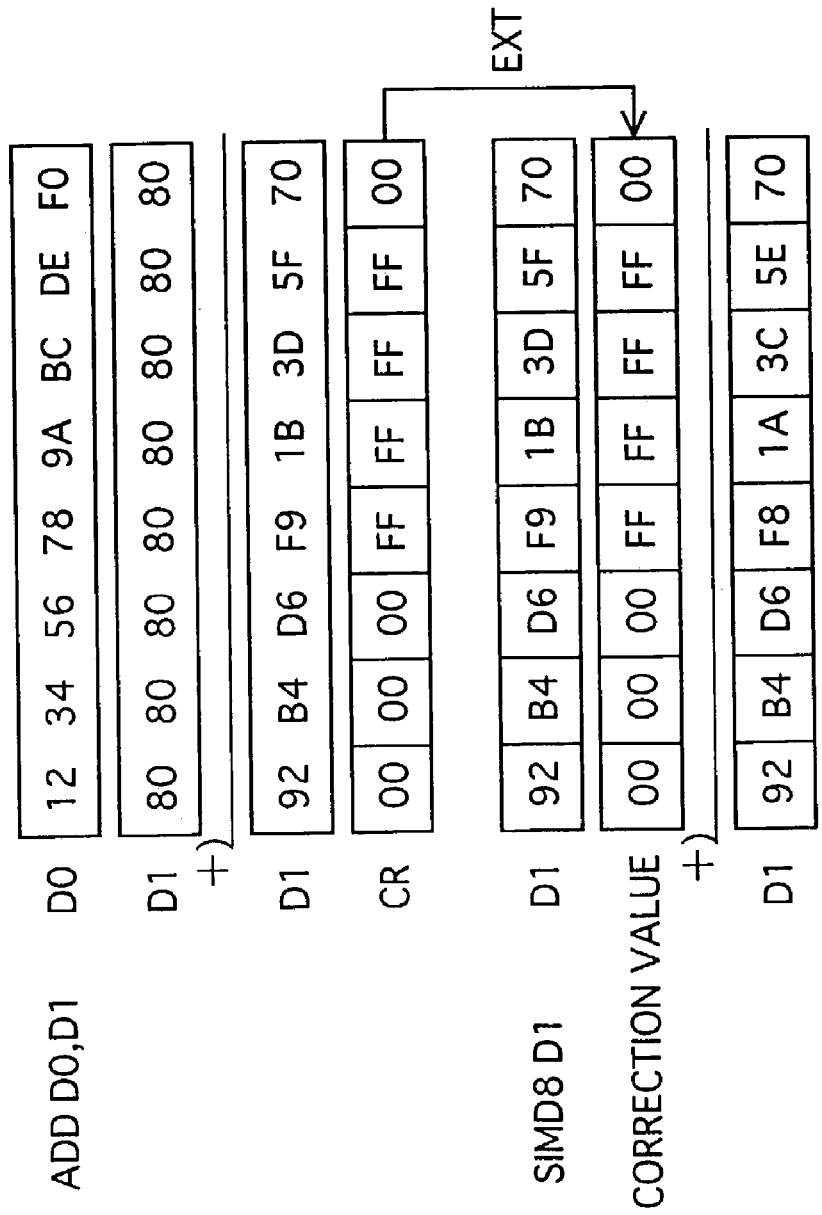

FIG. 9A shows the contents of the registers in the 8*8 SIMD dyadic add operation.

(1) Operation Timing 1
EX stage: not relevant.
DEC stage: not relevant.
IF stage: ADD instruction.
The dyadic add instruction "ADD D0, D1" is fetched from the ROM 1, and stored in the IR 2.
(2) Operation Timing 2
EX stage: not relevant.
DEC stage: ADD instruction.
The dyadic add instruction "ADD D0, D1" stored in the IR 2 is decoded by the DEC 3. The result of decoding shows that a 64-bit dyadic add operation is to be executed. Based on the decoding, the contents "0x123456789ABCDEF0" of the D0 register are read and stored in the BR 7, and the contents "0x8080808080808080" of the D1 register are read and stored in the AR 6.
IF stage: SIMD instruction.
The SIMD correction instruction "SIMD8 D1" is fetched from the ROM 1, and stored in the IR 2.
(3) Operation Timing 3
EX stage: ADD instruction.
Based on the result of the decoding by the DEC 3 in the operation timing 2, the ALU 8 performs a 64-bit carry-propagate add operation of A input and B input using the contents of BR 7 as the A input and the contents of AR 6 as the B input, and stores an operation result "0x92B4D6F91B3D5F70" in the D1 register of the register file 4. Furthermore, since the carry for each eight bits of data is C7=1, C15=1, C23=1, C31=1, C39=0, C47=0 and C55=0, the ALU 8 stores carry information "0x000000FFFFFFFF00" in the CR 9, as shown in FIG. 9A.

(BR) 0x123456789ABCDEF0
(AR)+)0x8080808080808080
———
(D1) 0x92B4D6F91B3D5F70

DEC stage: SIMD instruction.
The SIMD correction instruction "SIMD8 D1" stored in the IR 2 is decoded by the DEC 3. The result of the decoding shows that eight parallel 8-bit data SIMD correction operations are to be executed. Based on the result, the contents "0x92B4D6F91B3D5F70" of the D1 register written in the EX stage are read and stored in the AR 6. Furthermore, the contents "0x000000FFFFFFFF00" of the CR9 written in the EX stage are read and stored in the BR 7 without being sign extended by the EXT 5.
IF stage: not relevant.
(4) Operation Timing 4
EX stage: SIMD instruction.
Based on the result of the decoding by the DEC 3 in the operation timing 3, the ALU 21 performs a carry-propagate add operation for 8-bit units only, using the contents of the BR 7 as the A input and the contents of the AR 6 as the B input, and stores the operation result "0x92B4D6F81A3C5E70" in the D1 register.

(BR) 0x92 0xB4 0xD6 0xF9 0x1B 0x3D 0x5F 0x70
(AR)+)0x00+)0x00+)0x00+)0xFF+)0xFF+)0xFF+)0xFF+)0x00
———
(D1) 0x92 0xB4 0xD6 0xF8 0x1A 0x3C 0x5E 0x70

This operation result is the SIMD operation result obtained if the respective contents pre-stored in the DO register and the D1 register are considered to be eight pieces of 8-bit data, and corresponding pieces of 8-bit data are dyadic added.

The following shows this SIMD operation result:
(D0) 0x12 0x34 0x56 0x78 0x9A 0xBC 0xDE 0xF0
(D1)+)0x80+)0x80+)0x80+)0x80+)0x80+)0x80+)0x80+)0x80
———
(D1) 0x92 0xB4 0xD6 0xF8 0x1A 0x3C 0x5E 0x70

DEC stage: not relevant.
IF stage: not relevant.

EXAMPLE 2

The following describes an example of an 16*4 SIMD dyadic add operation for dyadic adding in parallel four pieces of 16-bit data respectively to another four pieces of 16-bit data.

If the first four pieces of 16-bit data to be added are stored concatenated in the D0 register as 64-bit data, and similarly, the second four pieces of 16-bit data to be added are stored concatenated in the D1 register as 64-bit data, the 16*4 SIMD dyadic add operation is realized by the following two instructions.

ADD D0, D1
SIMD16 D1

Here, supposing that the first four pieces of 16-bit data are "0x1234", "0x5678", "0x9ABC" and "0xDEF0", and that the second four pieces of 16-bit data are all "0x8080", "0x123456789ABCDEF0" is pre-stored in the D0 register, and "0x8080808080808080" is pre-stored in the D1 register.

FIG. 9B shows the contents of the registers in the 14*4 SIMD dyadic add operation.

(1) Operation Timing 1
EX stage: not relevant.
DEC stage: not relevant.
IF stage: ADD instruction.
The dyadic add instruction "ADD D0, D1" is fetched from the ROM 1, and stored in the IR 2.

(2) Operation Timing 2
EX stage: not relevant.
DEC stage: ADD instruction,
The dyadic add instruction "ADD D0, D1" stored in the IR 2 is decoded by the DEC 3. The result of decoding shows that a 64-bit dyadic add operation is to be executed. Based on the decoding, the contents "0x123456789ABCDEF0" of the D0 register are read and stored in the BR 7, and the contents "0x8080808080808080" of the D1 register are read and stored in the AR 6.
IF stage: SIMD instruction.
The SIMD correction instruction "SIMD16 D1" is fetched from the ROM 1, and stored in the IR 2.

(3) Operation Timing 3
EX stage: ADD instruction.
Based on the result of the decoding by the DEC 3 in the operation timing 2, the ALU 21 performs a 64-bit carry-propagate add operation of A input and B input using the contents of BR 7 as the A input and the contents of AR 6 as the B input, and stores an operation result "0x92B4D6F91B3D5F70" in the D1 register of the register file 4. Furthermore, since the carry for each eight bits of data is C7=1, C15=1, C23=1, C31=1, C39=0, C47=0 and C55=0, the ALU 21 stores carry information "0x000000FFFFFFFF00" in the CR 9, as shown in FIG. 9B.
(BR) 0x123456789ABCDEF0
(AR)+)0x8080808080808080
_ _ _
(D1) 0x92B4D6F91B3D5F70
DEC stage: SIMD instruction.
The SIMD correction instruction "SIMD16 D1" stored in the IR 2 is decoded by the DEC 3. The result of the decoding shows that four parallel 16-bit data SIMD correction operations are to be executed. Based on the result, the contents "0x92B4D6F91B3D5F70" of the D1 register written in the EX stage are read and stored in the AR 6. Furthermore, the contents "0x000000FFFFFFFF00" of the CR9 written in the EX stage are read and 16-bit sign extended by the EXT 5, and the result "0x0000FFFFFFFF0000" is stored in the BR 7.
IF stage: not relevant.

(4) Operation Timing 4
EX stage: SIMD instruction.
Based on the result of the decoding by the DEC 3 in the operation timing 3, the ALU 21 performs a carry-propagate add operation for 16-bit units only, using the contents of the BR 7 as the A input and the contents of the AR 6 as the B input, and stores the operation result "0x92B4D6F81B3C5F70" in the D1 register.
(BR) 0x92B4 0xD6F9 0x1B3D 0x5F70
(AR)+)0x0000+)0xFIFF+)0xFHT +)0x0000
_ _ _ _ _ _ _ _ _ _ _ _
(D1) 0x92B4 0xD6F8 0x1B3C 0x5E70

The operation result is the SIMD operation result obtained if the respective contents pre-stored in the D0 register and the D1 register are considered to be four pieces of 16-bit data, and corresponding pieces of 16-bit data are dyadic added.

The following shows this SIMD operation result:
(D0) 0x1234 0x5678 0x9ABC 0xDEF0
(D1)+)0x8080+)0x8080+)0x8080+)0x8080
_ _ _ _ _ _ _ _ _ _ _ _
(D1) 0x92B4 0xD6F8 0x1B3C 0x5F70
DEC stage: not relevant.
IF stage: not relevant.

EXAMPLE 3

The following describes an example of an 32*2 SIMD dyadic add operation for dyadic adding in parallel two pieces of 32-bit data respectively to another two pieces of 32-bit data.

If the first two pieces of 32-bit data to be added are stored concatenated in the D0 register as 64-bit data, and similarly, the second two pieces of 32-bit data to be added are stored concatenated in the D1 register as 64-bit data, the 32*2 SIMD dyadic add operation is realized by the following two instructions.

ADD D0, D1
SIMD32 D1

Here, supposing that the first two pieces of 32-bit data are "0x12345678" and "0x9ABCDEF0", and that the second two pieces of 32-bit data are both "0x80808080", "0x123456789ABCDEF0" is pre-stored in the D0 register, and "0x8080808080808080" is pre-stored in the D1 register.

FIG. 9C shows the contents of the registers in the 32*2 SIMD dyadic add operation.

(1) Operation Timing 1
EX stage: not relevant.
DEC stage: not relevant.
IF stage: ADD instruction.
The dyadic add instruction "ADD D0, D1" is fetched from the ROM 1, and stored in the IR 2.

(2) Operation Timing 2
EX stage: not relevant.
DEC stage: ADD instruction.
The dyadic add instruction "ADD D0, D1" stored in the IR 2 is decoded by the DEC 3. The result of decoding shows that a 64-bit dyadic add operation is to be executed. Based on the decoding, the contents "0x123456789ABCDEF0" of the D0 register are read and stored in the BR 7, and the contents "0x8080808080808080" of the D1 register is read and stored in the AR 6.
IF stage: SIMD instruction.
The SIMD correction instruction "SIMD32 D1" is fetched from the ROM 1, and stored in the IR 2.

(3) Operation Timing 3
EX stage: ADD instruction.
Based on the result of the decoding by the DEC 3 in the operation timing 2, the ALU 21 performs a 64-bit carry-propagate add operation of A input and B input using the contents of BR 7 as the A input and the contents of AR 6 as the B input, and stores an operation result "0x92B4D6F91B3D5F70" in the D1 register of the register file 4. Furthermore, since the carry for each eight bits of data is C7=1, C15=1, C23=1, C31=1, C39=0, C47=0 and C55=0, the ALU 21 stores carry information "0x000000FFFFFFFF00" in the CR 9, as shown in FIG. 9C.

(BR) 0x123456789ABCDEF0
(AR)+)0x8080808080808080
‾ ‾ ‾
(D1) 0x92B4D6F91B3D5F70
DEC stage: SIMD instruction.

The SIMD correction instruction "SIMD32 D1" stored in the IR 2 is decoded by the DEC 3. The result of the decoding shows that two parallel 32-bit SIMD correction operations are to be executed. Based on the result, the contents "0x92B4D6F91B3D5F70" of the D1 register written in the EX stage are read and stored in the AR 6. Furthermore, the contents "0x000000FFFFFFFF00" of the CR9 written in the EX stage are read and 32-bit sign extended, and the result "0xFFFFFFFF00000000" is written in the BR 7.

IF stage: not relevant.

(4) Operation Timing 4
EX stage: SIMD instruction.

Based on the result of the decoding by the DEC 3 in the operation timing 3, the ALU 21 performs a carry-propagate add operation for 32-bit units only, using the contents of the BR 7 as the A input and the contents of the AR 6 as the B input, and stores the operation result "0x92B4D6F81B3D5F70" in the D1 register.

(BR) 0x92B4D6F9 0x1B3D5F70
(AR)+)0xFFFFFFFF+)0x00000000
‾ ‾ ‾ ‾ ‾ ‾
(D1) 0x92B4D6F8 0x1B3D5F70

The operation result is the SIMD operation result obtained if the respective contents pre-stored in the D0 register and the D1 register are considered to be two pieces of 32-bit data, and corresponding pieces of 32-bit data are dyadic added.

The following shows this SIMD operation result:
(D0) 0x12345678 0x9ABCDEF0
(D1)+)0x80808080+)0x80808080
‾ ‾ ‾ ‾ ‾ ‾
(D1) 0x92B4D6F8 0x1B3D5F70
DEC stage: not relevant.
IF stage: not relevant.

EXAMPLE 4

The following describes an example of an 8*8 SIMD dyadic subtract operation for dyadic subtracting eight pieces of eight 8-bit data respectively from another eight pieces of 8-bit data.

If the eight pieces of 8-bit data to be subtracted from are stored concatenated in the D0 register as 64-bit data, and similarly, the eight pieces of 8-bit data to be subtracted are stored concatenated in the D1 register as 64-bit data, the 8*8 SIMD dyadic subtract operation is realized by the following two instructions.

SUB D0, D1
SIMD8 D1

Here, supposing that the pieces of 8-bit data to be subtracted from are "0x12", "0x34", "0x56", "0x78", "0x9A", "0xBC", "0xDE" and "0xF0", and that the pieces of 8-bit data to subtract are all "0x70", "0x123456789ABCDEF0" is pre-stored in the D0 register, and "0x7070707070707070" is pre-stored in the D1 register.

FIG. 10A shows the contents of the registers in the 8*8 SIMD dyadic subtract operation.

(1) Operation Timing 1
EX stage: not relevant.
DEC stage: not relevant.
IF stage: SUB instruction.

The dyadic subtract instruction "SUB D0, D1" is fetched from the ROM 1, and stored in the IR 2.

(2) Operation Timing 2
EX stage: not relevant.
DEC stage: SUB instruction.

The dyadic subtract instruction "SUB D0, D1" stored in the IR 2 is decoded by the DEC 3. The result of decoding shows that a 64-bit dyadic subtract operation is to be executed. Based on the decoding, the contents "0x123456789ABCDEF0" of the D0 register are read and stored in the BR 7, and the contents "0x7070707070707070" of the D1 register are read and stored in the AR 6.

IF stage: SIMD instruction.

The SIMD correction instruction "SIMD8 D1" is fetched from the ROM 1, and stored in the IR 2.

(3) Operation Timing 3
EX stage: SUB instruction,

Based on the result of the decoding by the DEC 3 in the operation timing 2, the ALU 21 performs a 64-bit carry-propagate subtract operation of B input from A input using the contents of BR 7 as the A input and the contents of AR 6 as the B input, and stores an operation result "0xA1C3E6082A4C6E80" in the D1 register of the register file 4. Furthermore, since the carry for each eight bits of data is C7=1, C15=1, C23=1, C31=1, C39=1, C47=0 and C55=0, the ALU 21 stores carry information "0x0101000000000000" in the CR 9, as shown in FIG. 10A.

Here, since the subtraction A−B is realized by A+(inverse bit of B)+1, "0x8F8F8F8F8F8F8F90" (2's complement), which is the inverse bit +1 of B input "0x7070707070707070", is added to A input.

(BR) 0x123456789ABCDEF0
2's complement of (AR)+)0x8F8F8F8F8F8F8F90
‾ ‾ ‾
(D1) 0xA1C3E6082A4C6E80
DEC stage: SIMD instruction.

The SIMD correction instruction "SIMD8 D1" stored in the IR 2 is decoded by the DEC 3. The result of the decoding shows that eight parallel 8-bit data SIMD correction operations are to be executed. Based on the result, the contents "0xA1C3E6082A4C6E80" of the D1 register written in the EX stage are read and stored in the AR 6. Furthermore, the contents "0x0101000000000000" of the CR9 written in the EX stage are read and stored in the BR 7 without being sign extended by the EXT 5.

IF stage: not relevant.

(4) Operation Timing 4

Based on the result of the decoding by the DEC 3 in the operation timing 3, the ALU 21 performs a carry-propagate add operation for 8-bit units only, using the contents of the BR 7 as the A input and the contents of the AR 6 as the B input, and stores the operation result "0xA2C4E6082A4C6E80" in the D1 register.

(BR) 0xA1 0xC3 0xE6 0x08 0x2A 0x4C 0x6E 0x80
(AR)+)0x01+)0x01+)0x00+)0x00+)  0x00+)0x00+)0x00+)0x00
‾ ‾ ‾ ‾ ‾ ‾ ‾ ‾ ‾ ‾ ‾ ‾ ‾ ‾ ‾ ‾ ‾ ‾ ‾ ‾ ‾ ‾ ‾ ‾
(D1) 0xA2 0xC4 0xE6 0x08 0x2A 0x4C 0x6E 0x80

The operation result is the SIMD operation result obtained if the respective contents pre-stored in the D0 register and the D1 register are considered to be eight pieces of 8-bit data, and corresponding pieces of 8-bit data are dyadic subtracted.

The following shows this SIMD operation result:
(D0) 0x12 0x34 0x56 0x78 0x9A 0xBC 0xDE 0xF0
(D1)−)0x70−)0x70−)0x70−)0x70−)0x70−)0x70−)0x70−)0x70
_____
(D1) 0xA2 0xC4 0xE6 0x08 0x2A 0x4C 0x6E 0x80
DEC stage: not relevant.
IF stage: not relevant.

EXAMPLE 5

The following describes an example of a 16*4 SIMD dyadic subtract operation for dyadic subtracting in parallel four pieces of 16-bit data respectively from another four pieces of 16-bit data.

If the four pieces of 16-bit data to be subtracted from are stored concatenated in the D0 register as 64-bit data, and similarly, the four pieces of 16-bit data to be subtracted are stored concatenated in the D1 register as 64-bit data, the 16*4 SIMD dyadic subtract operation is realized by the following two instructions
SUB D0, D1
SIMD16 D1

Here, supposing that the pieces of 16-bit data to be subtracted from are "0x1234", "0x5678", "0x9ABC" and "0xDEF0", and that the pieces of 16-bit data to be subtracted are all "0x7070", "0x123456789ABCDEF0" is pre-stored in the D0 register, and "0x7070707070707070" is pre-stored in the D1 register.

Figure 10B:
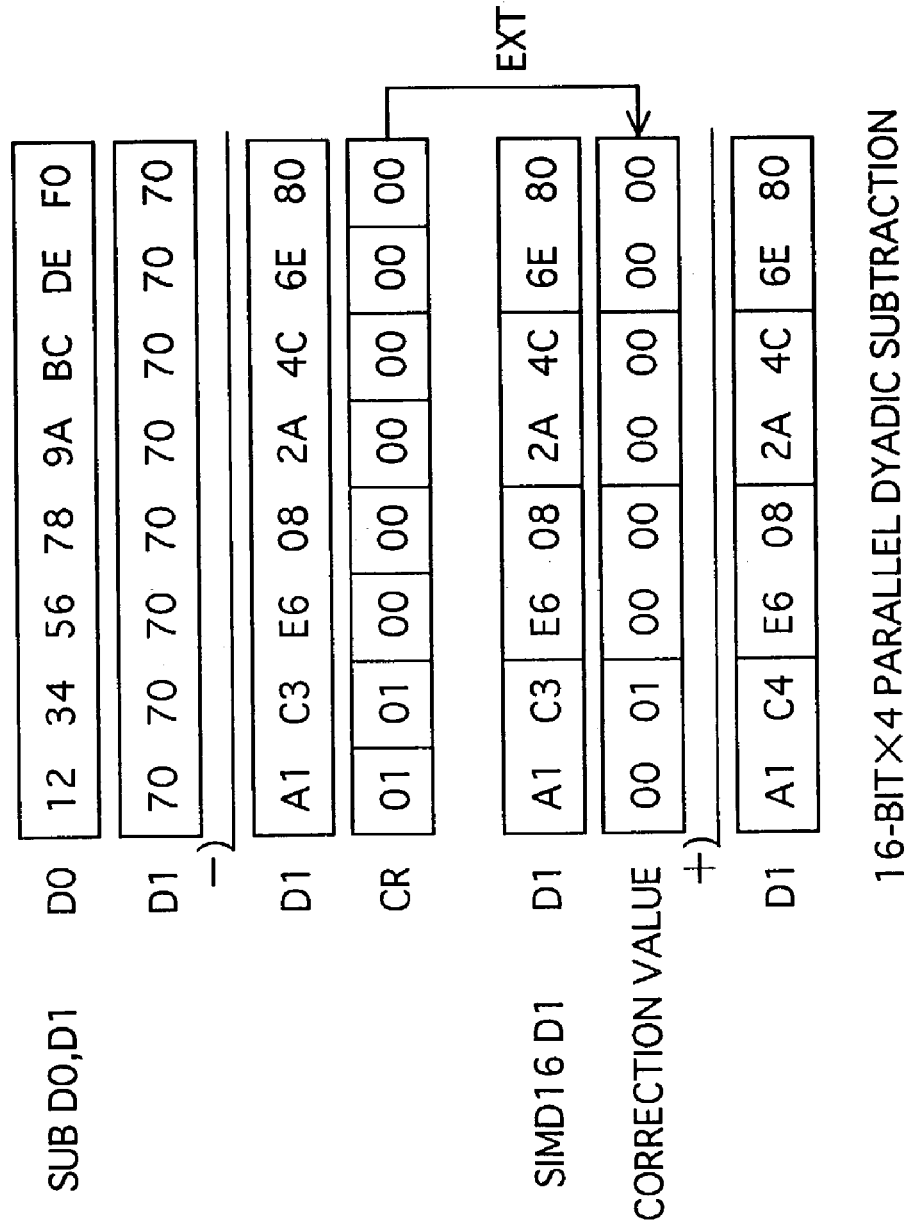

FIG. 10B shows the contents of the registers in the 16*4 SIMD dyadic subtract operation.

(1) Operation Timing 1
EX stage: not relevant.
DEC stage: not relevant.
IF stage: SUB instruction.

The dyadic subtract instruction "SUB D0, D1" is fetched from the ROM 1, and stored in the IR 2.

(2) Operation Timing 2
EX stage: not relevant.
DEC stage: SUB instruction.

The dyadic subtract instruction "SUB D0, D1" stored in the IR 2 is decoded by the DEC 3. The result of decoding shows that a 64-bit dyadic subtract operation is to be executed. Based on the decoding, the contents "0x123456789ABCDEF0" of the D0 register are read and stored in the BR 7, and the contents "0x7070707070707070" of the D1 register are read and stored in the AR 6.

IF stage: SIMD instruction.
The SIMD correction instruction "SIMD16 D1" is fetched from the ROM 1, and stored in the IR 2.

(3) Operation Timing 3
EX stage: SUB instruction.

Based on the result of the decoding by the DEC 3 in the operation timing 2, the ALU 21 performs a 64-bit carry-propagate subtract operation of B input from A input, using the contents of BR 7 as the A input and the contents AR 6 as the B input, and stores an operation result "0xA1C3E6082A4C6E80" in the D1 register of the register file 4. Furthermore, since the carry for each eight bits of data is C7=1, C15=1, C23=1, C31=1, C39=1, C47=0 and C55=0, the ALU 21 stores carry information "0x0101000000000000" in the CR 9, as shown in FIG. 10B.

Here, since the subtraction A−B is realized by A+ (inverse bit of B)+1, "0x8F8F8F8F8F8F8F90" (2's complement), which is the inverse bit+1 of B input "0x7070707070707070", is added to A input.
(BR) 0x123456789ABCDEF0
2's complement of (AR)+)0x8F8F8F8F8F8F8F90
_____
(D1) 0xA1C3E6082A4C6E80
DEC stage: SIMD instruction.

The SIMD correction instruction "SIMD16 D1" stored in the IR 2 is decoded by the DEC 3. The result of the decoding shows that four parallel 16-bit data SIMD correction operations are to be executed. Based on the result, the contents "0xA1C3E6082A4C6E80" of the D1 register written in the EX stage are read and stored in the AR 6. Furthermore, the contents "0x0101000000000000" of the CR 9 written in the EX stage are read and 16-bit sign extended, and the result "0x0001000000000000" is stored in the BR 7.

IF stage: not relevant.
(4) Operation Timing 4
EX stage: SIMD instruction.

Based on the result of the decoding by the DEC 3 in the operation timing 3, the ALU 21 performs a carry-propagate add operation for 16-bit units only, using contents of the BR 7 as the A input and the contents of the AR 6 as the B input, and stores the operation result "0xA1C4E6082A4C6E80" in the D1 register.
(BR) 0xA1C3 0xE608 0x2A4C 0x6E80
(AR)+)0x0001+)0x0000+)0x0000+)0x0000
_____
(D1) 0xA1C4 0xE608 0x2A4C 0x6E80

The operation result is the SIMD operation result obtained if the respective contents pre-stored in the D0 register and the D1 register are considered to be four pieces of 16-bit data, and corresponding pieces of 16-bit data are dyadic subtracted.

The following shows this SIMD operation result:
(D0) 0x1234 0x5678 0x9ABC 0xDEF0
(D1)−)0x7070−)0x7070−)0x7070−)0x7070
_____
(D1) 0xA1C4 0xE608 0x2A4C 0x6E80
DEC stage: not relevant.
IF stage: not relevant.

EXAMPLE 6

The following describes an example of a 32*2 SIMD dyadic subtract operation for dyadic subtracting in parallel two pieces of 32-bit data respectively from another two pieces of 32-bit data.

If the two pieces of 32-bit data to be subtracted from are stored concatenated in the D0 register as 64-bit data, and similarly, the two pieces of 32-bit data to be subtracted are stored concatenated in the D1 register as 64-bit data, the 32*2 SIMD dyadic subtract operation is realized by the following two instructions.
SUB D0, D1
SIMD32 D1

Here, supposing that the pieces of 32-bit data to be subtracted from are "0x12345678", "0x9ABCDEF0", and that the pieces of 32-bit data to be subtracted are all "0x70707070", "0x123456789ABCDEF0" is pre-stored in the D0 register, and "0x7070707070707070" is pre-stored in the D1 register.

FIG. 10C shows the contents of the registers in the 32*2 SIMD dyadic subtract operation.

(1) Operation Timing 1
EX stage: not relevant.
DEC stage: not relevant.
IF stage: SUB instruction.
The dyadic subtract instruction "SUB D0, D1" is fetched from the ROM 1, and stored in the IR 2.
(2) Operation Timing 2
EX stage: not relevant.
DEC stage: SUB instruction.
The dyadic subtract instruction "SUB D0, D1" stored in the IR 2 is decoded by the DEC 3. The result of decoding shows that a 64-bit dyadic subtract operation is to be executed. Based on the decoding, the contents "0x123456789ABCDEF0" of the D0 register are read and stored in the BR 7, and the contents "0x7070707070707070" of the D1 register are read and stored in the AR 6.
IF stage: SIMD instruction.
The SIMD correction instruction "SIMD32 D1" is fetched from the ROM 1, and stored in the IR 2.
(3) Operation Timing 3
EX stage: SUB instruction.
Based on the result of the decoding by the DEC 3 in the operation timing 2, the ALU 21 performs a 64-bit carry-propagate subtract operation of B input from A input, using the contents of BR 7 as the A input and the contents of AR 6 as the B input, and stores an operation result "0xA1C3E6082A4C6E80" in the D1 register of the register file 4. Furthermore, since the carry for each eight bits of data is C7=1, C15=1, C23=1, C31=1, C39=1, C47=0 and C55=0, the ALU 21 stores carry information "0x0101000000000000" in the CR 9, as shown in FIG. 10C.
Here, since the Subtraction A−B is realized by A+(inverse bit of B)+1, the "0x8F8F8F8F8F8F8F90" (2's complement), which is the inverse bit+1 of B input "0x7070707070707070", is added to A input.
(BR) 0x123456789ABCDEF0
2's complement of (AR)+)0x8F8F8F8F8F8F8F90
− − −
(D1) 0xA1C3E6082A4C6E80
DEC stage: SIMD instruction.
The SIMD correction instruction "SIMD32 D1" stored in the IR 2 is decoded by the DEC 3. The result of the decoding shows that two parallel 32-bit SIMD correction operations are to be executed. Based on the result, the contents "0xA1C3E6082A4C6E80" of the D1 register written in the EX stage are read and stored in the AR 6. Furthermore, the contents "0x0101000000000000" of the CR9 written in the EX stage are read and 32-bit sign extended, and the result "0x0000000000000000" is stored in the BR 7.
IF stage: not relevant.
(4) Operation Timing 4
EX stage: SIMD instruction.
Based on the result of the decoding by the DEC 3 in the operation timing 3, the ALU 21 performs a carry-propagation add operation for 32-bit units only, using contents of the BR 7 as the A input and the contents of the AR 6 as the B input, and stores the operation result "x0xA1C3E6082A4C6E80" in the D1 register.
(BR) 0xA1C3E608 0x2A4C6E80
(AR)+)0x00000000+)0x00000000
− − − − − −
(D1) 0xA1C3E608 0x2A4C6E80
The operation result is the SIMD operation result obtained if the respective contents pre-stored in the D0 register and the D1 register are considered to be two pieces of 32-bit data, and corresponding pieces of 32-bit data are dyadic subtracted.
The following shows this SIMD operation result:
(D0) 0x12345678 0x9ABCDEF0
(D1)−)0x70707070−)0x70707070
− − − − − −
(D1) 0xA1C3E608 0x2A4C6E80
DEC stage: not relevant.
IF stage: not relevant.

EXAMPLE 7

Figure 11A:
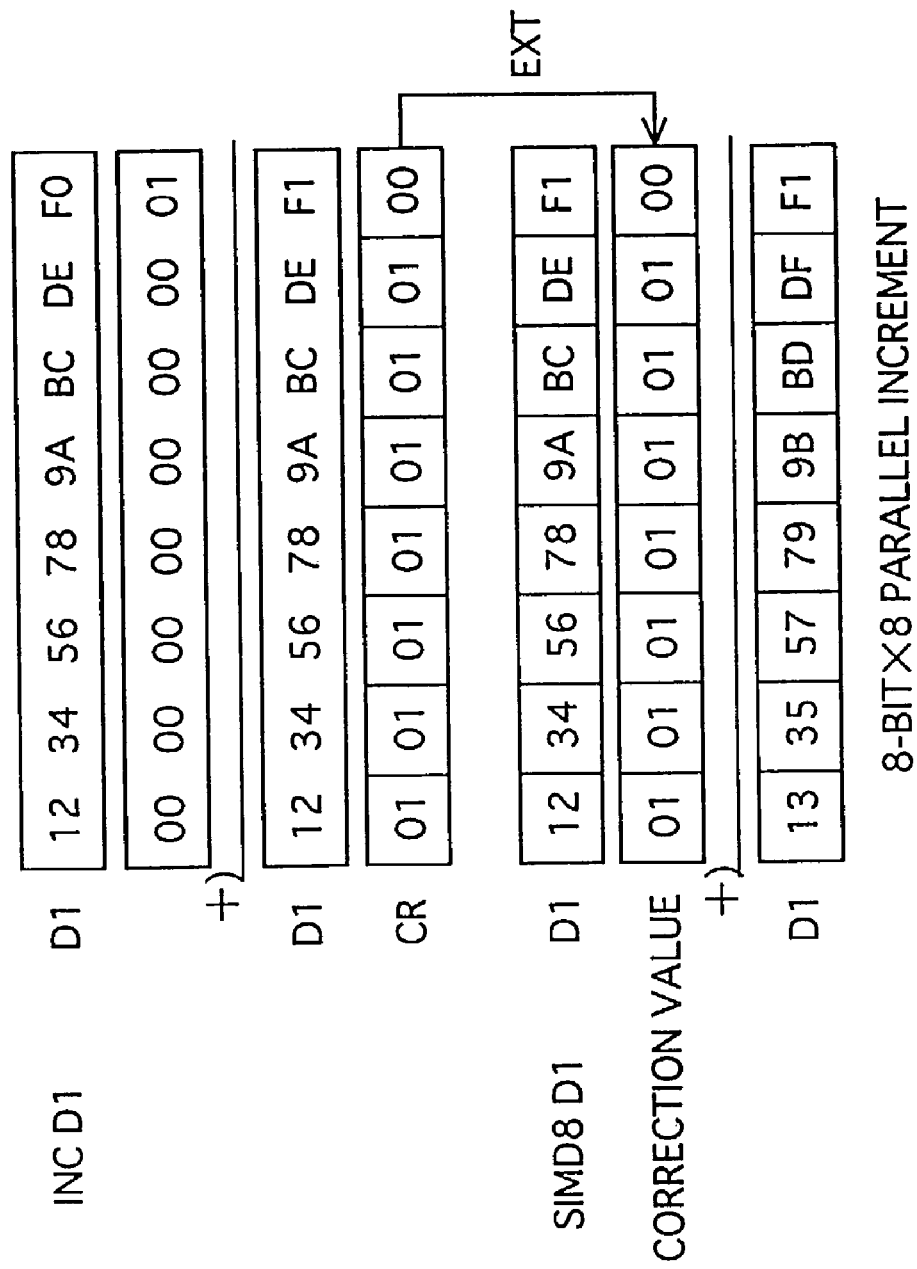
FIGS. 11A to 11C show the contents of the registers during an SIMD increment operation.

The following describes an example of an 8*8 SIMD increment operation for incrementing eight pieces of 8-bit data in parallel.
If the eight pieces of 8-bit data to be incremented are stored concatenated in the D1 register as 64-bit data, the 8*8 SIMD increment operation is realized by the following two instructions.
INC D1
SIMD8 D1
Here, supposing that the pieces of 8-bit data are "0x12", "0x34", "0x56", "0x78", "0x9A", "0xBC", "0xDE" and "0xF0", "0x123456789ABCDEF0" is pre-stored in the D1 register.
FIG. 11A shows the contents of the registers in the 8*8 SIMD increment operation.
(1) Operation Timing 1
EX stage: not relevant.
DEC stage: not relevant.
IF stage: INC instruction.
The dyadic subtract instruction "INC D1" is fetched from the ROM 1, and stored in the IR 2.
(2) Operation Timing 2
EX stage: not relevant.
DEC stage: INC instruction.
The increment instruction "INC D1" stored in the IR 2 is decoded by the DEC 3. The result of decoding shows that a 64-bit data increment operation is to be executed. Based on the decoding, the contents "0x123456789ABCDEF0" of the D1 register are read and stored in the BR 7, and "0x0000000000000" is stored in the AR 6.
IF stage: SIMD instruction.
The SIMD correction instruction "SIMD8 D1" is fetched from the ROM 1, and stored in the IR 2.
(3) Operation Timing 3
EX stage: INC instruction.
Based on the result of the decoding by the DEC 3 in the operation timing 2, the ALU 8 performs a 64-bit carry-propagate add operation of A input and B input using the contents of BR 7 as the A input and the contents of AR 6 as the B input. An operation result "0x123456789ABCDEF1" is stored in the D1 register of the register file 4. Furthermore, since the carry for each eight bits of data is C7=0, C15=0, C23=0, C31=0, C39=0, C47=0 and C55=0, the ALU 8 stores carry information "0x0101010101010100" in the CR 9, as shown in FIG. 11A.
(BR) 0x123456789ABCDEF0
(AR)+)0x0000000000000001
− − −
(D1) 0x123456789ABCDEF1
DEC stage: SIMD instruction.
The SIMD correction instruction "SIMD8 D1" stored in the IR 2 is decoded by the DEC 3. The result of the decoding shows that eight parallel 8-bit data SIMD correction operations are to be executed. Based on the result, the contents "0x123456789ABCDEF1" of the D1 register written in the EX stage are read and stored in the AR 6. Furthermore, the contents "0x0101010101010100" of the CR9 written in the EX stage are read and stored in the BR 7 without being sign extended by the EXT 5.

IF stage: not relevant.

(4) Operation Timing 4

EX stage: SIMD instruction.

Based on the result of the decoding by the DEC 3 in the operation timing 3, the ALU 21 performs a carry-propagate add operation for 8-bit units only, using the contents of the BR 7 as the A input and the contents of AR 6 as the B input, and stores the operation result "0x133557799BBDDFF1" in the D1 register.

(BR) 0x12 0x34 0x56 0x78 0x9A 0xBC 0xDE 0xF1
(AR)+)0x01+)0x01+)0x01+)0x01+)0x01+)0x01+)0x01+)0x00

---

(D1) 0x13 0x35 0x57 0x79 0x9B 0xBD 0xDF 0xF1

The operation result is the SIMD operation result obtained if the contents pre-stored in the D0 register are considered to be eight pieces of 8-bit data, and are incremented.

The following shows this SIMD operation result:
(D0) 0x12 0x34 0x56 0x78 0x9A 0xBC 0xDE 0xF0
(D1)+)0x01+)0x01+)0x01+)0x10+)0x01+)0x01+)0x01+)0x01

---

(D1) 0x13 0x35 0x57 0x79 0x9B 0xBD 0xDF 0xF1

DEC stage: not relevant.

IF stage: not relevant.

Note that when the pieces of 8-bit data to be incremented are stored concatenated as 64-bit data in the D1 register, the 8*8 increment operation can also be achieved by the following two instructions.

MOV 0x0101010101010101,CR
SIMD8 D1

Here, "MOV 0x0101010101010101,CR" is an instruction for storing "0x0101010101010101" in the CR 9.

EXAMPLE 8

The following describes an example of a 16*4 SIMD increment operation for incrementing four pieces of 16-bit data in parallel.

If the four pieces of 16-bit data to be incremented are stored concatenated in the D1 register as 64-bit data, the 16*4 SIMD increment operation is realized by the following two instructions.

INC D1
SIMD16 D1

Here, supposing that the pieces of 16-bit data are "0x1234", "0x5678", "0x9ABC" and "0xDEF0", "0x123456789ABCDEF0" is pre-stored in the D1 register.

Figure 11B:
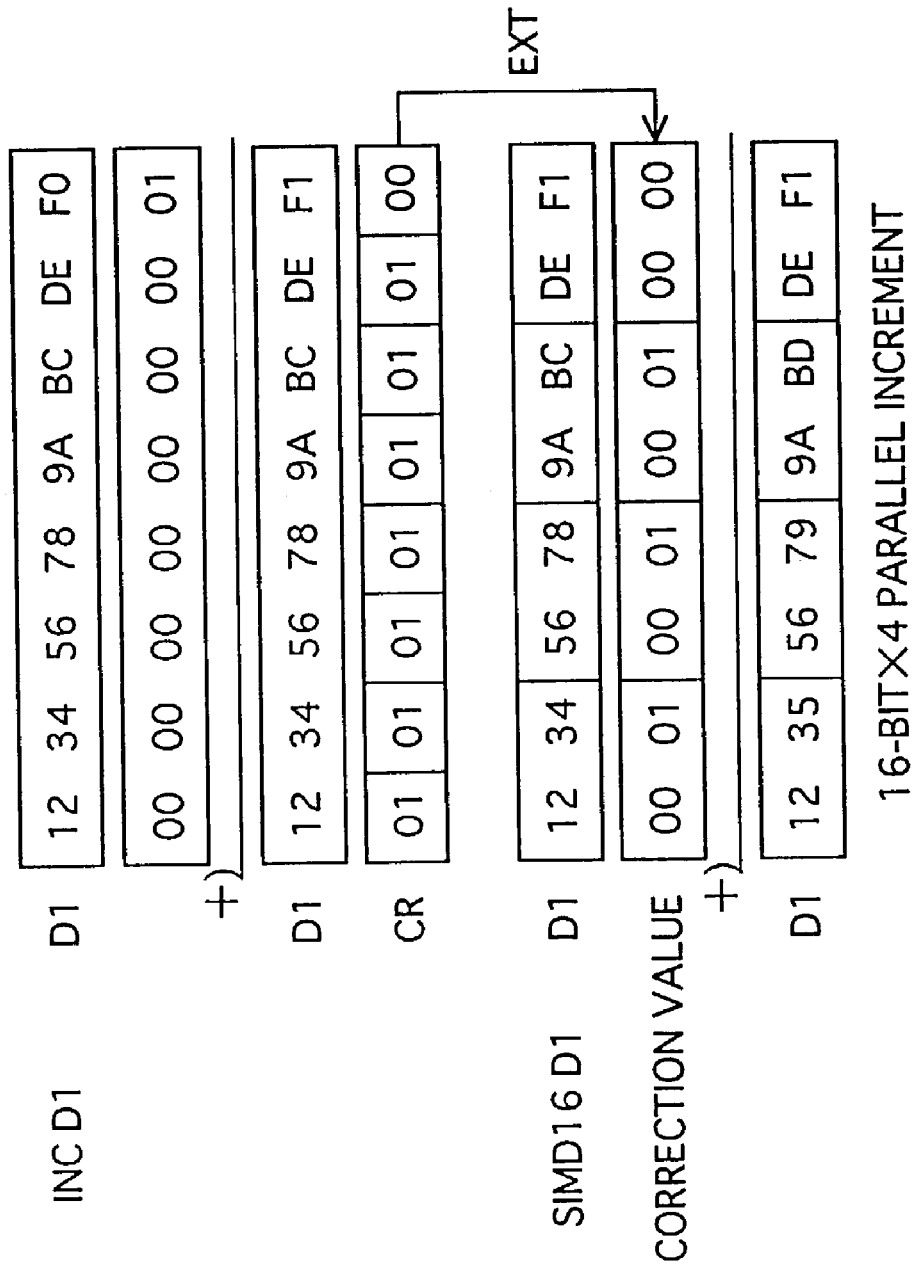

FIG. 11B shows the contents of the registers in the 16*4 SIMD decrement operation.

(1) Operation Timing 1

EX stage: not relevant.

DEC stage: not relevant.

IF stage: INC instruction.

The increment instruction "INC D1" is fetched from the ROM 1, and stored in the IR 2.

(2) Operation Timing 2

EX stage: not relevant.

DEC stage: INC instruction.

The increment instruction "INC D1" stored in the IR 2 is decoded by the DEC 3. The result of decoding shows that a 64-bit increment operation is to be executed. Based on the decoding, the contents "0x123456789ABCDEF0" of the D1 register are read and stored in the BR 7, and "0x0000000000000001" is stored in the AR 6.

IF stage: SIMD instruction.

The SIMD correction instruction "SIMD16 D1" is fetched from the ROM 1, and stored in the IR 2.

(3) Operation Timing 3

EX stage: INC instruction.

Based on the result of the decoding by the DEC 3 in the operation timing 2, the ALU 8 performs a 64-bit carry-propagate add operation of A input and B input using the contents of BR 7 as the A input and the contents of AR 6 as the B input, and stores an operation result "0x123456789ABCDEF1" in the D1 register of the register file 4. Furthermore, since the carry for each eight bits of data is C7=0, C15=0, C23=0, C31=0, C39=0, C47=0 and C55=0, the ALU 8 stores carry information "0x0101010101010100" in the CR 9, as shown in FIG. 11B.

(BR) 0x123456789ABCDEF0
(AR)+)0x0000000000000001

---

(D1) 0x123456789ABCDEF1

DEC stage: SIMD instruction.

The SIMD correction instruction "SIMD16 D1" stored in the IR 2 is decoded by the DEC 3. The result of the decoding shows that four parallel 16-bit data SIMD correction operations are to be executed. Based on the result, the contents "0x123456789ABCDEF1" of the D1 register written in the EX stage are read and stored in the AR 6. Furthermore, the contents "0x0101010101010100" of the CR9 written in the EX stage are read and 16-bit sign extended by the EXT 5, and the result "0x0001000100010000" is stored in the BR 7.

IF stage: not relevant.

(4) Operation Timing 4

EX stage: SIMD instruction.

Based on the result of the decoding by the DEC 3 in the operation timing 3, the ALU 21 performs a carry-propagate add operation for 16-bit units only, using the contents of the BR 7 as the A input and the contents of the AR 6 as the B input, and stores the operation result "0x123556799ABDDEF1" in the D1 register.

(BR) 0x1234 0x5678 0x9ABC 0xDEF1
(AR)+)0x0001+)0x0001+)0x0001+)0x0000

---

(D1) 0x1235 0x5679 0x9ABD 0xDEF1

The operation result is the SIMD operation result obtained if the contents pre-stored in the D0 register are considered to be four pieces of 16-bit data, and are incremented.

The following shows this SIMD operation result:
(D0) 0x1234 0x5678 0x9ABC 0xDEF0
(D1)+)0x0001+)0x0001+)0x0001+)0x0001

---

(D1) 0x1235 0x5679 0x9ABD 0xDEF1

DEC stage: not relevant.

IF stage: not relevant.

Note that when the pieces of 16-bit data to be incremented are stored concatenated as 64-bit data in the D1 register, the 16*4 increment operation can also be achieved by the following two instructions.

MOV 0x01010101010101,CR
SIMD16 D1

Here, "MOV 0x01010101010101,CR" is an instruction for storing "0x01010101010101" in the CR 9.

EXAMPLE 9

The following describes an example of a 32*2 SIMD increment operation for incrementing two pieces of 32-bit data in parallel.

If the two pieces of 32-bit data to be incremented are stored concatenated in the D1 register as 64-bit data, the 32*2 SIMD increment operation is realized by the following two instructions

INC D1
SIMD32 D1

Here, supposing that the pieces of 32-bit data are "0x12345678", "0x9ABCDEF0", "0x123456789ABCDEF0" is pre-stored in the D1 register.

Figure 11C:
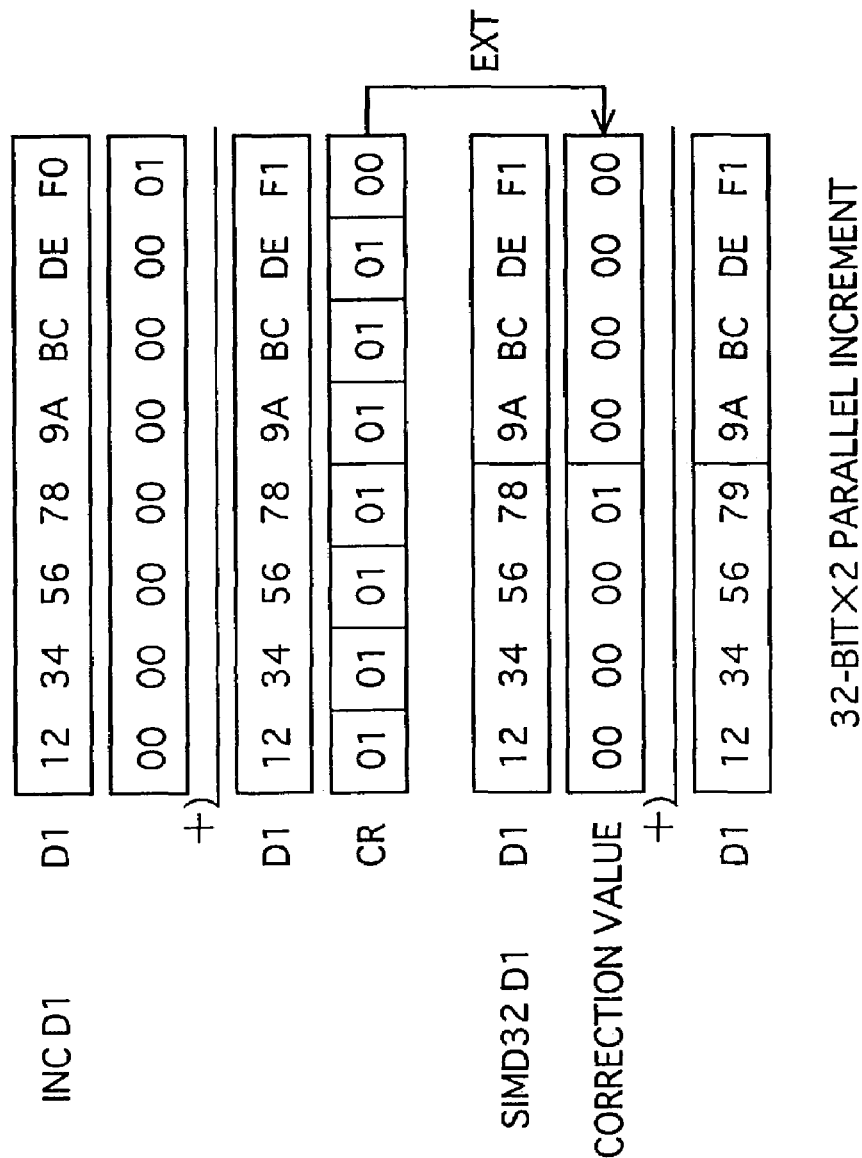

FIG. 11C shows the contents of the registers in the 32*2 SIMD decrement operation.

(1) Operation Timing 1
EX stage: not relevant.
DEC stage: not relevant.
IF stage: INC instruction.

The increment instruction "INC D1" is fetched from the ROM 1, and stored in the IR 2.

(2) Operation Timing 2
EX stage: not relevant.
DEC stage: INC instruction.

The increment instruction "INC D1" stored in the IR 2 is decoded by the DEC 3. The result of decoding shows that a 64-bit increment operation is to be executed. Based on the decoding, the contents "0x123456789ABCDEF0" of the D1 register is read and stored in the BR 7, and "0x0000000000000001" is stored in the AR 6.

IF stage: SIMD instruction.

The SIMD correction instruction "SIMD32 D1" is fetched from the ROM 1, and stored in the IR 2.

(3) Operation Timing 3
EX stage: INC instruction.

Based on the result of the decoding by the DEC 3 in the operation timing 2, the ALU 8 performs a 64-bit carry-propagate add operation of A input and B input using the contents of BR 7 as the A input and the contents of AR 6 as the B input, and stores an operation result "0x123456789ABCDEF1" in the D1 register of the register file 4. Furthermore, since the carry for each 8 bits is C7=0, C15=0, C23=0, C31=0, C39=0, C47=0 and C55=0, the ALU 21 stores carry information "0x0101010101010100" in the CR 9, as shown in FIG. 5C.

(BR) 0x123456789ABCDEF0
(AR)+) 0x0000000000000001
---
(D1) 0x123456789ABCDEF1
DEC stage: SIMD instruction.

The SIMD correction instruction "SIMD32 D1" stored in the IR 2 is decoded by the DEC 3. The result of the decoding shows that two parallel 32-bit data SIMD correction operations are to be executed. Based on the result, the contents "0x123456789ABCDEF1" of the Di register written in the EX stage are read and stored in the AR 6. Furthermore, the contents 0x0101010101010100" of the CR9 written in the EX stage are read and 32-bit sign extended by the EXT 5, and the result "0x0000000100000000" is stored in the BR 7.

IF stage: not relevant.

(4) Operation Timing 4
EX stage: SIMD instruction.

Based on the result of the decoding by the DEC 3 in the operation timing 3, the ALU 21 performs a carry-propagate add operation for 32-bit units only, using the contents of the BR 7 as the A input and the contents of the AR 6 as the B input, and stores the operation result "0x123556799ABDDEF1" in the D1 register.

(BR) 0x12345678 0x9ABCDEF1
(AR)+)0x00000001+)0x00000000
---
(D1) 0x12345679 0x9ABCDEF1

The operation result is the operation result is the SIMD operation result obtained if the contents pre-stored in the D0 register are considered to be two pieces of 32-bit data, and incremented.

The following shows this SIMD operation result:
(D0) 0x12345678 0x9ABCDEF0
(D1)+)0x00000001+)0x00000001
---
(D1) 0x12345679 0x9ABCDEF1
DEC stage: not relevant.
IF stage: not relevant.

Note that when the pieces of 32-bit data to be incremented are stored concatenated as 64-bit data in the D1 register, the 32*2 increment operation can also be achieved by the following two instructions MOV 0x0101010101010101,CR
SIMD32 D1

Here, "MOV 0x0101010101010101,CR" is an instruction for storing "0x0101010101010101" in the CR 9.

EXAMPLE 10

The following describes an example of an 8*8 SIMD decrement operation for decrementing eight pieces of 8-bit data in parallel.

If the eight pieces of 8-bit data to be decremented are stored concatenated in the D1 register as 64-bit data, the 8*8 SIMD decrement operation is realized by the following two instructions

DEC D1
SIMD8 D1

Here, supposing that the pieces of 8-bit data are "0x12", "0x34", "0x56", "0x78", "0x9A", "0xBC", "0xDE" and "0xF0", "0x123456789ABCDEF0" is pre-stored in the D1 register.

Figure 12A:
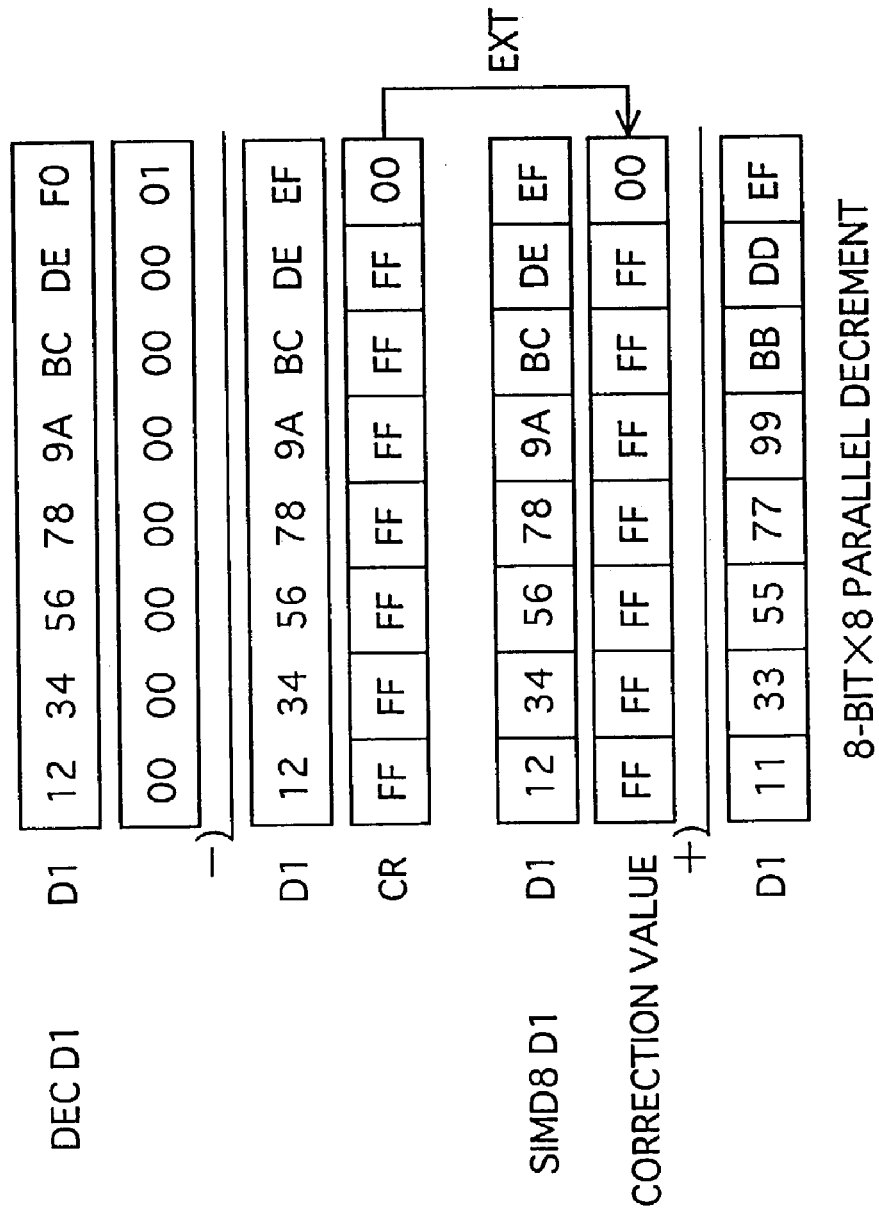

FIG. 12A shows the contents of the registers in the 8*8 SIMD increment operation.

(1) Operation Timing 1
EX stage: not relevant.
DEC stage: not relevant.
IF stage: DEC instruction.

The decrement instruction "DEC D1" is fetched from the ROM 1, and stored in the IR 2.

(2) Operation Timing 2
EX stage: not relevant.
DEC stage: DEC instruction.

The decrement instruction "DEC D1" stored in the IR 2 is decoded by the DEC 3. The result of decoding shows that a 64-bit decrement operation is to be executed. Based on the decoding, the contents "0x123456789ABCDEF0" of the D1 register are read and stored in the BR 7, and "0x0000000000000001" is stored in the AR 6.

IF stage: SIMD instruction.

The SIMD correction instruction "SIMD8 D1" is fetched from the ROM 1, and stored in the IR 2.

(3) Operation Timing 3
EX stage: DEC instruction.

Based on the result of the decoding by the DEC 3 in the operation timing 2, the ALU 8 performs a 64-bit carry-propagate subtract operation of B input from A input using the contents of BR 7 as the A input and the contents of AR

6 as the B input, and stores an operation result "0x123456789ABCDEEF" in the D1 register of the register file 4. Furthermore, since the carry for each eight bits of data is C7=1, C15=1, C23=1, C31=1, C39=1, C47=1 and C55=1, the ALU 21 stores carry information "0xFFFFFFFFFFFFFF00" in the CR 9, as shown in FIG. 12A.

Here, since the Subtraction A−B is realized by A+ (inverse bit of B)+1, "0x0000000000000001" (2's complement), which is the inverse bit +1 of B input "0xFFFFFFFFFFFFFFFF", is added to A input.

(BR) 0x123456789ABCDEF0
2's complement of (AR)+)0xFFFFFFFFFFFFFFFF
‾ ‾ ‾
(D1) 0x123456789ABCDEEF
DEC stage: SIMD instruction.

The SIMD correction instruction "SIMD8 D1"[11] stored in the IR 2 is decoded by the DEC 3. The result of the decoding shows that eight parallel 8-bit data SIMD correction operations are to be executed. Based on the result, the contents "0x123456789ABCDEEF" of the D1 register written in the EX stage are read and stored in the AR 6. Furthermore, the contents "0xFFFFFFFFFFFFFF00" of the CR9 written in the EX stage are read and stored in the BR 7 without being sign extended by the EXT 5.

IF stage: not relevant.

(4) Operation Timing 4

EX stage: SIMD instruction.

Based on the result of the decoding by the DEC 3 in the operation timing 2, the ALU 21 performs a carry-propagate add operation using the contents of the BR 7 as the A input and the contents of the AR 6 as the B input, and stores the operation result "0x1133557799BBDDEF" in the D1 register.

(BR) 0x12 0x34 0x56 0x78 0x9A 0xBC 0xDE 0xEF
(AR)+)0xFF+)0xFF+)0xFF+)0xFF−)0xFF−)0xFF−)0xFF−)0x00
‾ ‾ ‾ ‾ ‾ ‾ ‾ ‾ ‾ ‾ ‾ ‾ ‾ ‾ ‾ ‾ ‾ ‾ ‾ ‾ ‾ ‾ ‾
(D1) 0x11 0x33 0x55 0x77 0x99 0xBB 0xDD 0xEF

The operation result is the SIMD operation result obtained if the contents pre-stored in the D0 register are considered to be eight pieces of 8-bit data, and are decremented.

The following shows this SIMD operation result:

(D0) 0x12 0x34 0x56 0x78 0x9A 0xBC 0xDE 0xF0
(D1)−)0x01−)0x01−)0x01−)0x01−)0x01−)0x01−)0x01−)0x01
‾ ‾ ‾ ‾ ‾ ‾ ‾ ‾ ‾ ‾ ‾ ‾ ‾ ‾ ‾ ‾ ‾ ‾ ‾ ‾ ‾ ‾ ‾
(D1) 0x11 0x33 0x55 0x77 0x99 0xBB 0xDD 0xEF

DEC stage: not relevant.
IF stage: not relevant.

Note that when the pieces of 8-bit data to be decremented are stored concatenated as 64-bit data in the D1 register, the 8*8 increment operation can also be achieved by the following two instructions.

MOV 0xFFFFFFFFFFFFFFFF,CR
SIMD8 D1

Here, "MOV 0xFFFFFFFFFFFFFFFF,CR" is an instruction for storing "0xFFFFFFFFFFFFFFFF" in the CR 9.

EXAMPLE 11

The following describes an example of a 16*4 SIMD decrement operation for decrementing four pieces of 16-bit data in parallel.

If the four pieces of 16-bit data to be decremented are stored concatenated in the D1 register as 64-bit data, the 16*4 SIMD decrement operation is realized by the following two instructions.

DEC D1
SIMD16 D1

Here, supposing that the pieces of 16-bit data are "0x1234", "0x5678", "0x9ABC" and "0xDEF0", "0x123456789ABCDEF0" is pre-stored in the D1 register.

FIG. 12B shows the contents of the registers in the 16*4 SIMD decrement operation.

(1) Operation Timing 1

EX stage: not relevant.

DEC stage: not relevant.

IF stage: DEC instruction.

The decrement instruction "DEC D1" is fetched from the ROM 1, and stored in the IR 2.

(2) Operation Timing 2

EX stage: not relevant.

DEC stage: DEC instruction.

The decrement instruction "DEC D1" stored in the IR 2 is decoded by the DEC 3. The result of decoding shows that a 64-bit decrement operation is to be executed. Based on the decoding, the contents "0x123456789ABCDEF0" of the D1 register are read and stored in the BR 7, and "0x000000000000001" is stored in the AR 6.

IF stage: SIMD instruction.

The SIMD correction instruction "SIMD16 D1" is fetched from the ROM 1, and stored in the IR 2.

(3) Operation Timing 3

EX stage: DEC instruction.

Based on the result of the decoding by the DEC 3 in the operation timing 2, the ALU 8 performs a 64-bit carry-propagate subtract operation of B input from A input using the contents of BR 7 as the A input and the contents of AR 6 as the B input, and stores an operation result "0x123456789ABCDEEF" in the D1 register of the register file 4. Furthermore, since the carry for each eight bits of data is C7=1, C15=1, C23=1, C31=1, C39=1, C47=1 and C55=1, the ALU 21 stores carry information "0xFFFFFFFFFFFFFF00" in the CR 9, as shown in FIG. 12B.

Here, since the Subtraction A−B is realized by A+ (inverse bit of B)+1, "0x0000000000000001" (2's complement), which is the inverse bit +1 of B input "0xFFFFFFFFFFFFFFFF", is added to A input.

(BR) 0x123456789ABCDEF0
2's complement of (AR)+)0xFFFFFFFFFFFFFFFF
‾ ‾ ‾
(D1) 0x123456789ABCDEEF
DEC stage: SIMD instruction.

The SIMD correction instruction "SIMD16 D1" stored in the IR 2 is decoded by the DEC 3. The result of the decoding shows that four parallel 16-bit data SIMD correction operations are to be executed. Based on the result, the contents "0x123456789ABCDEEF" of the D1 register written in the EX stage are read and stored in the AR 6. Furthermore, the contents "0xFFFFFFFFFFFFFF00" of the CR9 written in the EX stage are read and 16-bit sign extended by the EXT 5, and the result "0xFFFFFFFFFFFF0000" is stored in the BR 7.

IF stage: not relevant.

(4) Operation Timing 4

EX stage: SIMD instruction.

Based on the result of the decoding by the DEC 3 in the operation timing 2, the ALU 21 performs a carry-propagate add operation for 16-bit units only, using the contents of the BR 7 as the A input and the contents of the AR 6 as the B input, and stores the operation result "0x123356779ABBDEEF" in the D1 register.

(BR) 0x1234 0x5678 0x9ABC 0xDEEF
(AR)+)0xFFFF+)0xFFFF+)0xFFFF+)0x0000
‾ ‾ ‾ ‾ ‾ ‾ ‾ ‾ ‾ ‾ ‾ ‾ ‾ ‾
(D1) 0x1233 0x5677 0x9ABB 0xDEEF

The operation result is the SIMD operation result obtained if the contents pre-stored in the D0 register are considered to be four pieces of 16-bit data, and the pieces of 16-bit data are decremented.

The following shows this SIMD operation result:
(D0) 0x1234 0x5678 0x9ABC 0xDEF0
(D1)−)0x0001−)0x0001−)0x0001−)0x0000
‾ ‾ ‾ ‾ ‾ ‾ ‾ ‾ ‾ ‾ ‾ ‾ ‾ ‾
(D1) 0x1233 0x5677 0x9ABB 0xDEEF DEC stage: not relevant.
IF stage: not relevant.

Note that when the pieces of 16-bit data to be decremented are stored concatenated as 64-bit data in the D1 register, the 16*4 increment operation can also be achieved by the following two instructions.

MOV 0xFFFFFFFFFFFFFFFF,CR
SIMD16 D1

Here, "MOV 0xFFFFFFFFFFFFFFFF,CR" is an instruction for storing "0xFFFFFFFFFFFFFFFF" in the CR 9.

EXAMPLE 12

The following describes an example of a 32*2 SIMD decrement operation for decrementing two pieces of 32-bit data in parallel.

If the two pieces of 32-bit data to be decremented are stored concatenated in the D1 register as 64-bit data, the 32*2 SIMD decrement operation is realized by the following two instructions.

DEC D1
SIMD32 D1

Here, supposing that the pieces of 32-bit data are "0x12345678" and "0x9ABCDEF0", "0x123456789ABCDEF0" is pre-stored in the D1 register.

FIG. 12C shows the contents of the registers in the 32*2 SIMD increment operation.

(1) Operation Timing 1
EX stage: not relevant.
DEC stage: not relevant.
IF stage: DEC instruction.

The decrement instruction "DEC D1" is fetched from the ROM 1, and stored in the IR 2.

(2) Operation Timing 2
EX stage: not relevant.
DEC stage: DEC instruction.

The decrement instruction "DEC D1" stored in the IR 2 is decoded by the DEC 3. The result of decoding shows that a 64-bit data decrement operation is to be executed. Based on the decoding, the contents "0x123456789ABCDEF0" of the D1 register are read and stored in the BR 7, and "0x0000000000000001" is stored in the AR 6.

IF stage: SIMD instruction.

The SIMD correction instruction "SIMD32 D1" is fetched from the ROM 1, and stored in the IR 2.

(3) Operation Timing 3
EX stage: DEC instruction.

Based on the result of the decoding by the DEC 3 in the operation timing 2, the ALU 21 performs a 64-bit carry-propagation subtraction of B input from A input, using the contents of BR 7 as the A input and the contents of AR 6 as the B input, and stores the operation result "0x123456789ABCDEEF" in the D1 register of the register file 4. Furthermore, since the carry for each eight bits of data is C7=1, C15=1, C23=1, C31=1, C39=1, C47=1 and C55=1, the ALU 21 stores carry information "0xFFFFFFFFFFFFFF00" in the CR 9, as shown in FIG. 12C.

Here, since the Subtraction A−B is realized by A+ (inverse bit of B)+1, "0x0000000000000000" (2's complement) which is the inverse bit +1 of B input "0xFFFFFFFFFFFFFFFF", is added to A input.

(BR) 0x123456789ABCDEF0
2's complement of (AR)+)0xFFFFFFFFFFFFFFFF
‾ ‾ ‾
(D1) 0x123456789ABCDEEF DEC stage: SIMD instruction.

The SIMD correction instruction "SIMD32 D1" stored in the IR 2 is decoded by the DEC 3. The result of the decoding shows that an two parallel 32-bit data SIMD correction operations are to be executed. Based on the result, the contents "0x123456789ABCDEEF" of the D1 register written in the EX stage are read and stored in the AR 6. Furthermore, the contents "0xFFFFFFFFFFFFFF00" of the CR9 written in the EX stage are read and 32-bit sign extended by the EXT 5, and the result "0xFFFFFFFF00000000" is stored in the BR 7.

IF stage: not relevant.

(4) Operation Timing 4
EX stage: SIMD instruction.

Based on the result of the decoding by the DEC 3 in the operation timing 3, the ALU 21 performs a carry-propagate add operation for 32-bit units only, using the contents of the BR 7 as the A input and the contents of the AR 6 as the B input, and stores the operation result "0x123456779ABCDEEF" in the D1 register.

(BR) 0x12345678 0x9ABCDEEF
(AR)+)0xFFFFFFFF+)0x00000000
‾ ‾ ‾ ‾ ‾ ‾
(D1) 0x12345677 0x9ABCDEEF

The operation result is the SIMD operation result obtained if the contents pre-stored in the D0 register are considered to be two pieces of 32-bit data, and the pieces of 32-bit data are decremented.

The following shows this SIMD operation result:
(D0) 0x12345678 0x9ABCDEF0
(D1)−)0x00000001−)0x00000001
‾ ‾ ‾ ‾ ‾ ‾
(D1) 0x12345677 0x9ABCDEEF DEC stage: not relevant.
IF stage: not relevant.

Note that when the pieces of 32-bit data to be decremented are stored concatenated as 64-bit data in the D1 register, the 32*2 increment operation can also be achieved by the following two instructions.

MOV 0xFFFFFFFFFFFFFFFF,CR
SIMD32 D1

Here, "MOV 0xFFFFFFFFFFFFFFFF,CR" is an instruction for storing "0xFFFFFFFFFFFFFFFF" in the CR 9.

As described, the processor of the second embodiment of the present invention is able to execute SIMD operations for a plurality of types of operations by simply implementing instructions SIMD8, SIMD16 and SIMD32 in addition to conventional instructions. These additional instructions are not related to the types of operations, but instead to sizes of operations. As a result of this construction, a dramatic increase in the number of instructions is avoided.

Third Embodiment

<Outline>

The third embodiment differs from the first and second embodiments, which describe addition and subtraction, in that it describes other operations such as multiplication and division.

<Structure>

FIG. 13 shows the structure of an SIMD operation apparatus of the present invention.

An SIMD operation apparatus 30 shown in FIG. 13 has a DEC 31, an AR 32, a BR 33 and an ALU 34 instead of the DEC 3, the AR 6, the BR 7 and the ALU 8, respectively, in the SIMD operation apparatus 10 described in the first embodiment. Furthermore, the SIMD operation apparatus 30 has a CR 35 and a CR 36 instead of the CR 9 in the SIMD operation apparatus 10, and there is no EXT 5 in the SIMD operation apparatus 30. Note that compositional elements of the SIMD operation apparatus 30 that are the same as those of the SIMD operation apparatus 10 have there same numbering thereas, and thus a description of these compositional elements is omitted.

The DEC 31 is an instruction decoder that decodes the machine language instruction stored by the IR 2 and controls the various composition elements of the SIMD operation apparatus accordingly.

Here, the instructions that the DEC 31 decodes are: a dyadic multiply instruction "MUL D0,D1", a dyadic divide instruction "DIV D0,D1", the 8-bit SIMD correction instruction "SIMD8 D1", the 16-bit SIMD correction instruction "SIMD16 D1", and other operation instructions.

The AR 32 is a 64-bit register that stores output from the register file 4.

The AR 32 stores the output from the D1 register when the instruction is the dyadic multiply instruction "MUL D0,D1", the dyadic divide instruction "DIV D0,D1", the 8-bit SIMD correction instruction "SIMD8 D1", the 16-bit SIMD correction instruction "SIMD16 D1" or another operation instruction.

The BR 33 is a 64-bit register, and, according to a machine language instruction, selects and stores the output from either the register file 4, the CR 35 or the CR 36.

Here, the BR 33 selects and stores the output from the D0 register when the dyadic multiply instruction "MUL D0, D1", the dyadic divide instruction "DIV D0, D1" or another operation instruction is executed, the output from the CR 35 when the 8-bit SIMD correction instruction "SIMD8 D1" is executed, and the output from the CR 36 when the 16-bit SIMD correction instruction "SIMD16 D1" is executed.

The ALU 34 is a 64-bit adder/subtractor, multiplier divider, and other operation device. When an operation instruction is executed, the ALU 34 performs a multiplication A*B, a division A/B, or another operation, and has the operation result stored in the registers. The ALU 34 also generates correction data for correcting the operation result to an SIMD operation result, and stores the SIMD operation result in the CR 35 and CR 36. Furthermore, when an SIMD correction operation is executed, the ALU 34 performs a subtraction A−B, and corrects the operation results thereof to various SIMD operation results.

Here, the ALU 34 performs a multiplication A*B when the dyadic multiply operation instruction "MUL D0, D1" is executed, a division A/B when the dyadic divide instruction "DIV D0, D1" is executed and another operation as appropriate when another operation instruction is executed, and has the operation result stored in the registers. In addition, the ALU 34 generates 8-bit correction data that is the difference between the operation result obtained here and the 8-bit SIMD operation result, has the 8-bit correction data stored in the CR 35, and generates 16-bit correction data that is the difference between the operation result obtained here and the 16-bit SIMD operation result, and has the 16-bit correction data stored in the CR 36. Furthermore, when the 8-bit SIMD correction instruction "SIMD8 D1" and the 16-bit SIMD correction instruction "SIMD16 D1" are executed, the ALU 34 performs the subtraction A−B, and corrects the operation result stored in the D1 register to the SIMD operation results, and has the SIMD operation results stored in the D1 register.

Each of the CR 35 and the CR 36 is a 64-bit register that stores correction data. The CR 35 stores correction data for 8-bit SIMD correction, and the CR 36 stores correction data for 16-bit SIMD correction.

Here, processing for fetching a machine language instruction from the ROM 1 and writing the instruction to the instruction register 2 is performed in the IF stage. Decoding of the machine language instruction by the DEC 3, and output from the register file 4, the CR 35 and the CR 36 are performed in the DEC stage. Operation by the ALU 34 and storing of the correction data to the CR 35 and the CR 36 are performed in the EX stage.

Operations

EXAMPLE 1

The following describes an operation example of an 8*4 SIMD dyadic multiply operation for dyadic multiplying four pieces of 8-bit data respectively with another four pieces of 8-bit data.

If the first four pieces of 8-bit data to be multiplied are stored concatenated in the lower part of the D0 register, and the second four pieces of 8-bit data to be multiplied are stored in the lower part of the D1 register, the 8*4 SIMD dyadic multiply operation is realized by the following two instructions.

MUL D0, D1

SIMD8 D1

Here, supposing that the first four pieces of 8-bit data are "0x12", "0x34", "0x56" and "0x78", and that the second four pieces of 8-bit data are all "0x88", "0x0000000012345678" is pre-stored in the D0 register, and "0x0000000088888888" is pre-stored in the D1 register.

Figure 14:
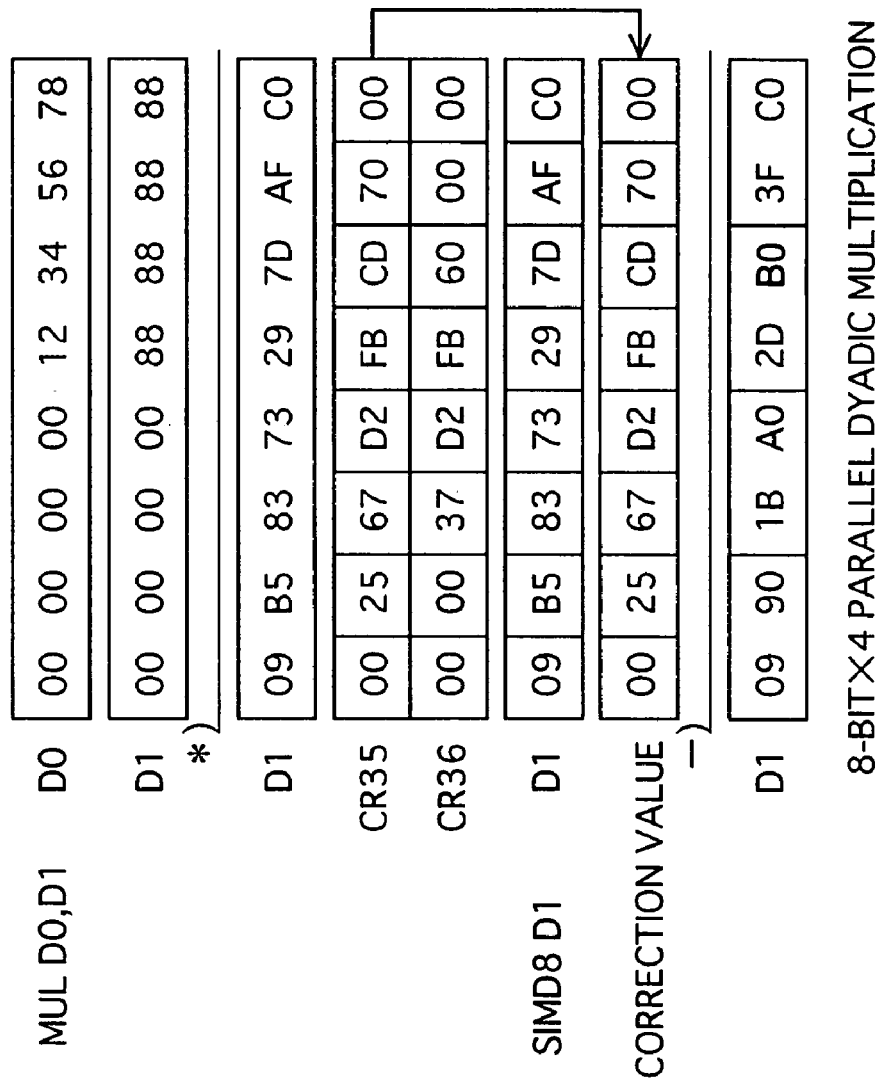
FIG. 14 shows the contents of the registers during an 8*4 SIMD dyadic multiply operation.

FIG. 14 shows the contents of the registers in the 8*4 SIMD dyadic multiple operation.

(1) Operation Timing 1

EX stage: not relevant.

DEC stage: not relevant.

IF stage: MUL instruction.

The dyadic multiply instruction "MUL D0, D1" is fetched from the ROM 1, and stored in the IR 2.

(2) Operation Timing 2

EX stage: not relevant.

DEC stage: MUL instruction.

The dyadic multiply instruction "MUL D0, D1" stored in the IR 2 is decoded by the DEC 3. The result of decoding shows that a 32-bit data dyadic multiply operation is to be executed. Based on the decoding, the contents "0x0000000012345678" of the D0 register are read and stored in the BR 33, and the contents "0x0000000088888888" of the D1 register are read and stored in the AR 32.

IF stage: SIMD8 instruction.

The SIMD correction instruction "SIMD8 D1" is fetched from the ROM 1, and stored in the IR 2.

(3) Operation Timing 3 (Referred to as operation timing 3 to 3+α in cases in which several blocks are necessary.)
EX stage: MUL instruction.
Based on the result of the decoding by the DEC 3 in the operation timing 2, the ALU 34 performs an unsigned 64-bit multiplication to multiply A input by B input, using the contents of the BR 33 as the A input and the contents of the AR 32 as the B input, and stores an operation result "0x09B58373297DAFC0" in the D1 register of the register file 4.

(BR) 0x0000000012345678
(AR) *) 0x0000000088888888

– – –

0x000000009A2B3C0←"0x12345678"* "0x0000000"
0x000000091A2B3C00←"0x12345678"* "0x00000080"
0x00000091A2B3C000←"0x12345678"* "0x00000800"
0x0000091A2B3C0000←"0x12345678"* "0x00008000"
0x000091A2B3C00000←"0x12345678"* "0x00080000"
0x00091A2B3C000000←"0x12345678"* "0x00800000"
0x0091A2B3C0000000←"0x12345678"* "0x08000000"
+)0x091A2B3C00000000←"0x12345678"* "0x80000000"

– – –

(D1) 0x09B58373297DAFC0

Furthermore, the ALU 34 generates 8-bit correction data and 16-bit correction data, which it stores in the CR 35 and the CR 36 respectively.

The following shows an example of a method for calculating the 16-bit correction data.

The ALU 34 masks the least significant 16 bits of the contents "0x0000000012345678" of the BR 33:

"0x0000000012345678" and
"FFFFFFFFFFFF0000"="0x0000000012340000"    <<1>>.

The ALU 34 masks bits other than the least significant 16 bits of the contents "0x0000000088888888" of the AR 32:

"0x0000000088888888" and
"0x000000000000FFFF"="0x0000000000008888"    <<2>>.

The ALU 34 then multiplies <<1>> and <<2>>:
0x0000000012340000
*)0x0000000000008888

– – –

0x0000000091A00000←"0x12340000"* "00000008"
0x000000091A000000←"0x12340000"* "00000080"
0x00000091A0000000←"0x12340000"* "00000800"
+)0x0000091A00000000←"0x12340000"* "00008000"

– – –

0x000009B54BA00000    <<3>>.

The ALU 34 then masks bits other than the least significant 16 bits of the contents "0x0000000012345678" of the BR 33:

"0x0000000012345678" and
"0x000000000000FFFF"="0x0000000000005678"    <<4>>.

The ALU 34 then masks bits other than the least significant 16 bits of the contents "0x0000000088888888" of the AR 32:

"0x0000000088888888" AND
"0xFFFFFFFFFFFF0000"="0x0000000088880000"    <<5>>.

The ALU 34 then multiplies <<4>> and <<5>>:
0x0000000000005678
*) 0x0000000088880000

– – –

0x00000002B3C00000←"0x00005678"* "0x00080000"
0x0000002B3C000000←"0x00005678"* "0x00800000"
0x000002B3C0000000←"0x00005678"* "0x08000000"
+)0x00002B3C00000000←"0x00005678"* "0x80000000"

– – –

0x00002E1DAFC00000    <<6>>.

The ALU 34 then adds <<3>> and <<6>>:
0x000009B54BA00000
+) 0x00002E1DAFC00000

– – –

0x000037D2FB600000    <<7>>.

<<7>> is the 16-bit correction data. The ALU 34 stores the 16-bit correction data in the CR 36.

The ALU 34 includes an operation device for executing calculating such as that described above.

The following shows an example of a method for calculating the 8-bit correction data.

The ALU 34 masks the least significant 8 bits of the contents "0x0000000012345678" of the BR 33:

"0x0000000012345678" and
"FFFFFFFFFFFFFF00"="0x0000000012345600"    <<8>>.

The ALU 34 masks bits other than the least significant 16 bits of the contents "0x0000000088888888" of the AR 32:

"0x0000000088888888" and
"0x00000000000000FF"="0x0000000000000088"    <<9>>.

The ALU 34 then multiplies <<8>> and <<9>>:
0x0000000012345600
*)0x0000000000000088

– – –

0x0000000091A2B000←0x12345600"* "0x00000008"
+)0x000000091A2B0000←"0x12345600"* "0x00000080"

– – –

0x00000009ABCDB000    <<10>>.

The ALU 34 then masks the 8th to 15th least significant bits of the contents "0x0000000012345678" of the BR 33:

"0x0000000012345678" and
"0xFFFFFFFFFFFF00FF"="0x000000001234008"    <<11>>.

The ALU 34 then masks bits other than the 8th to 15th least significant bits of the contents "0x0000000088888888" of the AR 32:

"0x0000000088888888" and
"0x000000000000FF00"="0x0000000000008800"    <<12>>.

The ALU 34 then multiplies <<11>> and <12>>:
(BR) 0x0000000012340078
(AR) *)0x0000000000008800

– – –

0x00000091A003C000←"0x12340078"* "0x00000800"
+)0x0000091A003C0000←"0x12340078"* "0x00008000"

– – –

0x000009ABA03FC000    <<13>>.

The ALU 34 then masks the 16th to 23rd least significant bits of the contents "0x0000000012345678" of the BR 33:

"0x0000000012345678" and
"0xFFFFFFFFFF00FFFF"="0x0000000012005678"    <<14>>.

The ALU 34 then masks bits other than 16th to 23rd the least significant bits of the contents "0x0000000088888888" of the AR 32:

"0x0000000088888888" and
"0x0000000000FF0000"="0x0000000000880000"   <<15>>.

The ALU 34 then multiplies <<14>> and <<15>>:
(BR) 0x0000000012005678
(AR) *)0x0000000000880000

– – –
0x00009002B3C00000←"0x12005678"* "0x00080000"
+)0x0009002B3C000000←"0x12005678"*
    "0x00800000"
– – –
   0x0009902DEFC00000                     <<16>>.

The ALU 34 then masks the 24th to 31st least significant bits of the contents "0x0000000012345678" of the BR 33:

"0x0000000012345678" and
"0xFFFFFFFF00FFFFFF"="0x0000000000345678"   <<17>>.

The ALU 34 then masks bits other than the 24th to 31st least significant bits of the contents "0x0000000088888888" of the AR 32:

"0x0000000088888888" and
"0x00000000FF000000"="0x0000000088000000"   <<18>>.

The ALU 34 then multiplies.<<17>> and <<18>>:
(BR) 0x0000000000345678
(AR) *)0x0000000088000000

– – –
0x0001A2B3C0000000←"0x12005678"*
    "0x00080000"
+)0x001A2B3C00000000←"0x12005678"*
    "0x00800000"
– – –
   0x001BCDEFC0000000                     <<19>>.

The ALU 34 adds <<10>>, <<13>>, <<16>> and <<19>>:
0x00000009ABCDB000
0x000009ABA03FC000
0x0009902DEFC00000
+)0x001BCDEFC0000000
– – –
   0x002567D2FBCD7000                     <<20>>.

Here, <<20>>is the 8-bit correction data. The 8-bit correction data is stored in the CR 35.

The ALU 34 includes an operation device for executing calculating such as that described above.

DEC stage: SIMD8 instruction.

The SIMD correction instruction "SIMD8 D1" stored in the IR 2 is decoded by the DEC 31. The result of decoding shows that four parallel 8-bit SIMD correction operations are to be executed. Based on the decoding, the contents "0x09B58373297DAFC0" written to the D1 register in the EX stage are read and stored in the AR 32, and the 8-bit correction data "0x002567D2FBCD7000", which is the contents of the CR 35 written in the EX stage, is read and stored in the BR 33.

IF stage: not relevant.

(4) Operation Timing 4 (Operation timing 4+α when the previous operation timing is operation timing 3 to 3+α.)
EX stage: SIMD8 instruction.

Based on the result of decoding by the DEC 31 in operation timing 3 (or operation timing 3+α), the ALU 34 performs a subtraction operation to subtract B input from A input, using the contents of the BR 33 as the A input and the contents of the AR 32 as the B input, and stores the operation result "0x9901BA02DB03FC0" in the D1 register.
   0x09B58373297DAFC0
 –)0x002567D2FBCD7000
– – –
   0x09901BA02DB03FC0

When divided into four pieces of 8-bit data: "0x0990", "0x1BA0", "0x2DB0" and "0x3FC0", this operation result "0x09901BA02DB03FC0" is the SIMD operation result obtained if the contents pre-stored in the D0 register are considered to be four pieces of 8-bit data, and the pieces of 8-bit data are dyadic multiplied with corresponding non-encoded pieces of 8-bit data.

The following shows this SIMD operation result.
(D0) 0x0012 0x0034 0x0056 0x0078
(D1) *)0x0088 *)0x0088 *)0x0088 *)0x0088
– – – – – – – – – – – –
   0x0090 0x01A0 0x02B0 0x03C0
+)0x0900+)0x1A00+)0x2B00+)0x3C00
– – – – – – – – – – – –
(D1) 0x0990 0x1BA0 0x2DB0 0x3FC0
DEC stage: not relevant.
IF stage: not relevant.

EXAMPLE 2

The following describes an operation example of a 16*2 SIMD dyadic multiply operation for dyadic multiplying two pieces of 16-bit data respectively with another two pieces of 16-bit data.

If the first two pieces of 16-bit data to be multiplied are stored concatenated in the lower part of the D0 register, and the second two pieces of 16-bit data to be multiplied are stored in the lower part of the D1 register, the 16*2 SIMD dyadic multiply operation is realized by the following two instructions.

MUL D0, D1
SIMD16 D1

Here, supposing that the first two pieces of 16-bit data are "0x1234" and "0x5678", and that the second eight pieces of 8-bit data are both "0x8888", "0x0000000012345678" is pre-stored in the D0 register, and "0x0000000088888888" is pre-stored in the D1 register.

Figure 15:
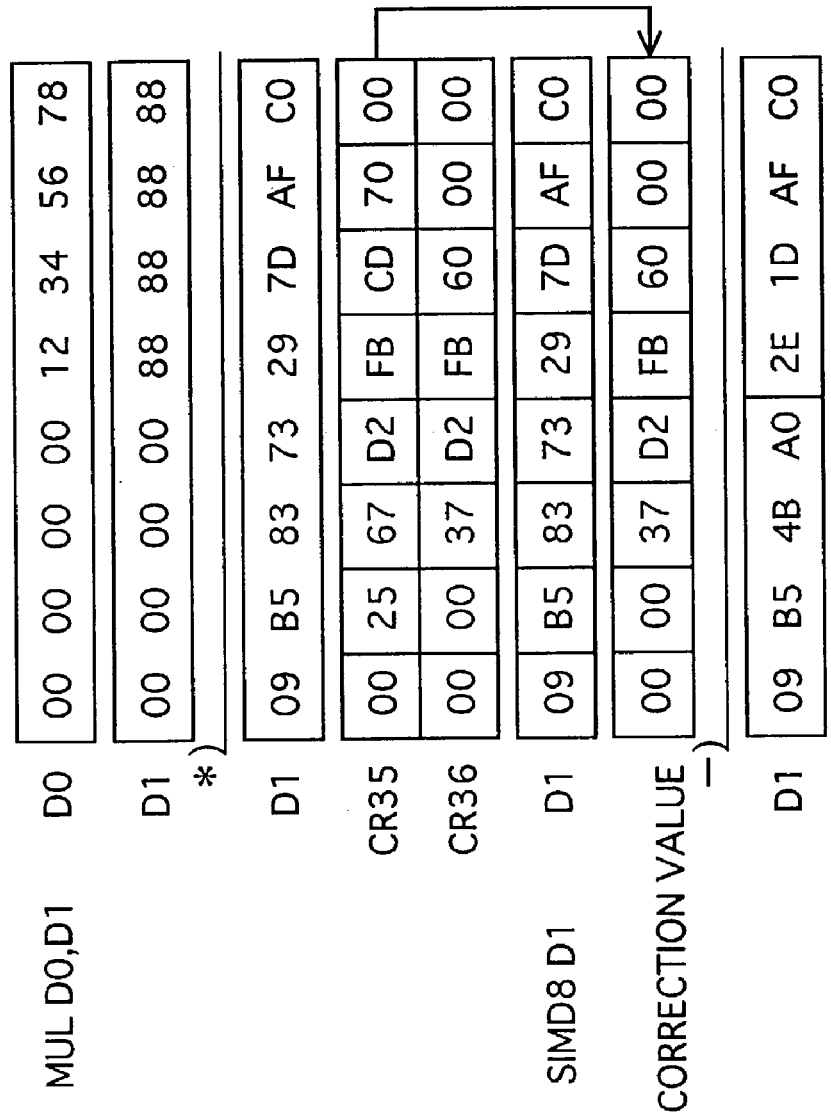
FIG. 15 shows the contents of the registers during an 16*2 SIMD dyadic multiply operation.

FIG. 15 shows the contents of the registers in the 16*2 SIMD dyadic multiple operation.

(1) Operation Timing 1
EX stage: not relevant.
DEC stage: not relevant.
IF stage: MUL instruction.

The dyadic multiply instruction "MUL D0, D1" is fetched from the ROM 1, and stored in the IR 2.

(2) Operation Timing 2
EX stage: not relevant.
DEC stage: MUL instruction.

The dyadic multiply instruction "MUL D0, D1" stored in the IR 2 is decoded by the DEC 3. The result of decoding shows that a 32-bit data dyadic multiple operation is to be executed. Based on the decoding, the contents "0x0000000012345678" of the D0 register are read and stored in the BR 33, and the contents "0x0000000088888888" of the D1 register are read and stored in the AR 32.

IF stage: SIMD instruction.

The SIMD correction instruction "SIMD16 D1" is fetched from the ROM 1, and stored in the IR 2.

(3) Operation Timing 3 (Referred to as operation timing 3 to 3+α in cases in which several blocks are necessary).

EX stage: MUL instruction.

Based on the result of the decoding by the DEC 3 in the operation timing 2, the ALU 34 performs an unsigned 64-bit multiplication to multiply A input by B input, using the contents of the BR 33 as the A input and the contents of the AR 32 as the B input, and stores an operation result "0x09B58373297DAFC0" in the D1 register of the register file 4.

Furthermore, the ALU 34 generates 8-bit correction data and 16-bit correction data.

Note that the ALU 34 generates the 8-bit correction data and the 16-bit correction data using the same method as in Example 1 in the present embodiment, therefore a detailed description is omitted here.

DEC stage: SIMD16 instruction.

The SIMD correction instruction "SIMD16 D1" stored in the IR 2 is decoded by the DEC 31. The result of decoding shows that two parallel 16-bit SIMD correction operations are to be executed. Based on the decoding, the contents "0x09B58373297DAFC0" written to the D1 register in the EX stage are read and stored in the AR 32, and the 8-bit correction data "0x000037D2FB600000", which is the contents of the CR 35 written in the EX stage, is read and stored in the BR 33.

IF stage: not relevant.

(4) Operation Timing 4 (Operation timing 4+α when the previous operation timing is operation timing 3 to 3+α.)

EX stage: SIMD16 instruction.

Based on the result of decoding by the DEC 31 in operation timing 3 (or operation timing 3+α), the ALU 34 performs a subtraction operation to subtract B input from A input, using the contents of the BR 33 as the A input and the contents of the AR 32 as the B input, and stores the operation result "0x09B54BA02E1DAFC0" in the D1 register.

```
  0x09B58373297DAFC0
 -)0x000037D2FB600000
 ---
  0x09B54BA02E1DAFC0
```

When divided into two pieces of 16-bit data: "0x09B54BA0" and "0x2E1DAFC0", this operation result "0x09B54BA02E1DAFC0" is the SIMD operation result obtained if the contents pre-stored in the D0 register are considered to be two pieces of 16-bit data, and the pieces of 16-bit data are dyadic multiplied with corresponding unsigned pieces of 16-bit data.

The following shows this SIMD operation result.

(D0) 0x00001234 0x00005678
(D1) *)0x00008888 *)0x00008888

```
   0x000091A0  0x0002B3C0
   0x00091A00  0x002B3C00
   0x0091A000  0x02B3C000
 +)0x091A0000+)0x2B3C0000
 ------
```

(D1) 0x09B54BA0 0x2E1DAFC0

DEC stage: not relevant.

IF stage: not relevant.

As described, the processor of the third embodiment of the present invention is able to execute SIMD operations for a plurality of types of operations by simply implementing instructions SIMD8 and SIMD 16 in addition to conventional instructions. These additional instructions are not related to the types of operations, but instead to sizes of operations. As a result of this construction, a dramatic increase in the number of instructions is avoided.

Note that in the first and second embodiments, when the ALU 8 or the ALU 21 executes an operation instruction, carry information is made for each type of operation according to whether there is a carry from seven bit positions in the operation result, and the carry information is stored in the CR 9. In the third embodiment, correction information is generated and stored in the CR 35 and the CR 36, but it is not always necessary to generate carry information and correction information when the ALU 34 executes an operation instruction. A possible structure in the first and second embodiments is a structure in which, when the ALU 8 or the ALU 21 executes an operation instruction, the carry result from seven bit positions (C7, C15, C23, C31, C39, C47, C55) and the type of operation (ADD, SUB, INC or DEC) are recorded, and carry information is generated based on the contents of the recorded information. A possible structure in the third embodiment is one in which, when the ALU 34 executes an operation instruction, the data for generating correction data, and the type of operation are recorded, and correction data is generated based on the recorded contents when the SIMD correction instruction is executed.

Figure 16:
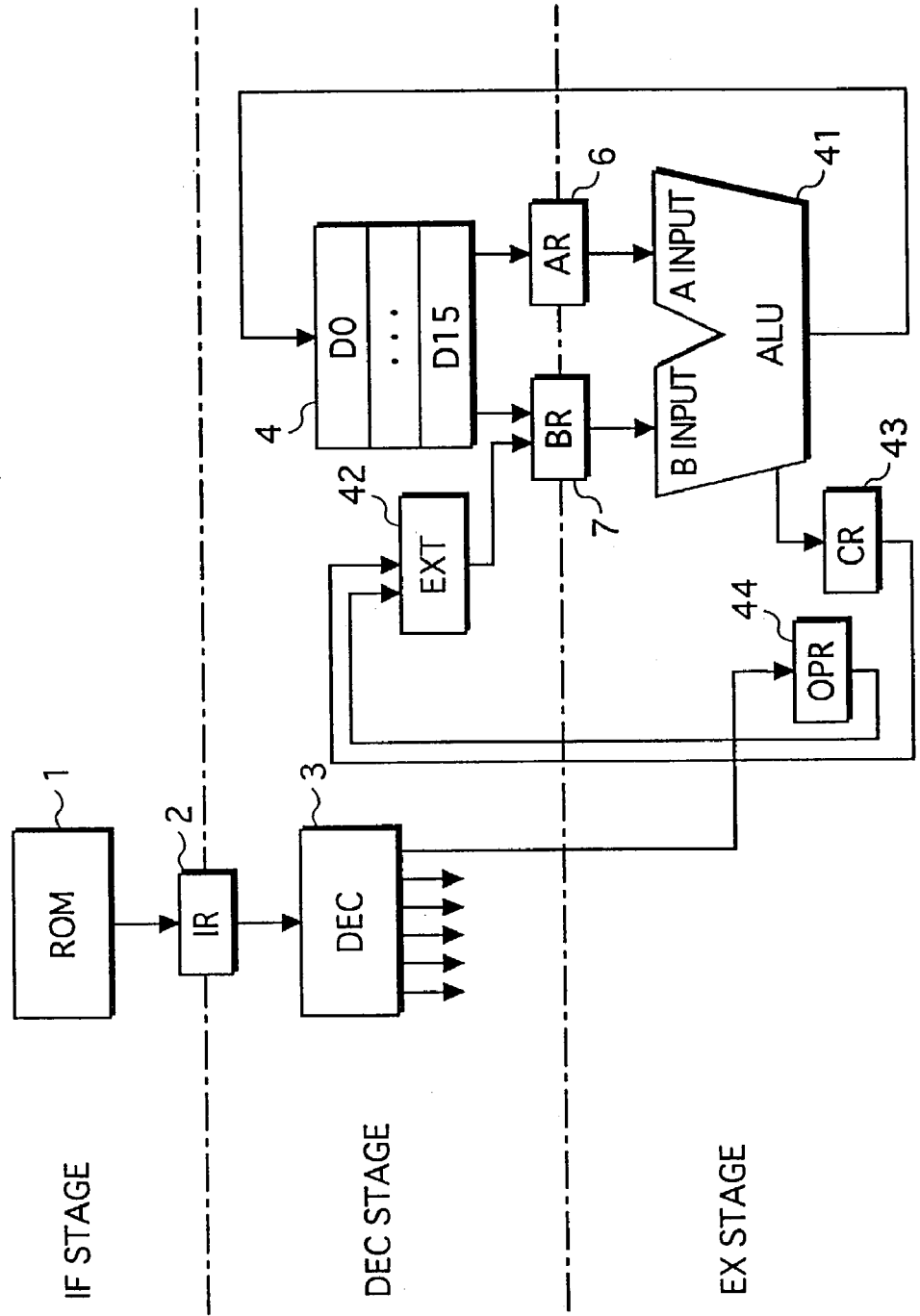
FIG. 16 shows the structure of an SIMD operation apparatus that stores a carry result and an operation type during execution of an operation instruction, and generates carry information during execution of an SIMD correction instruction.

FIG. 16 shows the structure of an SIMD operation apparatus in which the carry result and the operation type are recorded when an operation instruction is executed, and carry information is generated when an SIMD correction instruction is executed.

An SIMD operation apparatus 40 shown in FIG. 16 includes an ALU 41 instead of the ALU 8 in the SIMD operation apparatus 10 shown in FIG. 1, an EXT 42 instead of the EXT 5 in the SIMD operation apparatus 10, a CR 43 and an OPR 44 instead of the CR 9 in the SIMD operation apparatus 10.

The ALU 41 is a 64-bit adder/subtractor that, when an operation instruction is being executed, performs either and an addition A+B or a subtraction A−B, and stores the result of the operation in the registers. Here, A input and B input are the respective contents of the AR 6 and the BR 7. In addition, the ALU 41 stores a carry result in the CR 43 and the operation type in the OPR 44, and corrects the operation result to the SIMD operation results based on carry information generated by the EXT 42.

The EXT 42 is a carry information generator/extender. The EXT 42 generates 8-bit-use carry information from the carry result stored in the CR 43 as a result of an 8-bit SIMD correction instruction being decoded by the IR 2 and the operation type stored by the OPR 44. The EXT 42 generates 16-bit-use carry information from the carry result stored in the CR 43 as a result of a 16-bit SIMD correction instruction being decoded by the IR 2 and the operation type stored by the OPR 44. The EXT 42 generates 32-bit-use carry information from the carry result stored in the CR 43 as a result of a 32-bit SIMD correction instruction being decoded by the IR 2 and the operation type stored by the OPR 44. The EXT 42 stores the generated carry information in the BR 7.

The CR 3 is a register of at least seven bits that stores the carry result during execution of an operation instruction.

The OPR 44 is a register that stores the operation type during execution of an operation instruction.

Furthermore, it is possible to include an additional feature in the CR 9 by which the CR 35, the CR 36, the CR 43 and the OPR 44 store their contents to a memory or the like on receiving an interrupt or a switch to another context, and the contents are restored when returning from the interrupt and switching to the original context. This means that interrupts can be received without inconsistencies between the operation instruction and the SIMD correction instruction, and the SIMD operation apparatus 40 is able to perform multitasking without a time lag.

Furthermore, although in each embodiment SIMD correction instructions are employed along with ADD, SUB, INC, DEC, MUL and DIV operation instructions and so on to achieve SIMD operations, it is possible to have SIMD operations performed according to both SIMD correction instructions and SIMD-specific instructions. For example, the two instructions ADD and SUB may be used together with an SIMD correction instruction, while increment and decrement may be implemented with an SIMD-specific instruction.

Here, the increment SIMD-specific instructions may be INCS8 (for processing eight pieces of 8-bit data in parallel), INCS16 (for processing four pieces of 16-bit data in parallel), and INCS32 (for processing two pieces of 32-bit data). The decrement SIMD specific instructions may be DECS8 (for processing eight pieces of 8-bit data in parallel), DECS16 (for processing four pieces of 16-bit data in parallel), and DECS32 (for processing two pieces of 32-bit data in parallel).

The total number of instructions in such a case is three less than that for when SIMD-specific instructions are implemented for all four operations.

The following describes an example of operations of the INCS8 instruction with use of the compositional elements shown in FIG. 1.

(1) On the INCS8 instruction being decoded by the DEC 3, the register operand designated in the instruction is read from the register file 4, and stored in the AR 6. In addition, a value 0x0101010101010101 is stored in the BR 7.

(2) Next, the ALU 8 adds the contents of the AR 6 to the contents of the BR 7. Here, propagation of the carry from bit position 7 to bit position 8, the carry from bit position 15 to bit position 16, the carry from bit position 23 to bit position 24, the carry from bit position 31 to bit position 32, the carry from bit position 39 to bit position 40, the carry from bit position 47 to bit position 48, and the carry from bit position 55 to bit position 56 is not performed, and the operation result from the ALU 8 is stored in a register designated by the instruction language.

The values stored in the BR 7 for SIMD-specific instructions other than INCS8 are: 0x0101010101010101 for DECS8 (the same as for INCS8), 0x0001000100010001 for INCS16 and DECS16, and 0x0000000100000001 for INCS 32 and DECS32. The operation preformed by the ALU 8 for INCS16 and INCS32 is the same as for INCS8. The ALU 8 performs a subtraction for DECS8, DECS16 and DECS32. The places in which carry propagation is not performed are the same for DECS8 as INCS8. The carry propagation is not performed from bit position 15 to bit position 16, bit position 31 to bit position 32, bit position 47 to bit position 48 for INCS 16 and DECS 16. The carry propagation is not performed from bit position 31 to bit position 32 for INCS32 and DECS32. Other operations are the same as for INCS8.

In this way, by implementing increment and decrement SIMD-specific instructions, it is possible to increase or decrease a plurality of addresses at once and control the brightness, color or the like of a plurality of pieces of image data at high speed.

Furthermore, although the SIMD operation apparatuses in the embodiments use an operation device such as a 64-bit adder/subtractor to implement three types of SIMD operations: eight parallel operations on 8-bit data, four parallel operations on 16-bit data, and two parallel operations on 32-bit data, the SIMD operation apparatuses may implement more or less types of SIMD operations. For example, the operation device may be 32 bits, and may implement four parallel 8-bit operations on and two parallel 16-bit data operations. Alternatively, the operation device may be 128 bits, and may implement all or some of the following types of operations: sixteen parallel 8-bit data operations, eight parallel 16-bit data operations, four parallel 32-bit data operations, and two parallel 64-bit operations.

In any of the above-described cases, carry information that corresponds to the smallest data size of the implemented SIMD operations is recorded during execution of an operation. For example, when the smallest data size is 16 bits, the carry information is generated based on carries $C15$, $C31$, $C47$, ... $C(16n-1)$.

Furthermore, in the embodiments, it is not necessary to store the eight least significant bits of the carry information since they are always 0 and are not used in correction.

Furthermore, although the SIMD operation apparatuses in the embodiments employ a single scalar architecture method that processes one instruction per machine cycle, it is possible to use an architecture method that processes a plurality of instructions per machine cycle, such as a super scalar architecture method or a VLIW (very long instruction word) architecture method.

Furthermore, although the processors in the embodiments are composed of a three-stage pipeline, specifically instruction fetch, decode and execute, the pipeline may have any number of stages. Alternatively, it is possible to not use a pipeline structure.

Fourth Embodiment

The fourth embodiment of the present invention is a compiler that generates machine language instruction programs for the processors in the first to third embodiments for realizing an SIMD operation instruction with an operation instruction for a non-parallel operation and a correction instruction for correcting the non-parallel operation instruction result to an SIMD operation instruction operation result.

<Structure>

Figure 17:
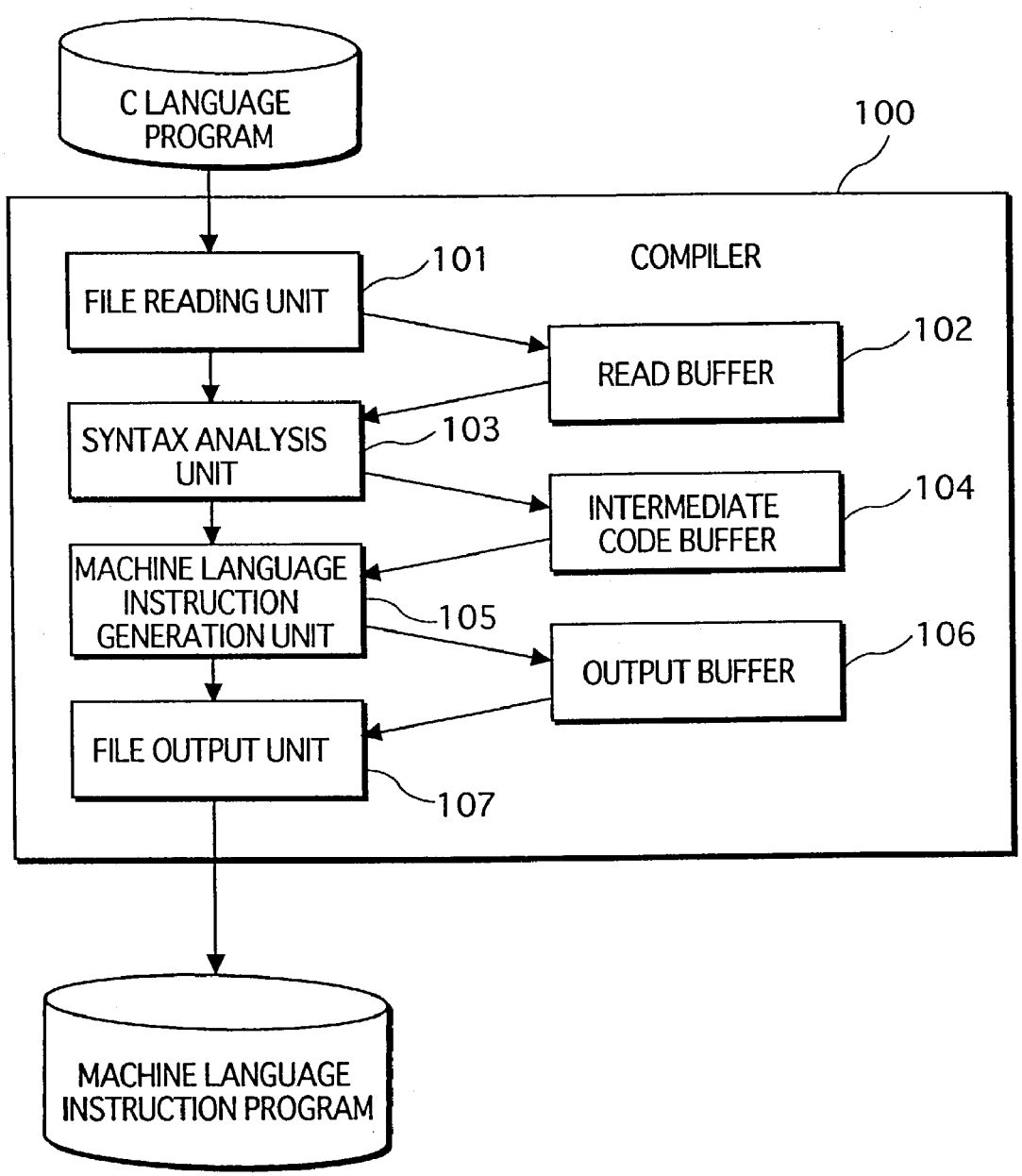
FIG. 17 shows the structure of a compiler of the fourth embodiment of the present invention.

FIG. 17 shows the structure of the compiler of the fourth embodiment.

A compiler 100 shown in FIG. 17 is composed of a file reading unit 101, read buffer 102, a syntax analysis unit 103, an intermediate code buffer 104, a machine language instruction generation unit 105, an output buffer 106 and a file output unit 107.

The file reading unit 101 reads a C language program file from an external recording medium such as a hard disk, to the read buffer 102.

FIG. 18 shows an example of the C language program read to the read buffer 102.

The C language program shown in FIG. 18 is a loop that finds the sum of an array variable a [i] and an array variable b [i], and stores the result in an array variable c [i]. Here, i has a value of 0 to 63, therefore 64 array operations are performed.

The syntax analysis unit 103 analyzes the syntax of the C language program read to the read buffer 102, to generate an intermediate code program which it writes to the intermediate code buffer 104. Here, the intermediate code program is in a processor-independent format, and does not include intermediate code that shows an SIMD operation.

FIG. 19 shows an example of the intermediate code program generated from the C language program in FIG. 18.

The following describes the intermediate codes in the intermediate program shown in FIG. 19.

<Intermediate Code 1>

A value 0 is assigned to the variable i.

<Intermediate Code 2>

The i-th element of the char-type array variable a and the i-th element of the char-type array variable b are added together, and the result is stored in the i-th element of the char-type array variable c.

<Intermediate Code 3>

The value of the variable i is increased by one.

<Intermediate Code 4>

The value of each flag is updated according to a result of subtracting 64 from the variable i.

<Intermediate Code 5>

When the updated value of the flags shows "0 or less", in other words, when "i−64≦0" is fulfilled in intermediate code 4, the intermediate code program branches to intermediate code 2.

The machine language instruction generation unit 105 generates a machine language program that includes a machine language instruction showing an SIMD operation, using the intermediate code program stored in the intermediate code buffer 104 as input, and writes the generated machine language instruction program to the output buffer 106. Here, this machine language instruction program is composed of machine language instructions and is in a processor-dependant format. The machine language instructions include those that show an SIMD operation.

The file output unit 107 outputs the machine language instruction program stored in the output buffer 106 to an external recording medium such as a hard disk.

Figure 20:
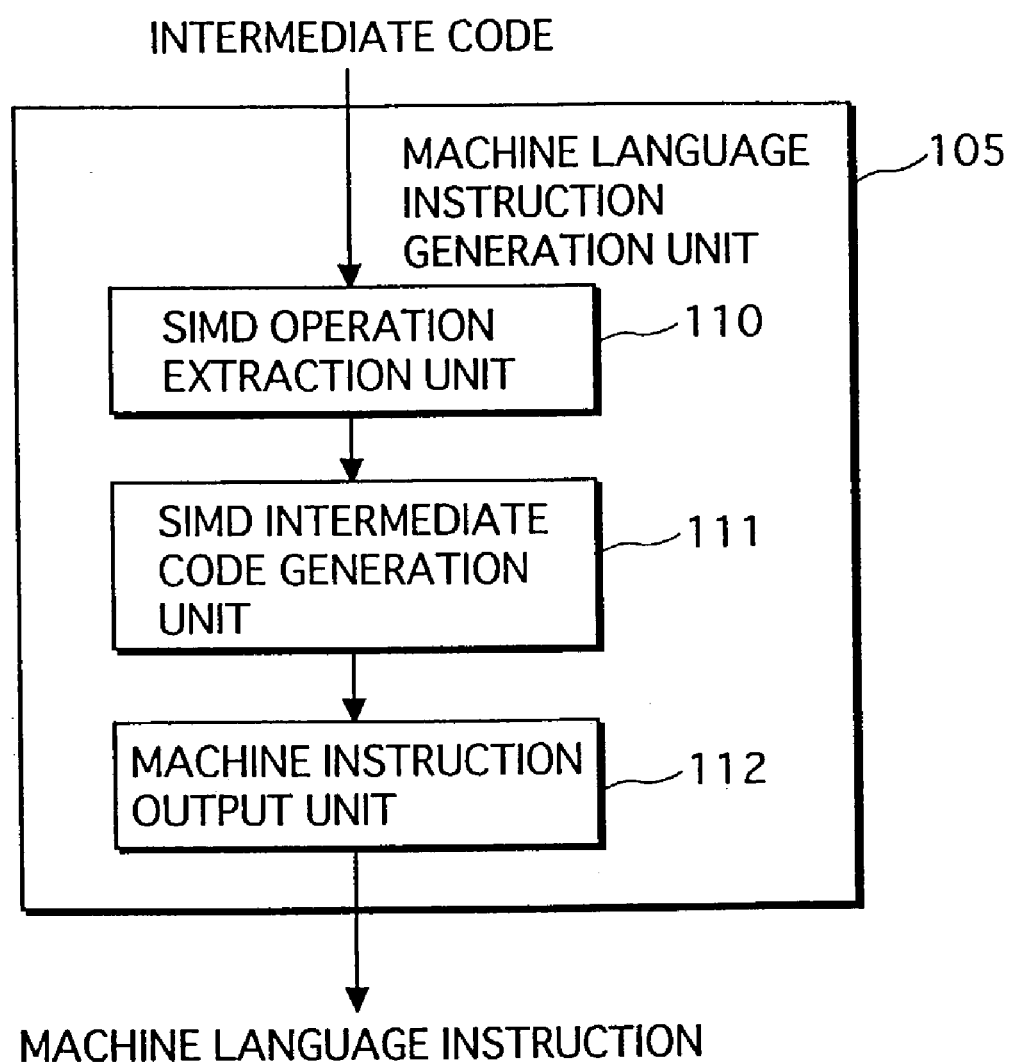
FIG. 20 shows the structure of a machine language instruction generation unit 105 in detail.

FIG. 20 shows the structure of the machine language instruction generation unit 105 in detail.

The machine language instruction generation unit 105 shown in FIG. 20 is composed of an SIMD operation extraction unit 110, an SIMD intermediate code generation unit 111 and a machine language instruction output unit 112.

The SIMD operation extraction unit 110 scans the intermediate code program input from the intermediate code buffer 104 to find intermediate codes for which an array operation is to be performed, and generates a modified intermediate code program. The modified intermediate code program is obtained by converting the intermediate code in the intermediate code program that is for performing data array operations to modified intermediate code that shows an SIMD operation for a predetermined number of operations at once according to the data array type.

FIG. 21 shows an example of a modified intermediate code program generated from the intermediate code program shown in FIG. 19.

The following describes the modified intermediate codes in the modified intermediate code program shown in FIG. 21.

<Modified Intermediate Code 1>

A value 0 is assigned to the variable i (same as intermediate code 1).

<Modified Intermediate Code 2>

The eight array elements from the i-th to the (i+7)-th array element of the char-type array variable a, and eight array elements from the i-th to the (i+1)-th array element of the char-type array variable b are respectively added, and the results are stored in the respective eight array elements from the i-th to the (i+1)-th array element of the char-type array variable c.

<Modified Intermediate Code 3>

The value of the variable i is increased by 8.

<Modified Intermediate Code 4>

The value of each flag is updated according to a result of subtracting 64 from the variable i (same as intermediate code 4).

<Modified Intermediate Code 5>

When the value of each flag shows "0 or less", in other words, when "i−64≦0" is fulfilled in modified intermediate code 4, the modified intermediate code program branches to modified intermediate code 2.

The SIMD intermediate code generation unit 111 uses the modified intermediate code program generated by the SIMD operation extraction unit 110 to generate an SIMD intermediate code program. Here, the SIMD intermediate code program includes intermediate codes showing SIMD operations.

FIG. 22 shows an example of an SIMD intermediate code program generated from the modified intermediate code program shown in FIG. 21.

The following describes the intermediate codes in the SIMD intermediate code program shown in FIG. 22.

<SIMD Intermediate Code 1>

A value 0 is assigned to the variable i (same as intermediate code 1 and modified intermediate code 1).

<SIMD Intermediate Code 2>

This corresponds to reading the eight elements of the char-type array variable a in modified intermediate code 2. 64 bits' worth of data are read from a memory area shown by a pointer A, and stored in the variable a.

<SIMD Intermediate Code 3>

This corresponds to reading the eight elements of the char-type array variable b in modified intermediate code 2. 64 bits' worth of data are read from a memory area shown by a pointer B, and stored in the variable b.

<SIMD Intermediate Code 4>

This corresponds to adding the eight elements of the char-type array variable a and the eight array elements of the char-type array variable b respectively in the modified intermediate code 2. The variable a and the variable b are subjected to SIMD addition 8 bits at a time, and the result is stored in the variable c.

<SIMD Intermediate Code 5>

This corresponds to writing the eight elements of the char-type array variable c in modified intermediate code 2. The variable c is written to the 64 bits' worth of the memory area shown by a pointer C.

<SIMD Intermediate Code 6>

This corresponds to increasing the pointer A for the array variable a following increasing the value of the variable i in the modified intermediate code 3. The value of the pointer A is increased by 8.

<SIMD Intermediate Code 7>

This corresponds to increasing the pointer B for the array variable b following increasing the value of the variable i in the modified intermediate code 3. The value of the pointer B is increased by 8.

<SIMD Intermediate Code 8>

This corresponds to increasing the pointer C for the array variable c following increasing the value of the variable i in the modified intermediate code 3. The value of the pointer C is increased by 8.

<SIMD Intermediate Code 9>

The value of the variable i is increased by 8 (same as modified Intermediate code 3).

<SIMD Intermediate Code 10>

The value of each flag is updated according to a result of subtracting 64 from the variable i (same as intermediate code 4 and modified intermediate code 4).

<SIMD Intermediate Code 11>

When the updated value of each flag shows "0 or less", in other words, when "i−64≦0" in fulfilled in SIMD intermediate code 4, the SIMD intermediate code program branches to SIMD intermediate code 2.

The machine language instruction output unit 112 generates a machine language instruction program that includes machine language instructions showing an SIMD operation, using the SIMD intermediate code program generated by the SIMD intermediate generation unit 111.

FIG. 23 shows an example of the machine language instruction program generated from the SIMD intermediate code program shown in FIG. 22.

The following describes the machine language instructions in the machine language instruction program shown in FIG. 23.

<Machine Language Instruction 1>

This corresponds to SIMD intermediate code 1. The variable i in the SIMD intermediate code 1 is assigned to the D0 register, and the contents of the D0 register are cleared by subtracting the contents of the D0 register from the contents of the D0 register.

<Machine Language Instruction 2>

This corresponds to SIMD intermediate code 2. The pointer A in the SIMD intermediate code 2 in assigned to the D1 register and the variable a is assigned to the register D2. Data is loaded from the 64-bit memory area shown by the contents of the D1 register and stored in the register D2.

<Machine Language Instruction 3>

This corresponds to SIMD intermediate code 3. The pointer B in the SIMD intermediate code 3 is assigned to the register D3 and the variable b is assigned to the register D4. Data is loaded from the 64-bit memory area shown by the contents of the register D3 and stored in the register D4.

Here, the SIMD intermediate code 4 is broken down into a machine language instruction 4 that is an ordinary operation instruction, and a machine language instruction 5 that is an SIMD correction instruction for correcting an ordinary operation instruction result to an SIMD operation result.

<Machine Language Instruction 4>

This corresponds to the former half of the SIMD intermediate code 4. The variable c in the SIMD intermediate code 4 is assigned to the register D4. The contents of the register D2 and the contents of the register D4 are added, and the result is stored in the register D4. In addition, the carry information for each eight bits is stored in an implicitly-determined implicit register.

<Machine Language Instruction 5>

This corresponds to the latter half of the SIMD intermediate code 4. Each eight bits of the contents of the register D4 are corrected using the carry information stored in the implicit register in machine language instruction 4, to obtain an 8-bit SIMD addition result which is then stored in the register D4.

<Machine Language Instruction 6>

This corresponds to the SIMD intermediate code 5. The pointer C in the SIMD intermediate code 5 is assigned to the register D5, and the contents of the register D4 are stored in the 64-bit memory area shown by the contents of the register D5.

<Machine Language Instruction 7>

This corresponds to the SIMD intermediate code 6. The contents of the register D1 are increased by 8.

<Machine Language Instruction 8>

This corresponds to the SIMD intermediate code 7. The contents of the register D3 are increased by 8.

<Machine Language Instruction 9>

This corresponds to the SIMD intermediate code 8. The contents of the register D5 are increased by 8.

<Machine Language Instruction 10>

This corresponds to the SIMD intermediate code 9. The contents of the register D0 are increased by 8.

<Machine Language Instruction 11>

This corresponds to the SIMD intermediate code 10. The value of each flag is updated according to a result of subtracting 64 from the contents of the D0 register.

<Machine Language Instruction 12>

This corresponds to the SIMD intermediate code 11. When the values of the flags show that the result is "0 or less", in other words, when a relationship between a zero flag (Z), an overflow flag (V) and a negative flag (N) fulfills a relationship "Z or (V xor N)=1", the machine language program diverges to the machine language instruction 2, which is ten instruction previous.

Note that although the above-described example of the program shows a case in which the data of the array subject to operation is char-type 8-bit data, the type of the array is not limited to being char-type. For example, when the data is short-type 16-bit data, four pieces of data may be treated at a time as 64-bit data. Furthermore, when the data is int-type 32-bit data, two pieces of data may be treated at a time as 64-bit data.

<Operations>

Figure 24:
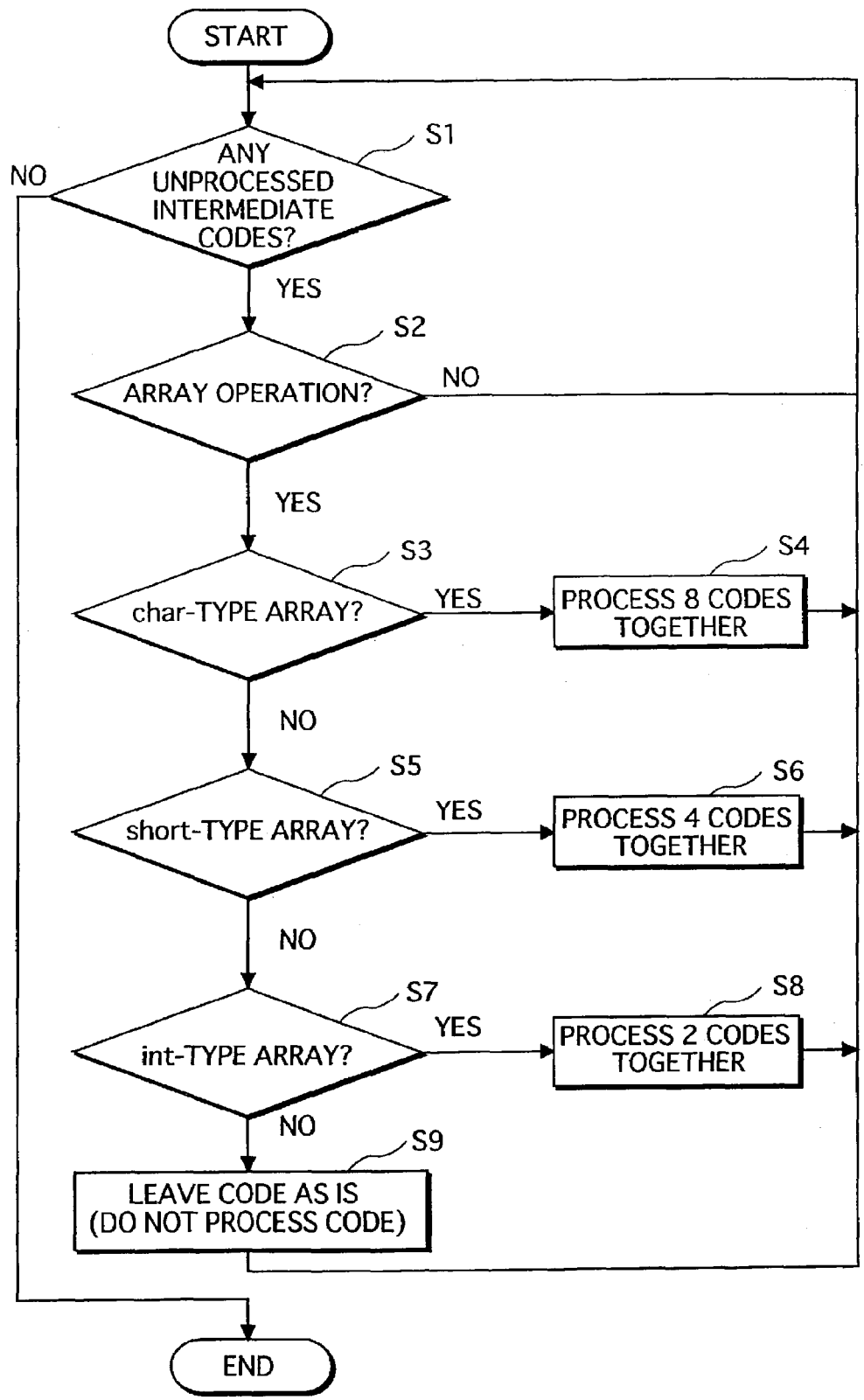
FIG. 24 shows an outline of processing performed by an SIMD operation extraction unit 110 for generating the modified intermediate code program.

FIG. 24 shows an outline of operations of processing by the SIMD operation extraction unit 110 for generating a modified intermediate code program.

In this processing eight, four or two data operations are performed at a time, according to whether the array type subject to operation is char-type, short-type or int-type. Here, it is supposed that the processor performs an operation for 64 bits of data at once with one operation instruction, and that char-type data is 8 bits, short-type data is 16 bits, and int-type data is 32 bits.

The following describes an outline of processing for generating a modified intermediate code program, with use of FIG. 24.

(1) The SIMD operation extraction unit 110 judges whether there are any unprocessed intermediate codes in the intermediate code program stored in the intermediate code buffer 104 (step S1). When there are no unprocessed intermediate codes, the processing ends.

(2) When there are one or more unprocessed intermediate codes, the SIMD operation extraction unit 110 treats one line of unprocessed code as a target for processing (hereinafter "target code"), and judges whether the target code is for performing an array operation (step S2). When the target code is not for performing an array operation, the SIMD operation extraction unit 110 returns to step S1 process remaining intermediate codes.

(3) When the target code is for performing an array operation, the SIMD operation extraction unit 110 judges whether the target code is for performing a char-type array operation (step S3).

(4) When the target code is for performing a char-type array operation, the SIMD operation extraction unit 110 finds other codes to be processed that are for performing char-type array operations, converts the codes in groups of eight to char-type modified intermediate codes, and then returns to process remaining intermediate codes (step S4).

(5) When the target code is not a for performing char-type array operation, the SIMD operation extraction unit 110 judges whether the target code is for performing a short-type array operation (step S5).

(6) When the target code is for performing a short-type array operation, the SIMD operation extraction unit 110 finds other codes to be processed that are for performing short-type array operations, converts the codes in groups of four to short-type-use intermediate codes, and then returns to step S1 to process remaining intermediate codes (step S6).

(7) When the target code is not for performing a short-type array operation, the SIMD operation extraction unit 110 judges whether the target code is an for performing int-type array operation (step S7).

(8) When the target code is for performing an int-type array operation, the SIMD operation extraction unit 110 finds other codes to be processed that are for performing int-type array operations, converts the codes in groups of two to int-type-use intermediate codes, and then returns to step S1 process remaining intermediate codes (step S8).

(9) When the target code is not an int-type array operation, the SIMD operation extraction unit 110 treats the target code as a long-type data array operation, and then returns to step S1 to process remaining intermediate codes without further processing the target code (step S9).

In this way, the compiler of the fourth embodiment of the present invention breaks a conventional SIMD operation into an operation instruction and an SIMD operation, and therefore is able to generate machine language instruction programs corresponding to each of the processors in the first to third embodiments. Furthermore, the compiler of the fourth embodiment is able to generate a program by which SIMD operations are executed for a plurality of types of operations with only SIMD correction instructions in addition to conventional instructions. Avoiding a dramatic increase in the number of instructions means that the machine language is relatively short, therefore reducing the program code size.

Although the fourth embodiment discloses a compiler that translates a C language program to a machine language instruction program, the program that is translated is not limited to being a C language program, but instead may be any high-order language program. Furthermore, the program that is generated as a result of translating is not limited to being a machine language program, but may be any kind of program that is not a of a higher order than the high-order program. Furthermore, since in the present invention it is sufficient to translate the parts of the program that correspond to an SIMD operation to an ordinary operation instruction and an SIMD correction instruction, it is not always necessary to translate the whole program language. For example, the present invention may be a program conversion apparatus that converts a high-order language program that includes a syntax that corresponds to an SIMD operation to a same or different high-order language program that includes, instead of the syntax, an operation instruction and an SIMD correction instruction. Alternatively, the present invention may be a program conversion apparatus that converts a machine language program that includes an SIMD operation instruction to a same or different machine language program that includes, instead of the SIMD operation, an operation instruction and an SIMD correction instruction.

Note that any of the programs of fourth embodiment may be recorded on a computer-readable recording medium and the recording medium traded, or the programs may be traded by being directly transferred over a network.

Furthermore, a program that has operations such as those of any of the first to fourth embodiments of the present invention executed on a computer may be recorded on a computer-readable recording medium and the recording medium traded, or the programs may be traded by being directly transferred over a network.

Here, the computer-readable recording medium may be, but is not limited to being, a detachable recording medium such as a floppy disk, a (CD) compact disk, an MO (magneto optical), a DVD (digital versatile disk) and a memory card, or a fixed recording medium such as a hard disk or a semiconductor memory.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An operation method for having an operation apparatus execute (a) an existing operation that applies a predetermined type of operation to one N*M-bit first-bit-length operand, to obtain one N*M-bit first-bit length operation result, and (b) an SIMD (Single Instruction Multiple Data) operation used for applying N parallel operations that applies the predetermined type of operation in parallel to N M-bit second-bit-length operands to obtain N M-bit second-bit-length operation results, N being an integer equal to or greater than 2 and M being an integer equal to or greater than 1, the operation apparatus implementing:
an operation instruction for instructing application of the predetermined type of operation on one of (c) the first-bit-length operand, and (d) the plurality of second-bit-length operands concatenated and considered to be a first-bit-length operand; and
an SIMD correction instruction for instructing correction of an operation result of the operation instruction to an operation result of the SIMD operation,
the operation apparatus comprising:
a storage unit storing the first-bit-length operation result, and correction information that is used in the correction:
the operation method comprising:
a decoding step of decoding the operation instruction and the SIMD correction instruction used for applying N parallel operations; and
an execution step of,
(e) when the operation instruction is decoded, applying the predetermined type of operation to one of (i) the first-bit-length operand, and (ii) the N second-bit length operands concatenated and considered to be a first-bit-length operand, to obtain one first-bit-length operation result, storing the obtained first-bit-length operation result in the storage unit, and generating correction information based on an effect had, by applying the predetermined type of operation, on each M bits of the first-bit-length operation result from a bit that neighbors the M bits, and storing the generated correction information in the storage unit, and
(f) when the SIMD correction instruction used for applying N parallel operations is decoded, correcting the stored first-bit-length operation result in M-bit units using the stored correction information, to obtain the N second-bit-length operation results,
wherein when executing the existing instruction, the operation instruction is decoded and an obtained first-bit-length operation result is considered to be an operation result of the existing operation, and
when executing the SIMD operation, the operation instruction is decoded, an obtained first-bit-length operation result is considered to be a provisional operation result, the SIMD operation is then decoded, and N second-bit-length operation results obtained by correcting the provisional operation result are considered to be an operation result of the SIMD operation.

2. The operation method of claim 1,
wherein in the execution step, when the SIMD correction instruction used for applying N parallel operations is decoded, M least; significant bits of the first-bit-length operation result are excluded from being corrected.

3. The operation method of claim 1, wherein the execution apparatus further executes the SIMD operation used for applying N/P parallel operations that applies the same predetermined type of operation in parallel to N/P M*P-bit third-bit-length operands to obtain N/P M*P-bit third-bit-length operation results, P being an integer equal to or greater than 2 and equal to or less than N/2,
the decoding step further decodes the SIMD correction instruction used for applying N/P parallel operations, and
the execution step,
(a) when the operation instruction is decoded, applies the predetermined type of operation to the first-bit-length operand, the first-bit-length operand being one of (i) the N second-bit-length operands concatenated and considered to be a first-bit-length operand, and (ii) the N/P third-bit-length operands concatenated and considered to be a first-bit-length operand, to obtain a first-bit-length operation result, stores the obtained first-bit-length operation result in the storage unit, generates the correction information based on an effect had, by applying the predetermined type of operation, on each M bits of the first bit-length operation result from a bit that neighbors the M bits, and stores the generated correction information in the storage unit, and
(b) when the SIMD operation used for applying N/P parallel operations is decoded, corrects the stored first-bit-length operation result in M*P-bit units, using only parts of the stored correction information that correspond to an effect on each M*P-bit unit.

4. The operation method of claim 3,
wherein respective values of N, M and P are one of (a) N=8, M=8 and P=one of (i) 2, (ii) 4, and (iii) 2 and 4, and (b) N=4, M=16 and P=2.

5. The operation method of claim 1,
wherein the predetermined type of operation is any one of a plurality of types of operations,
the execution step, when a least significant bit is considered to be a first bit,
(a) when the operation instruction is decoded, generates the correction information, in M-bit units, based on the predetermined type of operation and a carry from an M*L-th bit to an M*L1-th bit according to the predetermined type of operation, the M*L+l-th bit having a value of one of (a) 0 or 1 and (b) 0 or −1, L being N integers from 0 to N−1, and
(b) when the SIMD correction instruction is decoded, performs, regardless of the predetermined type of the operation, one of (a) adding the stored correction information to the first-bit-length operation result in M-bit units, and (b) subtracting the correction information from the first-bit-length operation result in M-bit units, to obtain the NM-bit operation results.

6. The operation method of claim 5,
wherein the plurality of types of operations includes at least one of increment, decrement, dyadic add, and dyadic subtract, the execution step, (a) when the operation instruction is decoded and the predetermined type is increment, increments the first-bit-length operand, to obtain a first-bit-length operation result, and generates the correction information, each M*L+1-th bit without a carry according to the operation being represented by a value −1 in the correction information, and each M*L+1-th bit with a carry according to the operation being represented by a value 0 in the correction information, (b) when the operation instruction is decoded and the predetermined type is decrement, decrements the first-bit-length operand, to obtain a first-bit-length operation result, and generates the correction information, each M*L+1-th bit without a carry according to the operation being represented by a value 0 in the correction information, and each M*L+1-th bit with a carry according to the operation being represented by a value 1 in the correction information, (c) when the operation instruction is decoded and the predetermined type is dyadic add, adds a first first-bit-length operand and a second first-bit-length operand to obtain first-bit-length operation result, the first first-bit-length operand being formed by concatenating N second-bit-length operands, and the second first-bit-length operand being formed by concatenating N second-bit-length operands, and generates the correction information, each M*L+1-th bit without a carry according to the operation being represented by a value 0 in the correction information, and each M*L+1-th bit with a carry according to the operation being represented by a value 1 in the correction information, (d) when the operation instruction is decoded and the predetermined type is dyadic subtract, subtracts a second first-bit-length operand from a first first-bit-length operand to obtain a first-bit-length operation result, the first first-bit-length operand being formed by concatenating N second-bit-length operands, and the second first-bit-length operand being formed by concatenating N second-bit-length operands, and generates the correction information, each M*L+1-th bit without a carry according to the operation being represented by a value −1 in the correction information, and each M*L+1-th bit with a carry according to the operation being represented by a value 0 in the correction information, and (e) when the SIMD correction instruction is decoded, subtracts, in M-bit units, the stored correction information from the first-bit-length operation result, to obtain the N second-bit-length operation results.

7. The operation method of claim 5,
wherein the plurality of types of operations includes at least one of increment, decrement, dyadic add, and dyadic subtract,
the execution step, (a) when the operation instruction is decoded and the predetermined type is increment, increments the first-bit-length operand, to obtain a first-bit-length operation result, and generates the correction information, each M*L+1-th bit without a carry according to the operation being represented by a value 1 in the correction information, and each M*L+1-th bit with a carry according to the operation being represented by a value 0 in the correction information, (b) when the operation instruction is decoded and the predetermined type is decrement, decrements the first-bit-length operand, to obtain a first-bit-length operation result, and generates the correction information, each M*L+1-th bit without a carry according to the operation being represented by a value 0 in the correction information, and each M*L+1-th bit position with a carry according to the operation being represented by a value −1 in the correction information, (c) when the operation instruction is decoded and the predetermined type is dyadic add, adds a first first-bit-length operand and a second first-bit-length operand to obtain a first-bit-length operation result, the first first-bit-length operand being formed by concatenating N second-bit-length operands, and the second first-bit-length operand being formed by concatenating N second-bit-length operands, and generates the correction information, each represented by a value 0 in the correction information, and each M*L+1-th bit with a carry according to the operation being represented by a value −1 in the correction information, and (d) when the operation instruction is decoded and the predetermined type is dyadic subtract, subtracts the second first-bit-length operand from the first first-bit-length operand to obtain a first-bit-length operation result, the first first-bit-length operand being formed by concatenating N first-bit-length operands, and the second first-bit-length operand being formed by concatenating N second-bit-length operands, and generates the correction information, each M*L+1-th bit without a carry according to the operation being represented by a value 1 in the correction information, and each M*L+1-th bit with a carry according to the operation being represented by a value 0 in the correction information, and when the SIMD correction instruction for N parallel operations is decoded, subtracts, in M-bit units, the stored correction information from the stored first-bit-length operation result, to obtain the N second-bit-length operation results.

8. The operation method of claim 1,
wherein the predetermined type of operation is any one of a plurality of types of operations,
the execution step further stores type information showing the type, and
when the SIMD correction instruction used for applying N parallel operations is decoded, corrects the first-bit-length operation result according to the stored type information.

9. The operation method of claim 8,
wherein when the operation instruction is decoded, the execution step generates, as the correction information, information showing whether there is a carry from lower bits to corresponding higher bits.

10. The operation method of claim 9,
wherein the plurality of types of operations includes at least one of increment, decrement, dyadic add, and dyadic subtract,
the execution step, in order to obtain the N second-bit-length operation results, where L is N integers from 0 to N−1, and when a least significant bit is considered to be a first bit,
(a) when the stored type information shows one of increment and dyadic add, adds 1 to each M*L+1-th bit without a carry in the provisional operation result, based on the generated correction information, and
(b) when the stored type information shows one of decrement and dyadic subtract, subtracts 1 from each M*L+1-th bit with a carry in the provisional calculation result, based on the generated correction information.

11. An operation method for having an operation apparatus execute (a) an existing operation that applies a predetermined type of operation to a first-bit-length operand, to obtain one first-bit-length operation result, and (b) an SIMD (Single Instruction Multiple Data) operation used for applying N parallel operations that applies a predetermined type of operation in parallel to N second-bit-length operands to obtain N second-bit-length operation results, N being an integer equal to or greater than 2, the operation apparatus implementing:

an operation instruction for instruction application of the predetermined type of operation on one of (c) the first-bit-length operand, and (d) the plurality of second-bit-length operands concatenated and considered to be a first-bit-length operand; and an SIMD correction instruction for instructing correction of an operation result of the operation instruction to an operation result of the SIMD operation, and the operation apparatus comprising:
a storage unit storing the first-bit-length operation result, and correction information that is used in the correction, and the operation method comprising:
a decoding step of decoding the operation instruction and the SIMD correction instruction used for applying N parallel operations; and an execution step of,
(e) when the operation instruction is decoded, applying the predetermined type of operation to one of (i) the first-bit-length operand, and (ii) the N second-bit-length operands concatenated and considered to be a first-bit-length operand, to obtain one first-bit-length operation result, storing the obtained first-bit-length operation result in the storage unit, and generating correction information that corresponds to a difference between the first-bit-length operation result and a first-bit-length operation result that is the N second-bit-length operation results concatenated, and store the generated correction information in the storage unit, and (f) when the SIMD correction instruction used for applying N parallel operations is decoded, correcting the stored first-bit-length operation result using the stored correction information, to obtain the N second-bit-length operation results, wherein when executing the existing instruction, the operation instruction is decoded and an obtained first-bit-length operation result is considered to be an operation result of the existing operation, and when executing the SIMD operation, the operation instruction is decoded, an obtained first-bit-length operation result is considered to be a provisional operation result, the SIMD operation is then decoded, and N second-bit-length operation results obtained by correcting the provisional operation result are considered to be an operation result of the SIMD operation.

12. The operation method of claim 11, wherein
when M is an integer equal to or greater than 1, the first-bit-length operand is N*M bits in length, each second-bit-length operand is M bits in length, and each second-bit-length operation result is M*2 bits in length,
the execution step applies the predetermined type of operation to one of (a) the first-bit-length operand and (b) the N second-bit-length operands concatenated and considered to be a first-bit-length operand, to obtain the N*M*2-bit first-bit-length operation result, stores the obtained first-bit-length operation result in the storage unit, generates correction information based on an effect had, by applying the operation, on each M*2 bits of the first-bit-length operation result from another M*2 bits, and stores the generated correction information in the storage unit.

13. The operation method computer readable medium of claim 12, further having the execution apparatus execute the SIMD operation used for applying N/P parallel operations that applies the same predetermined type of operation in parallel to N/P M*P-bit third-bit-length operands, to obtain N/P M*P*2-bit third-bit-length operation results, P being an integer equal to or greater than 2 and equal to or less than N/2,
  wherein the decoding step further decodes the SIMD correction instruction used for applying N/P parallel operations,
  the execution step, (a) when the operation instruction is decoded, applies the predetermined type of operation to the first-bit-length operand, the first-bit-length operand being one of (i) the N second-bit-length operands concatenated and considered to be a first-bit-length operand, and (ii) the N/P third-bit-length operands concatenated and considered to be a first-bit-length operand, to obtain one N*M*2-bit first-bit-length operation result, stores the obtained first-bit-length operation result in the storage unit,
  where L is N−1 integers from 0 to N−1 and when a least significant bit is considered to be a first bit, generates first correction information, for each M*2 bits, based N−1 effects by the type of operation between (iii) the M*2*L-th bit and lower bits and (iv) the M*2*L+l bit position and higher bits, and generates second correction information, for each M*2*P bits, based on N/P−1 effects by the type of operation between (v) the M*2*P*L-th bit and lower bits and (vi) the M*2*L+l-th bit and higher bits, and stores the first correction information and second correction information in the storage unit,
  (b) when the SIMD correction instruction used for applying N parallel operations is decoded, corrects the stored first-bit-length operation result with use of the stored first correction information, and
  (c) when the SIMD correction instruction used for applying N/P parallel operations is decoded, corrects the first-bit-length operation result with use of the stored second correction information.

14. The operation method of claim 13,
  wherein N=8, M−=4, P=2, and the predetermined type of operation is multiply.

15. An operation apparatus that when N is an integer equal to or greater than 2, and M is an integer equal to or greater than 1,
  executes (a) an existing operation that applies a predetermined type of operation to one N*M-bit first-bit-length operand, to obtain one N*M-bit first-bit-length operation result, and (b) an SIMD (Single Instruction Multiple Data) that applies a predetermined type of operation in parallel to N M-bit second-bit -length second operands, to obtain NM-bit second-bit-length operation results,
  the operation apparatus implementing:
  an operation instruction for instructing application of the predetermined type of operation on one of (c) the first-bit-length operand, and (d) the plurality of second-bit-length operands concatenated and considered to be a first-bit-length operand; and
  an SIMD correction instruction for instructing correction of an operation result of the operation instruction to an operation result of the SIMD operation, and the operation apparatus comprising:
  a storage unit storing the first-bit-length operation result, and correction information that is used in the correction;
  a decoding unit decoding the operation instruction and the SIMD correction instruction used for applying N parallel operations; and
  an execution unit,
  (e) when the operation instruction is decoded, applies the predetermined type of operation to one of (i) the first-bit-length operand, and (ii) the N second-bit-length operands concatenated and considered to be a first-bit-length operand, to obtain one MA-bit first-bit-length operation result, store the obtained NW-bit first-bit-length operation result in the storage unit, and generate correction information based on an effect had, by applying the predetermined type of operation, on each M bits of the N*M-bit first-bit-length operation result from a bit that neighbors the M bits, and store the generated correction information in the storage unit, and
  (f) when the SIMD correction instruction used for applying N parallel operations is decoded, to correct the stored first-bit-length operation result in M-bit units using the stored correction information, to obtain the N second-bit-length operation results.

16. The operation apparatus of claim 15, wherein
  the execution unit, when the SIMD correction instruction used for applying N parallel operations is decoded, excludes M least significant bits of the first-bit-length operation result from being corrected.

17. The operation apparatus of claim 15, further executing the SIMD operation used for applying N/P parallel operations that applies the same predetermined type of operation in parallel to N/P M*P-bit third-bit-length operands, to obtain N/P M*P-bit third-bit-length operation results, P being an integer equal to or greater than 2 and equal to or less than N/2, wherein the decoding unit further decodes the SIMD correction instruction used for applying N/P parallel operations, and
  the execution unit,
  (a) when the operation instruction is decoded, applies the predetermined type of operation to the first-bit-length operand, the first bit-length operand being one of (i) the N second-bit-length operands concatenated and considered to be a first-bit-length operand, and (ii) the N/P third-bit-length operands concatenated and considered to be a first-bit-length operand, to obtain a first-bit-length operation result, stores the obtained first-bit-length operation result in the storage unit, generates the correction information based on an effect had, by applying the operation, on each M bits of-the first bit-length operation result from a bit that neighbors the M bits, and stores the generated correction information in the storage unit, and
  (b) when the SIMD operation used for applying N/P parallel operations is decoded, corrects the stored first-bit-length operation result in M*P-bit units, using only parts of the stored correction information that correspond to an effect on each M*P-bit unit.

18. The operation apparatus of claim 17
  wherein respective values of N, M and P are one of (a) N=8, M=8 and P=one of (i) 2, (ii) 4, and (iii) 2 and 4, and (b)N−=4, M=16 and P=2.

19. The operation apparatus of claim 15,
  wherein the type of operation is any one of a plurality of types of operations, and the execution unit, where L is N integers from 0 to N–1, when a least significant bit is considered to be a first bit, and when the operation instruction is decoded, generates correction information, in M-bit units, based on the type of operation and a carry from an M*L-th bit to an M*L+1-th bit according to the operation, the correction information showing for M bits the value of the M*L+1-th as one of (a) 0 or 1 and (b) 0 or –1, and when the SIMD correction instruction is decoded, performs, regardless of the type of the operation, one of (a) adding the stored correction information to the first-bit-length operation result in M-bit units, and (b) subtracting the correction information from the first-bit-length operation result in M-bit units.

20. The operation apparatus of claim 19,
wherein the plurality of types of operations includes at least one of increment, decrement, dyadic add, and dyadic subtract, and
the execution unit (a) when the operation instruction is decoded and the predetermined type is increment, increments the first-bit-length operand, to obtain a first-bit-length operation result, and generates the correction information, each M*L+1-th bit without a carry according to the operation being represented by a value –1 in the correction information, and each M*L+1-th bit with a carry according to the operation being represented by a value 0 in the correction information,
(b) when the operation instruction is decoded and the predetermined type is decrement, decrements the first-bit-length operand, to obtain a first-bit-length operation result, and generates the correction information, each M*L+1-th bit without a carry according to the operation being represented by a value 0 in the correction information, and each M*L+1th bit with a carry according to the operation being represented by a value 1 in the correction information,
(c) when the operation instruction is decoded and the predetermined type is dyadic add, adds a first first-bit-length operand and a second first-bit-length operand to obtain a first-bit-length operation result, the first first-bit-length operand being formed by concatenating N M-bit operands, and the second first-bit-length operand being formed by concatenating N M-bit operands, and generates correction information, each M*L+1-th without a carry according to the operation being represented by a value 0 in the correction information, and M*L+1-th bit with a carry according to the operation being represented by a value 1 in the correction information,
(d) when the operation instruction is decoded and the predetermined type is dyadic subtract, subtracts a second first-bit-length operand from a first first-bit-length operand to obtain a first-bit-length operation result, the first first-bit-length operand being formed by concatenating N M-bit operands, and the second first bit-length operand being formed by concatenating N M-bit operands, and generates correction information, each M*L+1-th bit without a carry according to the operation being represented by a value –1 in the correction information, and each M*L+1-th bit position with a carry according to the operation being represented by a value 0 in the correction information, and
(e) when the SIMD correction instruction is decoded, subtracts, in M-bit units, the stored correction information from the stored first-bit-length operation result, to obtain the N second-bit-length operation results.

21. The operation apparatus of claim 19,
wherein the plurality of types of operations includes at least one of increment, decrement, dyadic add, and dyadic subtract, and
the execution unit (a) when the, operation instruction is decoded and the predetermined type is increment, increments the first-bit-length operand, to obtain a first-bit-length operation result, and generates the correction information, each M*L+l-th bit without a carry according to the operation being represented by a value 1 in the correction information, and each M*L+l-th bit with a carry according to the operation being represented by a value 0 in the correction information,
(b) when the operation instruction is decoded and the predetermined type is decrement, decrements the first-bit-length operand, to obtain a first-bit-length operation result, and generates the correction information, each M*L+l-th bit without a carry according to the operation being represented by a value 0 in the correction information, and each M*L+lth bit with a carry according to the operation being represented by a value –1 in the correction information,
(c) when the operation instruction is decoded and the predetermined type is dyadic add, adds a first first-bit-length operand and a second first-bit-length operand to obtain a first-bit-length operation result, the first first-bit-length operand being formed by concatenating N M-bit operands, and the second first-bit-length operand being formed by concatenating N M-bit operands, and generates correction information, each M*L+l-th bit without a carry according to the operation being represented by a value 0 in the correction information, and M*L+l-th bit with a carry according to the operation being represented by a value –1 in the correction information,
(d) when the operation instruction is decoded and the predetermined type is dyadic subtract, subtracts a second first-bit-length operand from a first first-bit-length operand to obtain a first-bit-length operation result, the first first-bit-length operand being formed by concatenating N M-bit operands, and the second first bit-length operand being formed by concatenating IV h-bit operands, and generates correction information, each M*L+1-th bit without a carry according to the operation being represented by a value 1, and each M*L+l-th bit position with a carry according to the operation being represented by a value 0 in the correction information, and
(e) when the SIMD correction instruction for N parallel operations is decoded, subtracts, in M-bit units, the stored correction information from the stored first-bit-length operation result, to obtain the N second-bit-length operation results.

22. The operation apparatus of claim 15,
wherein the type of operation is any one of a plurality of types of operations,
the execution unit further stores type information showing the predetermined type, and, when the SIMD correction instruction used for applying N parallel operations is decoded, corrects the stored first-bit-length operation result according to the stored type.

23. The operation apparatus of claim 22,
wherein, when the operation instruction is decoded, the execution unit generates, as the correction information, information showing whether there is a carry from lower bits to corresponding higher bits.

24. The operation apparatus of claim 23,
wherein the plurality of types of operations includes at least one of increment, decrement, dyadic add, and dyadic subtract,
the execution unit, in order to obtain the N M-bit operation results, where L is N integers from 0 to N−1, and when a least significant bit is considered to be a first bit,
(a) when the stored type information shows one of increment and dyadic add, adds 1 to each M*L+1-th bit without a carry in the provisional operation result, based on the generated correction information, and
(b) when the stored type information shows one of decrement and dyadic subtract, subtracts 1 from each M*L+1-th bit with a carry in the provisional calculation result, based on the generated correction information.

25. The operation apparatus of claim 22, farther comprising:
a saving unit when an interrupt is received or when switching to another context, saving contents stored in the storage unit to a storage apparatus that is external to the operation apparatus; and
a restoration unit when returning from the interrupt or switching back to an original context, restoring the saved contents to the storage unit.

26. The operation apparatus of claim 15, further comprising:
a saving unit when an interrupt is received or when switching to another context, saving contents stored in the storage unit to a storage apparatus that is external to the operation apparatus; and
a restoration unit when returning from the interrupt or switching back to an original context, restoring the saved contents to the storage unit.

27. An operation apparatus that executes (a) an existing operation that applies a predetermined type of operation to a first-bit-length operand, to obtain one first-bit-length operation result, and (b) an SIMD (Single Instruction Multiple Data) operation used for applying N parallel operations that applies a predetermined type of operation in parallel to N second-bit-length operands, to obtain N second-bit-length operation results, N being an integer equal to or greater than 2,
the operation apparatus implementing:
an operation instruction for instructing application of the predetermined type of operation on one of (c) the first-bit-length operand, and (d) the plurality of second-bit-length operands concatenated and considered to be a first-bit-length operand; and
an SIMD correction instruction for instructing correction of an operation result of the operation instruction to an operation result of the SIMD operation, and
the operation apparatus comprising:
a storage unit storing the first-bit-length operation result, and correction information that is used in the correction;
a decoding unit decoding the operation instruction and the SIMD correction instruction used for applying N parallel operations; and
an execution unit,
(e) when the operation instruction is decoded, applying the predetermined type of operation to one of (i) the first-bit-length operand, and (ii) the N second-bit-length operands concatenated and considered to be a first-bit-length operand, to obtain a first first-bit-length operation result, store the obtained first first-bit-length operation result in the storage unit, and generate correction information that corresponds to a difference between the first first-bit-length operation result and a second first-bit-length operation result that is the N second-bit-length operation results concatenated, and store the generated correction information in the storage unit, and
(f) when the SIMD correction instruction for applying N parallel operations is decoded, to correct the stored first first-bit-length operation result using the stored correction information, to obtain N SIMD operation second bit-length operation results.

28. The operation apparatus of claim 27,
wherein, when M is an integer equal to or greater than 1, the first-bit-length operand is N*M bits in length, each second-bit-length operand is M bits, the first first-bit-length operation result is N*M*2 bits in length, and each second-bit-length operation result is M*2 bits in length, and
the execution unit applies the predetermined type of operation to one of (a) the first-bit-length operand and (b) the N second-bit-length operands concatenated and considered to be a first-bit-length operand, to obtain an N*M*2-bit first-bit-length operation result, stores the obtained first-bit-length operation result in the storage unit, generates correction information based on an effect had, by applying the predetermined type of operation, on each M*2 bits of the first-bit-length operation result, from other M*2 bits, and stores the correction information in the storage unit.

29. The operation apparatus of claim 28, further executing the SIMD operation used for applying N/P parallel operations that applies the same predetermined type of operation in parallel to N/P, M*P-bit third-bit-length operands, to obtain N/P M*P*2-bit third-bit-length operation results, P being an integer equal to or greater than 2 and equal to or less than N/2,
wherein the decoding unit further decodes the SIMD correction instruction used for applying N/P parallel operations,
the execution unit, (a) when the operation instruction is decoded, applies the predetermined type of operation to the first-bit-length operand, the first-bit-length operand being one of (i) the N second-bit-length operands concatenated and considered to be a first-bit-length operand, and (ii) the N/P third-bit-length operands concatenated and considered to be a first-bit-length operand, to obtain one N*M*2-bit first-bit-length operation result, stores the obtained first-bit-length operation result in the storage unit,
where L is N−1 integers from 0 to N−1, and when a least significant bit is considered to be a first bit, generates first correction information, for each M*2 bits, based N−1 effects by the predetermined type of operation between (iii) the M*2*L-th bit and lower bits and (iv) the M*2*L+1-th bit position and higher bits, and generates second correction information, for each M*2*P bits, based on N/P−1 effects by the predetermined type of operation between (v) the M*2*P*L-th bit and lower bits and (vi) the M*2*L+1-th bit and higher bits, and stores the first correction information and second correction information in the storage unit,
(b) when the SIMD correction instruction used for applying N parallel operations is decoded, corrects the stored first-bit-length operation result with use of the stored first correction information, and
(c) when the SIMD correction instruction used for applying N/P parallel operations is decoded, corrects the stored first-bit-length operation result with use of the stored second correction information.

30. The operation apparatus of claim 29,
wherein N=8, M=4, P=2, and the type of operation is multiply.

31. The operation apparatus of claim 27, further comprising:
  a saving unit when an interrupt is received or when switching to another context, saving contents stored in the storage unit to a storage apparatus that is external to the operation apparatus; and
  a restoration unit when returning from the interrupt or switching back to an original context, restoring the saved contents to the storage unit.

* * * * *